United States Patent
Hasegawa

(10) Patent No.: US 9,514,545 B2
(45) Date of Patent: Dec. 6, 2016

(54) OBJECT DETECTION APPARATUS AND STORAGE MEDIUM

(71) Applicant: MegaChips Corporation, Osaka-shi (JP)

(72) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 38 days.

(21) Appl. No.: 14/382,654

(22) PCT Filed: Mar. 11, 2013

(86) PCT No.: PCT/JP2013/056587
§ 371 (c)(1),
(2) Date: Sep. 3, 2014

(87) PCT Pub. No.: WO2013/146206
PCT Pub. Date: Oct. 3, 2013

(65) Prior Publication Data
US 2015/0030251 A1    Jan. 29, 2015

(30) Foreign Application Priority Data

Mar. 28, 2012 (JP) ................................ 2012-073854
Oct. 16, 2012 (JP) ................................ 2012-229095

(51) Int. Cl.
*G06T 7/60* (2006.01)
*H04N 7/18* (2006.01)
(Continued)

(52) U.S. Cl.
CPC ........... *G06T 7/602* (2013.01); *G06K 9/00805* (2013.01); *G06K 9/00825* (2013.01);
(Continued)

(58) Field of Classification Search
USPC ......................................................... 382/195
See application file for complete search history.

(56) References Cited

U.S. PATENT DOCUMENTS

2003/0156737 A1    8/2003   Ohtsuka et al.
2004/0240753 A1*  12/2004   Hu .......................... G06T 7/608
                                                              382/286
(Continued)

FOREIGN PATENT DOCUMENTS

EP         0356727          3/1990
EP         0356727 A2 *     3/1990    ........... G06K 9/3216
(Continued)

OTHER PUBLICATIONS

Rlen Van Leeuwen, "Motion Estimation and Interpretation for In-Car Systems", May 22, 2002, pp. 1-144 (http://dare.uva.nl/record/1/202930).*

(Continued)

*Primary Examiner* — Kim Vu
*Assistant Examiner* — Fred Hu
(74) *Attorney, Agent, or Firm* — Oblon, McClelland, Maier & Neustadt, L.L.P.

(57) ABSTRACT

Important information about an object is detected using less arithmetic processing. An object detection unit generates an edge image from a color image. The object detection unit evaluates symmetry of an image included in the edge image by performing processing in accordance with the position of a target pixel. The object detection unit identifies a symmetry center pixel forming an object having symmetry. The object detection unit detects an object width for each symmetry center pixel. The object detection unit identifies the width of the object in the vertical direction based on the width of the symmetry center pixels in the vertical direction, and identifies the width of the object in the horizontal direction based on the object width identified for each symmetry center pixel.

28 Claims, 30 Drawing Sheets

(51) Int. Cl.
*G06K 9/00* (2006.01)
*G06K 9/32* (2006.01)
*G06K 9/52* (2006.01)
*G06T 7/00* (2006.01)

(52) U.S. Cl.
CPC .............. *G06K9/3241* (2013.01); *G06K 9/52* (2013.01); *G06T 7/0042* (2013.01); *G06T 7/608* (2013.01); *H04N 7/18* (2013.01); *G06T 2207/10016* (2013.01); *G06T 2207/30252* (2013.01)

(56) References Cited

U.S. PATENT DOCUMENTS

| | | | | |
|---|---|---|---|---|
| 2009/0028389 A1* | 1/2009 | Edanami | ................ | G06K 9/468 382/104 |
| 2009/0028403 A1* | 1/2009 | Bar-Aviv | ............. | G06F 19/321 382/128 |
| 2009/0066490 A1 | 3/2009 | Mitzutani et al. | | |

FOREIGN PATENT DOCUMENTS

| | | |
|---|---|---|
| JP | H10-162118 | 6/1998 |
| JP | 2000-39306 | 2/2000 |
| JP | 2004-110543 | 4/2004 |
| JP | 2005-157648 | 6/2005 |
| JP | 2007-235950 | 9/2007 |
| JP | 2008-293116 | 12/2008 |
| JP | 2010-176531 | 8/2010 |
| JP | 2010-177780 | 8/2010 |
| JP | 2010-177780 A | 8/2010 |
| JP | 2010-267257 | 11/2010 |
| JP | 2011-65434 | 3/2011 |

OTHER PUBLICATIONS

Loy, Gareth, and Jan-Olof Eklundh. "Detecting symmetry and symmetric constellations of features." COmputer Vision-ECCV 2006. Springer Berlin Heidelberg, 2006, 508-521.*
O'Mara D.; Owens, R., "Measuring bilateral symmetry in digital images," TENCON '96. Proceedings, 1996 IEEE TENCON., Digital Signal Processing Applications, vol. 1, No., pp. 151, 156, vol. 1, Nov. 25-29, 1996.*
Liu, Yanxi, Robert T. Collins, and Yanghai Tsin. "A computational model for periodic pattern perception based on frieze and wallpaper groups." Pattern Analysis and Machine Intelligence, IEEE Transactions on 26.3 (2004): 354-371.*
Rien Van Leeuwen. "Motion estmation and interpretation for in-car systems", May 22, 2002, pp. 1-144 (http://dare.uva.n/record/1/202930).*
European Communication pursuant to Article 94(3) EPC issued Nov. 20, 2015 in European Patent Application No. 13 768 099.7.
EPO communication issued Nov. 10, 2015, in Patent Application No. 13768099.7.
Rien Van Leeuwen: "Motion estimation and interpretation for in-car systems", May 22, 2002, pp. 1-144 (http://dare.uva.nl/record/1/202930).
Broggi A. et al: "Multi-resolution vehicle detection using artificial vision", Intelligent Vehicles Symposium, Jun. 14, 2004, pp. 310-314.
Bertozzi M. et al: "Stereo vision-based vehicle detection" Intelligent Vehicles Symposium, Oct. 3, 2000, pp. 39-44.
Soo Siang Teoh et al. "Symmetry-based monocular vehicle detection system", Machine Vision and Applications, Springer, Berlin, Germany, vol. 23, No. 5, Jul. 8, 2011, pp. 831-842.
Christian Nunn et al. "A two stage detection module for traffic signs", Vehicular Electronics and Safety, 2008. ICVES 2008. IEEE International Conference on, IEEE, Piscataway, NJ, USA, Sep. 22, 2008, pp. 248-252.
International Search Report issued May 7, 2013, in PCT/JP13/056587 filed Mar. 11, 2013.
Loy, Gareth, and Jan-Olof Eklundh, "Detecting Symmetry and Symmetric Constellations of Features", Computer Vision-ECCV 2006, Springer Berlin Heidelberg, 2006, 508-521.
O'Mara, D.' Owens, R., "Measuring Bilateral Symmetry in Digital Images", TENCON '96, Proceedings, 1996 IEEE TENCON. Digital Signal Processing Applications, vol. 1, No., pp. 151, 156 vol. 1, Nov. 26-29, 1996.
Liu, Yanxi, Robert T. Collins, and Yanghai Tsin, "A Computational Model for Periodic Pattern Perception Based on Frieze and Wallpaper Groups", Pattern Analysis and Machine Intelligence, IEEE Transactions on 26.3 (2004): 354-371.
Office Action dated Aug. 26, 2015, in co-pending U.S. Appl. No. 14/387,922.
U.S. Appl. No. 14/387,922, filed Sep. 25, 2014, Hasegawa.
U.S. Appl. No. 14/394,558, filed Oct. 15, 2014, Hasegawa.
Office Action mailed Apr. 7, 2016 in Chinese Patent Application No. 201380014828 (with English Translation).
Office Action issued on Jul. 5, 2016 in European Patent Application No. 13 768 099.7.
Office Action issued Jul. 22, 2016 in Chinese Patent Application No. 201380014828.6 (with English language translation).

\* cited by examiner

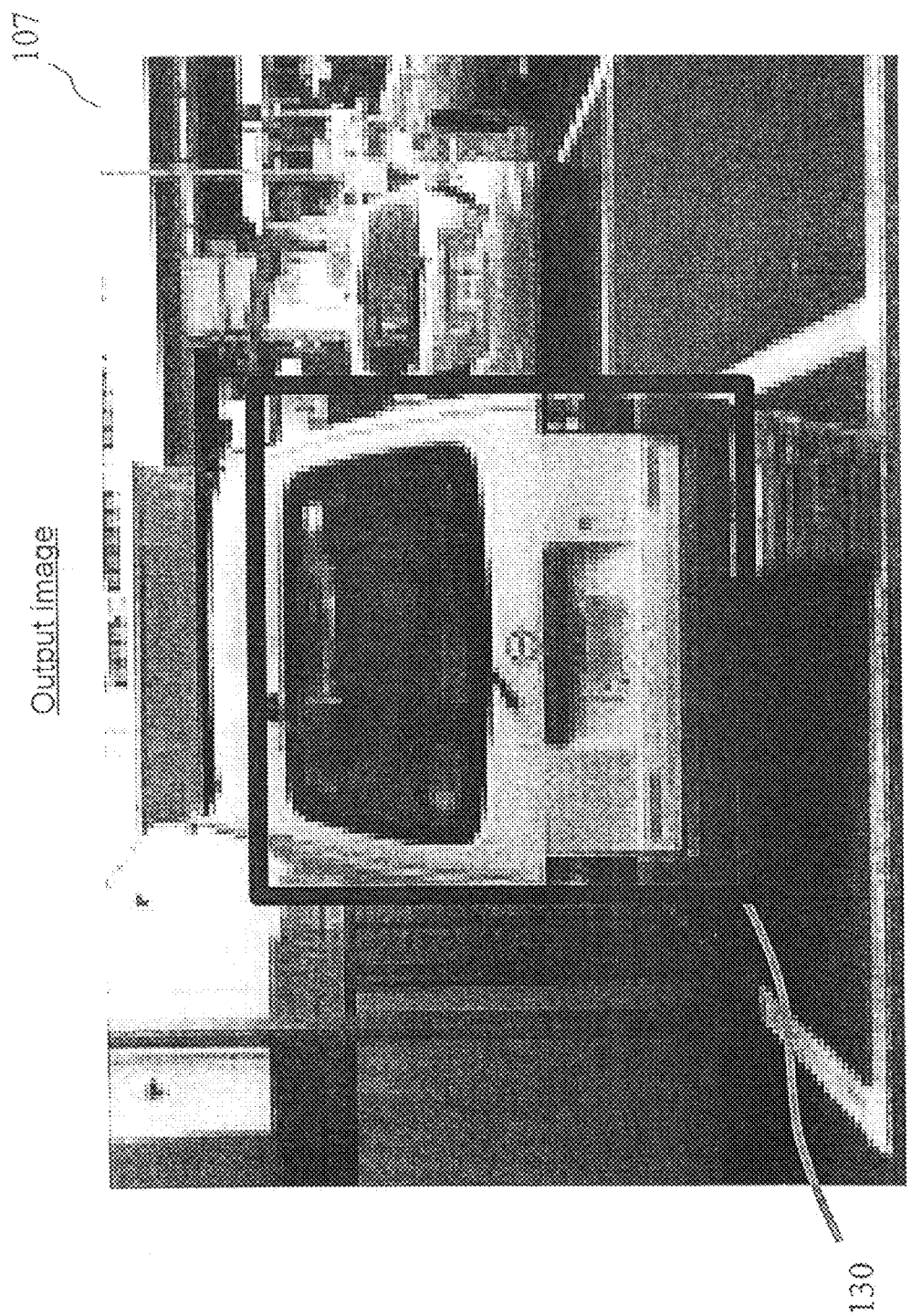

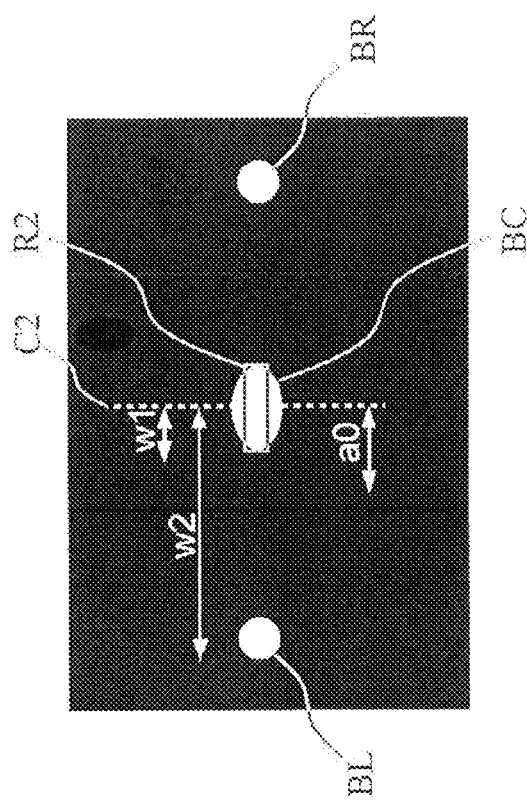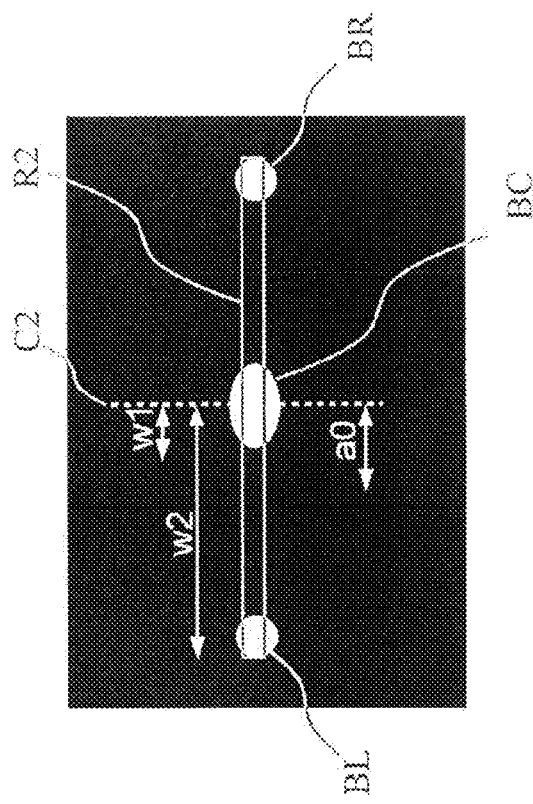
FIG. 14A
FIG. 14B

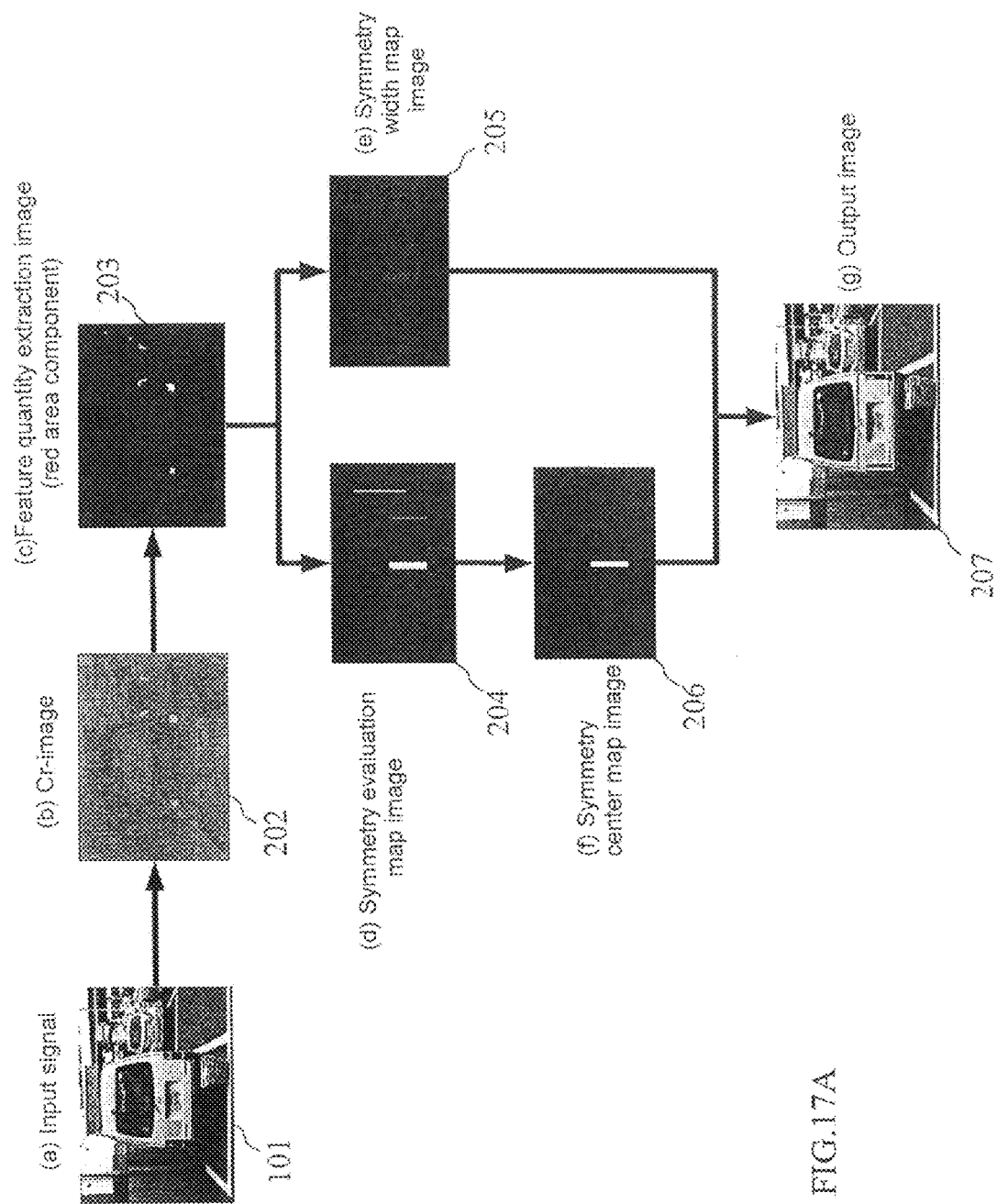

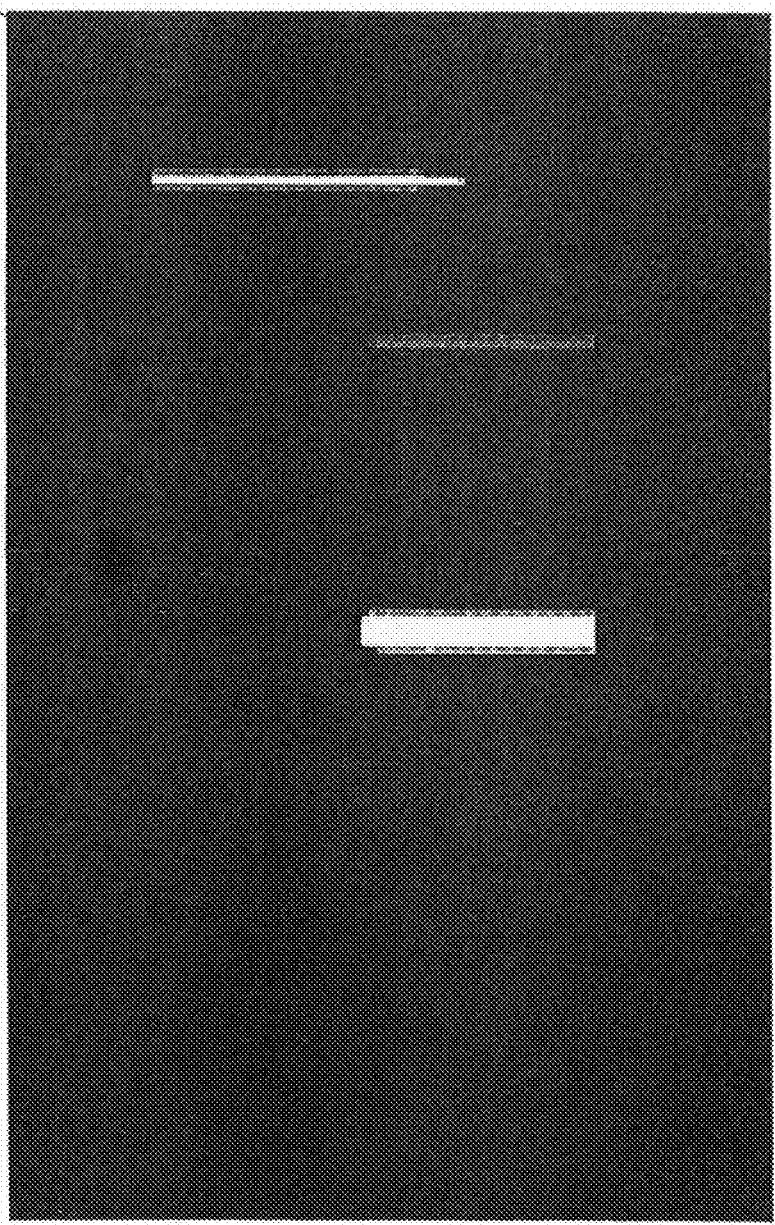

OBJECT DETECTION APPARATUS AND STORAGE MEDIUM

TECHNICAL FIELD

The present invention relates to an apparatus and a method for detecting a symmetrical object included in an image.

BACKGROUND ART

Some image processing techniques use symmetries of objects. Patent Literature 1 below describes a technique for evaluating the correlation between image areas located right and left to each target pixel by calculating the correlation between the right and the left of the target pixel. This technique detects a target pixel for which the calculated correlation is the highest as the center of a symmetrical object.

CITATION LIST

Patent Literature

Patent Literature 1: Japanese Unexamined Patent Publication No. 2010-267257

DISCLOSURE OF INVENTION

Technical Problem

Techniques for detecting objects have many applications in a variety of fields. Applications using information about detected objects, which typically use information about the position of an object, may further need the size of an object as important information.

However, it has been difficult to obtain information about both the position and the size of an object included in an image with high accuracy without increasing the processing load.

In response to the above problem, it is an object of the present invention to provide a technique for detecting important information about an object (e.g., information about the position and the size of an object) using less arithmetic processing.

Solution to Problem

To solve the above problem, an object detection apparatus according to a first aspect of the invention includes an image input unit, an image feature quantity extraction unit, a symmetry evaluation unit, a center detection unit, and an object area detection unit. The image input unit receives an image. The image feature quantity extraction unit extracts a predetermined image feature quantity from the image to generate a feature-quantity extraction image. The symmetry evaluation unit evaluates, for every processing target pixel in the feature-quantity extraction image, first-direction symmetry of an image area around the processing target pixel based on an image feature quantity of pixels around the processing target pixel, and calculates a symmetry width in a first direction. The first-direction symmetry is symmetry in the first direction. The center detection unit detects the target pixel as a symmetry center pixel when the evaluated symmetry for the target pixel exceeds a predetermined reference. The object area detection unit detects an object width in the first direction for an object having symmetry included in the image based on the symmetry width of each symmetry center pixel, and detects an object width in a second direction orthogonal to the first direction based on distribution of each symmetry center pixel in the second direction.

In this object detection apparatus, the symmetry evaluation unit evaluates, for every target pixel, symmetry in the first direction in an image area around the target pixel (the image area may include the target pixel), and calculates the symmetry width in the first direction. The center detection unit then detects a symmetry center pixel. In this object detection apparatus, the object area detection unit detects the object width of an object having symmetry in the first direction included in the image based on the symmetry width of the symmetry center pixels, and detects the object width of the object in the second direction based on the distribution of the symmetry center pixels in the second direction orthogonal to the first direction. More specifically, the object detection apparatus detects the position and the size of an object using the symmetry in the object in the input image, and thus can detect important information about the object (e.g., information about the position and the size of the object) using less arithmetic processing.

A second aspect of the invention provides the object detection apparatus of the first aspect of the invention in which the center detection unit detects a point corresponding to a local maximum in changes in the first-direction symmetry as the symmetry center pixel.

In this case, the object detection apparatus detects a point located near the center of an image area having high symmetry in the first direction as a symmetry center pixel. Thus, the object detection apparatus can detect the symmetry center pixel with higher accuracy. The object detection apparatus uses the detected symmetry center pixel to detect the object width in the first direction and the object width in the second direction, and thus can detect important information about the object (e.g., information about the position and the size of the object) with higher accuracy.

A third aspect of the invention provides the object detection apparatus of one of the first and second aspects of the invention in which the symmetry evaluation unit evaluates symmetry based on a similarity in the image feature quantity between pixels around the target pixel.

This object detection apparatus evaluates symmetry for every target pixel based on a similarity between image feature quantities of pixels around the target pixel, and thus can detect the symmetry of an object in the image by using the image feature quantities of the pixels around the target pixel. This object detection apparatus can thus detect the object width in the first direction and the object width in the second direction based on the evaluated symmetry, and thus can detect important information about the object (e.g., information about the position and the size of the object) with high accuracy.

A fourth aspect of the invention provides the object detection apparatus of one of the first to third aspects of the invention in which the symmetry evaluation unit detects a width corresponding to the highest evaluated symmetry for each target pixel as the symmetry width.

This object detection apparatus detects, for every target pixel, the width corresponding to the highest evaluated symmetry in an image area around the target pixel as the symmetry width. This object detection apparatus detects the object width in the first direction and the object width in the second direction based on the detected symmetry width, and thus can detect important information about the object (e.g., information about the position and the size of the object) with higher accuracy.

A fifth aspect of the invention provides the object detection apparatus of one of the first to fourth aspects of the invention in which the object area detection unit detects a maximum value or an average value of the symmetry width of each symmetry center pixel as the object width in the first direction.

This object detection apparatus detects the object width in the first direction based on the maximum value or the average value of the symmetry width of each symmetry center pixel, and thus can detect the width of the object in the image in the first direction (the object width) in an appropriate manner.

A sixth aspect of the invention provides the object detection apparatus of one of the first to fourth aspects of the invention in which the object area detection unit detects the symmetry width of each symmetry center pixel as the object width in the first direction.

This object detection apparatus detects the symmetry width of each symmetry center pixel as the object width in the first direction, and thus can detect the width of the symmetrical object having any shape in the image with high accuracy in an appropriate manner.

A seventh aspect of the invention provides the object detection apparatus of one of the first to sixth aspects of the invention in which the object area detection unit detects a first end and a second end of the symmetry center pixels sequentially arranged in the second direction as a first end and a second end of the object width in the second direction.

This object detection apparatus detects the first end and the second end of symmetry center pixels sequentially arranged in the second direction as the first end and the second end of the object width in the second direction, and thus can detect the width of the object in the image in the second direction in an appropriate manner.

An eighth aspect of the invention provides the object detection apparatus of one of the first to seventh aspects of the invention in which the symmetry evaluation unit uses an edge intensity of a pixel as an image feature quantity of the pixel.

A ninth aspect of the invention provides the object detection apparatus of one of the first to seventh aspects of the invention in which the symmetry evaluation unit uses an intensity of a predetermined color component of a pixel as an image feature quantity of the pixel.

An eighth aspect of the invention provides the object detection apparatus of one of the first to seventh aspects of the invention in which the symmetry evaluation unit evaluates symmetry in a horizontal direction when the first direction is set to the horizontal direction and evaluates symmetry in a vertical direction when the first direction is set to the vertical direction, and identifies a pixel having symmetry in the horizontal direction without having symmetry in the vertical direction, and the center detection unit identifies, as the symmetry center pixel, a pixel for which the evaluated symmetry exceeds a predetermined reference and that has symmetry in the horizontal direction without having symmetry in the vertical direction.

This object detection apparatus detects an object having symmetry only in the horizontal direction in the image with high accuracy in an appropriate manner.

A ninth aspect of the invention provides the object detection apparatus of one of the first to eighth aspects of the invention in which the object detection apparatus detects a vehicle included in the image as the object having symmetry.

A tenth aspect of the invention provides the object detection apparatus of the first aspect of the invention in which the symmetry evaluation unit sets, for every processing target pixel, a symmetry evaluation area for evaluating the first-direction symmetry, which is symmetry in the first direction in the image, in such a manner that the symmetry evaluation area is symmetrical with respect to a central axis in the second direction orthogonal to the first direction, and calculates a weighted value resulting from weighting a correlation value by an image feature quantity on a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the first-direction symmetry.

This object detection apparatus obtains the symmetry evaluation value using the value resulting from weighting of a value indicating a correlation between image feature quantities of a group of pixels located symmetrical to each other with respect to the central axis based on the image feature quantities of the group of pixels, and thus can evaluate symmetry in the first direction with high accuracy.

The symmetry evaluation value obtained by the object detection apparatus can be used to detect a highly symmetrical object with high accuracy using less arithmetic processing.

The width of the symmetry evaluation area in the second direction (orthogonal to the first direction) may be a width corresponding to one pixel, or a width corresponding to a plurality of pixels. The group of pixels located symmetrical with respect to the central axis is a concept that includes (1) two pixels located at the same distance from the central axis in the opposite directions in an image (e.g., two pixels, or a pixel P1 at the distance k from the central axis to the left in the horizontal direction when the first direction is the horizontal direction and a pixel P2 at the distance k from the central axis to the right in the horizontal direction), or (2) a plurality of pixels located at the same distance from the central axis in the opposite directions in an image (e.g., n pixels at the distance k from the central axis to the left in the horizontal direction when the first direction is the horizontal direction, and n pixels at the distance k from the central axis to the right in the horizontal direction).

Further, the value indicating the correlation between the image feature quantities is a value indicating the degree of correlation of the image feature quantities. The value indicates a higher correlation when, for example, the correlation between the pixel values of two pixels included in a feature-quantity extraction image is higher (e.g., the two pixel values have a small difference between them or the ratio of the two pixel values is close to 1).

An eleventh aspect of the invention provides the object detection apparatus of the tenth aspect of the invention in which the symmetry evaluation unit determines a width of the first-direction symmetry based on the size of the symmetry evaluation area corresponding to the symmetry evaluation value indicating the highest symmetry in the first direction.

This object detection apparatus evaluates symmetry in the first direction in the image obtained by extracting the image feature quantity from the input image, and thus evaluates symmetry while varying the size of the symmetry evaluation area (e.g., the width in the first direction). Thus, when determining that a predetermined image area has high symmetry, the object detection apparatus can obtain the size of the image area determined to have high symmetry (e.g., the width in the first direction) at the same time. More specifically, this object detection apparatus can detect the position and the size of an object at one time using the symmetry of the object included in the image.

Thus, the object detection apparatus can detect a highly symmetrical object with high accuracy using less arithmetic processing.

A twelfth aspect of the invention provides the object detection apparatus of one of the tenth and eleventh aspects of the invention in which the symmetry evaluation unit calculates the symmetry evaluation value for the target pixel using Formula 1 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, and 2w+1 is a width of the symmetry evaluation area in the first direction.

Formula 1

$$SYM_w(i, j) = \frac{1}{w}\sum_{k=1}^{w}\{(P\max - |P_{i-k} - P_{i+k}|) * P_{i-k} * P_{i+k}\} \quad (1)$$

Through the processing written as Formula 1, this object detection apparatus obtains the symmetry evaluation value using the value resulting from weighting a value (Pmax−|$P_{i-k}$−$P_{i+k}$|) by a value ($P_{i-k}$×$P_{i+k}$) indicating image feature quantities of a group of pixels. The value (Pmax−|$P_{i-k}$−$P_{i+k}$|) indicates a correlation between image feature quantities of a group of pixels located symmetrical to each other with respect to the central axis. The object detection apparatus can thus evaluate symmetry in the first direction with high accuracy.

Using the symmetry evaluation value obtained by the object detection apparatus enables a highly symmetrical object to be detected with high accuracy using less arithmetic processing.

In the processing written as Formula 1 above, the range of values of the symmetry evaluation value $SYM_w(i, j)$ may be adjusted by gain adjustment (coefficient adjustment), normalization, or clipping to a predetermined value (the processing modified from Formula 1 above may be performed).

The maximum value Pmax may be a maximum value of possible pixel values in the feature-quantity extraction image or may be a predetermined value equal to or greater than the maximum value.

A thirteenth aspect of the invention provides the object detection apparatus of one of the tenth and eleventh aspects of the invention in which the symmetry evaluation unit calculates the symmetry evaluation value for the target pixel using either Formula 2 or Formula 3 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_{i,j}$ is a pixel value of the target pixel located at coordinates (i, j) in the feature-quantity extraction image, 2w+1 is a width of the symmetry evaluation area in the first direction, 2n+1 is a width of the symmetry evaluation area in the second direction, and d(m) is a predetermined weighting function.

Formula 2

$$SYM_w(i, j) = \frac{1}{2n+1} \sum_{m=j-n}^{j+n}\left[d(m) * \frac{1}{w}\sum_{k=1}^{w}\{(P\max - |P_{i-k,m} - P_{i+k,m}|) * P_{i-k,m} * P_{i+k,m}\}\right] \quad (2)$$

Formula 3

$$SYM_w(i, j) = \quad (3)$$
$$\frac{1}{w}\sum_{k=1}^{w}\left[\left(P\max - \frac{1}{2n+1}\left|\sum_{m=j-n}^{j+n} d(m) * P_{i-k,m} - \sum_{m=j-n}^{j+n} d(m) * P_{i+k,m}\right|\right) * \right.$$
$$\left.\left\{\frac{1}{2n+1}\sum_{m=j-n}^{j+n}(d(m) * P_{i-k,m})\right\} * \left\{\frac{1}{2n+1}\sum_{m=j-n}^{j+n}(d(m) * P_{i+k,m})\right\}\right]$$

Through the processing written as Formula 2 or 3, this object detection apparatus obtains the symmetry evaluation value using the average value obtained by accumulating, in the second direction, the values resulting from weighting a value (Pmax−|$P_{i-k}$−$P_{i+k}$|) by a value ($P_{i-k}$×$P_{i+k}$) of indicating image feature quantities of a group of pixels. The value (Pmax−|$P_{i-k}$−$P_{i+k}$|) indicates a correlation between image feature quantities of a group of pixels located symmetrical to each other with respect to the central axis. The object detection apparatus can thus evaluate symmetry in the first direction with high accuracy.

Using the symmetry evaluation value obtained by the object detection apparatus enables a highly symmetrical object to be detected with high accuracy using less arithmetic processing.

The maximum value Pmax may be a maximum value of possible pixel values in the feature-quantity extraction image or may be a predetermined value equal to or greater than the maximum value.

A fourteenth aspect of the invention provides the object detection apparatus of the thirteenth aspect of the invention in which the weighting function d(m) is $$d(m)=1, \quad (1)$$

$$d(m)=n+1-|m-h|, \text{ or} \quad (2)$$

$$d(m)=c1 \times \exp(-c2 \times (m-j)^2), \quad (3)$$

where c1 and c2 are predetermined positive coefficients.

This object detection apparatus can perform any intended weighting when the values are accumulated in the second direction. When, for example, (1) d(m)=1, the values accumulated in the second direction are weighted by uniform weighting. When (2) d(m)=n+1−|m−j|, the values accumulated in the second direction are weighted with a larger value closer to the center of the symmetry evaluation area in the second direction (with the largest value when m=j). When (3) d(m)=c1×exp(−c2×(m−j)^2), the values accumulated in the second direction are weighted with a larger value closer to the center of the symmetry evaluation area in the second direction (with the largest value when m=j).

A fifteenth aspect of the invention provides the object detection apparatus of one of the twelfth and fourteenth aspects of the invention in which the symmetry evaluation unit obtains a maximum value maxSYM of the symmetry evaluation value $SYM_w(i, j)$, and determines the symmetry width based on the width $2w+1$ of the symmetry evaluation area in the first direction corresponding to the maximum value of the symmetry evaluation value $SYM_w(i, j)$.

When determining that a predetermined image area has high symmetry, the object detection apparatus can obtain the size of the image area determined to have high symmetry (e.g., the width in the first direction) at the same time. In other words, this object detection apparatus can extract the position and the size of an object included in an image at one time using the symmetry of the object.

The object detection apparatus can detect a highly symmetrical object with high accuracy using less arithmetic processing.

A sixteenth aspect of the invention provides the object detection apparatus of one of the tenth to fifteenth aspects of the invention in which (1) when a value of a row i indicating a position of the target pixel in the first direction is equal to or less than H/2, the symmetry evaluation unit calculates the symmetry evaluation value by varying a value of w within a range of $1 \le w \le (i-1)$, where w is a half of the width of the symmetry evaluation area in the first direction and H is the number of pixels in the first direction of the image, and H is a natural number, and (2) when the value of the row i indicating the position of the target pixel in the first direction is greater than H/2, the symmetry evaluation unit calculates the symmetry evaluation value by varying the value of w within a range of $1 \le w \le (H-i)$.

This object detection apparatus ensures that the symmetry evaluation area is symmetrical with respect to the target pixel, and can detect the symmetry evaluation value using a maximum area among horizontally symmetrical areas with respect to the target pixel.

A seventeenth aspect of the invention provides the object detection apparatus of the first aspect of the invention in which the symmetry evaluation unit sets, for every processing target pixel, a symmetry evaluation area for evaluating the first-direction symmetry, which is symmetry in the first direction in the image, in such a manner that the symmetry evaluation area is symmetrical with respect to a central axis that is a predetermined axis in the second direction orthogonal to the first direction, and calculates a weighted value resulting from weighting a correlation value by a distance from the central axis to a group of pixels included in the symmetry evaluation area and located symmetrical with respect to the central axis, the correlation value indicating a correlation between image feature quantities of the group of pixels, while varying a size of the symmetry evaluation area in accordance with a distance from the central axis to the group of pixels to obtain a symmetry evaluation value indicating a degree of the first-direction symmetry.

This object detection apparatus obtains the symmetry evaluation value using the value resulting from weighting a correlation value, which indicates a correlation between image feature quantities of a group of pixels located symmetrical to each other with respect to the central axis, by the distance of each pixel from the central axis, and thus can evaluate symmetry in the first direction with high accuracy.

Using the symmetry evaluation value obtained by the object detection apparatus enables a highly symmetrical object to be detected with high accuracy using less arithmetic processing.

The width of the symmetry evaluation area in the second direction (orthogonal to the first direction) may be a width corresponding to one pixel, or a width corresponding to a plurality of pixels. The group of pixels located symmetrical with respect to the central axis is a concept that includes (1) two pixels located at the same distance from the central axis in the opposite directions in an image (e.g., two pixels, or a pixel P1 at the distance k from the central axis to the left in the horizontal direction when the first direction is the horizontal direction and a pixel P2 at the distance k from the central axis to the right in the horizontal direction), or (2) a plurality of pixels located at the same distance from the central axis in the opposite directions in an image (e.g., n pixels at the distance k from the central axis to the left in the horizontal direction when the first direction is the horizontal direction, and n pixels at the distance k from the central axis to the right in the horizontal direction).

Further, the value indicating the correlation between the image feature quantities is a value indicating the degree of correlation of the image feature quantities. The value indicates a higher correlation when, for example, the correlation between the pixel values of two pixels included in a feature-quantity extraction image is higher (e.g., the two pixel values have a small difference between them or the ratio of the two pixel values is close to 1).

An eighteenth aspect of the invention provides the object detection apparatus of the seventeenth aspect of the invention in which the symmetry evaluation unit determines the symmetry width in the first direction based on the size of the symmetry evaluation area corresponding to a maximum symmetry evaluation value indicating a maximum first-direction symmetry.

When evaluating symmetry in the first direction in the image obtained by extracting the image feature quantity from the input image, the object detection apparatus evaluates symmetry while varying the size of the symmetry evaluation area (e.g., the width in the first direction). Thus, when determining that a predetermined image area has high symmetry, the object detection apparatus can obtain the size of the image area determined to have high symmetry (e.g., the width in the first direction) at the same time. In other words, this object detection apparatus can detect the position and the size of an object at one time using the symmetry of the object included in the image.

Thus, the object detection apparatus can detect a highly symmetrical object with high accuracy using less arithmetic processing.

A nineteenth aspect of the invention provides the object detection apparatus of the seventeenth aspect of the invention in which the symmetry evaluation unit calculates the symmetry evaluation value for the target pixel using Formula 4 given below, while varying a value of $2w+1$, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, Th is a predetermined threshold, and c(k) is a weighting function for the distance k from the target pixel.

Formula 4

$$SYM_w(i, j) = \frac{1}{w}\sum_{k=1}^{w} \{(Pmax - f_i(k)) * c(k)\} \quad (4)$$

$$f_i(k) = \begin{cases} |P_{i-k} - P_{i+k}| & \text{if } (P_{i-k} > Th) \text{ or } (P_{i+k} > Th) \\ Pmax & \text{else} \end{cases}$$

Through the processing written as Formula 4, this object detection apparatus obtains the symmetry evaluation value using the average value obtained by accumulating, in the second direction, the values resulting from weighting a correlation value (Pmax−fi(k)), which indicates a correlation between image feature quantities of a group of pixels located symmetrical to each other with respect to the central axis, by a distance from the central axis to the group of pixels (weighting the correlation value (Pmax−fi(k)) by a value c(k)), and thus can evaluate symmetry in the first direction with high accuracy.

Using the symmetry evaluation value obtained by the object detection apparatus enables a highly symmetrical object to be detected with high accuracy using less arithmetic processing.

In the processing written as Formula 4 above, the range of values of the symmetry evaluation value $SYM_w(i, j)$ may be adjusted by gain adjustment (coefficient adjustment), normalization, or clipping to a predetermined value (the processing modified from Formula 4 above may be performed).

The maximum value Pmax may be a maximum value of possible pixel values in the feature-quantity extraction image or may be a predetermined value equal to or greater than the maximum value.

A twentieth aspect of the invention provides the object detection apparatus of the nineteenth aspect of the invention in which the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

When determining that a predetermined image area has high symmetry, the object detection apparatus can obtain the size of the image area determined to have high symmetry (e.g., the width in the first direction) at the same time. In other words, this object detection apparatus can extract the position and the size of an object included in an image at one time using the symmetry of the object.

The object detection apparatus can detect a highly symmetrical object with high accuracy using less arithmetic processing.

A twenty first aspect of the invention provides the object detection apparatus of one of the seventeenth and eighteenth aspects of the invention in which the symmetry evaluation unit calculates a weighted value resulting from weighting a value indicating a correlation between image feature quantities of a group of pixels included in the symmetry evaluation area and located symmetrical with respect to the central axis based on a distance from the central axis to the group of pixels and an image feature quantity on the group of pixels to obtain a symmetry evaluation value indicating a degree of the first-direction symmetry.

This object detection apparatus can obtain the symmetry evaluation value indicating the degree of symmetry in the first direction based on both the image feature quantity of a pixel included in the symmetry evaluation area and the position of the pixel in the image.

A twenty second aspect of the invention provides the object detection apparatus of the twenty first aspect of the invention in which the symmetry evaluation unit calculates the symmetry evaluation value for the target pixel using Formula 5 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, Th is a predetermined threshold, and c(k) is a weighting function for the distance k from the target pixel.

Formula 5

$$SYM_w(i, j) = \frac{1}{w}\sum_{k=1}^{w} \{(Pmax - |P_{i-k} - P_{i+k}|) * P_{i-k} * P_{i+k} * c(k)\} \quad (5)$$

Through the processing written as Formula 5, this object detection apparatus obtains the symmetry evaluation value using the value resulting from weighting a value (Pmax−|$P_{i-k}$−$P_{i+k}$|) by a value ($P_{i-k}$×$P_{i+k}$) and a value c(k). The value (Pmax−|$P_{i-k}$−$P_{i+k}$|) indicates a correlation between image feature quantities of a group of pixels located symmetrical to each other with respect to the central axis. The value ($P_{i-k}$×$P_{i+k}$) indicates image feature quantities of the group of pixels. The value c(k) indicates the distance of each pixel from the central axis. The object detection apparatus can thus evaluate symmetry in the first direction with high accuracy.

Using the symmetry evaluation value obtained by the object detection apparatus enables a highly symmetrical object to be detected with high accuracy using less arithmetic processing.

The maximum value Pmax may be a maximum value of possible pixel values in the feature-quantity extraction image or may be a predetermined value equal to or greater than the maximum value.

A twenty third aspect of the invention provides the object detection apparatus of the twenty second aspect of the invention in which the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

When determining that a predetermined image area has high symmetry, the object detection apparatus can obtain the size of the image area determined to have high symmetry (e.g., the width in the first direction) at the same time. In other words, this object detection apparatus can extract the position and the size of an object included in an image at one time using the symmetry of the object.

The object detection apparatus can detect a highly symmetrical object with high accuracy using less arithmetic processing.

A twenty fourth aspect of the invention provides the object detection apparatus of one of the seventeenth and eighteenth aspects of the invention in which the symmetry evaluation unit calculates the symmetry evaluation value for the target pixel using either Formula 6 or Formula 7 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, 2n+1 is a width of the symmetry evaluation area in the second direction, Th is a predetermined threshold, and c(k) is a weighting function for the distance k from the target pixel.

Formula 6

$$SYM_w(i, j) = \frac{1}{2n+1} \sum_{m=j-n}^{j+n} \left[ \frac{1}{w} * \sum_{k=1}^{w} \{(P\max - f_i(k)) * c(k)\} \right] \quad (6)$$

$$f_i(k) = \left\{ \begin{array}{ll} |P_{i-k} - P_{i+k}| & \text{if } (P_{i-k} > Th) \text{ or } (P_{i+k} > Th) \\ P\max & \text{else} \end{array} \right\}$$

Formula 7

$$SYM_w(i, j) = \frac{1}{w} \sum_{k=1}^{w} \left[ \left( P\max - \frac{1}{2n+1} \sum_{m=j-n}^{j+n} f_i(k) \right) * c(k) \right] \quad (7)$$

The maximum value Pmax may be a maximum value of possible pixel values in the feature-quantity extraction image or may be a predetermined value equal to or greater than the maximum value.

A twenty fifth aspect of the invention provides the object detection apparatus of the twenty fourth aspect of the invention in which the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

When determining that a predetermined image area has high symmetry, the object detection apparatus can obtain the size of the image area determined to have high symmetry (e.g., the width in the first direction) at the same time. In other words, this object detection apparatus can extract the position and the size of an object included in an image at one time using the symmetry of the object.

The object detection apparatus can detect a highly symmetrical object with high accuracy using less arithmetic processing.

A twenty sixth aspect of the invention provides the object detection apparatus of one of the seventeenth and eighteenth aspects of the invention in which the symmetry evaluation unit calculates the symmetry evaluation value for the target pixel using either Formula 8 or Formula 9 given below, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_i$ is a pixel value of the target pixel located at coordinates (i, j) in the feature-quantity extraction image, 2w+1 is a width of the symmetry evaluation area in the first direction, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, 2n+1 is a width of the symmetry evaluation area in the second direction, Th is a predetermined threshold, and c(k) is a weighting function for the distance k from the target pixel.

Formula 8

$$SYM_w(i, j) = \frac{1}{2n+1} \quad (8)$$

$$\sum_{m=j-n}^{j+n} \left[ \frac{1}{w} * \sum_{k=1}^{w} \{(P\max - |P_{i-k,m} - P_{i+k,m}|) * P_{i-k,m} * P_{i+k,m} * c(k)\} \right]$$

Formula 9

$$SYM_w(i, j) = \frac{1}{w} \sum_{k=1}^{w} \left[ \left( P\max - \frac{1}{2n+1} \left| \sum_{m=j-n}^{j+n} P_{i-k,m} - \sum_{m=j-n}^{j+n} P_{i+k,m} \right| \right) * \quad (9) \right.$$

$$\left. \left( \frac{1}{2n+1} \sum_{m=j-n}^{j+n} P_{i-k,m} \right) * \left( \frac{1}{2n+1} \sum_{m=j-n}^{j+n} P_{i+k,m} \right) * c(k) \right]$$

The maximum value Pmax may be a maximum value of possible pixel values in the feature-quantity extraction image or may be a predetermined value equal to or greater than the maximum value.

A twenty seventh aspect of the invention provides the object detection apparatus of the twenty sixth aspect of the invention in which the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

When determining that a predetermined image area has high symmetry, the object detection apparatus can obtain the size of the image area determined to have high symmetry (e.g., the width in the first direction) at the same time. In other words, this object detection apparatus can extract the position and the size of an object included in an image at one time using the symmetry of the object.

The object detection apparatus can detect a highly symmetrical object with high accuracy using less arithmetic processing.

A twenty eighth aspect of the invention provides the object detection apparatus of one of the nineteenth, twentieth, and twenty second to twenty sixth aspects of the invention in which the weighting function c(k) is a monotonically increasing function of k.

This object detection apparatus calculates the symmetry evaluation value through weighting with a larger value as the area is more distant from the target pixel. Thus, the object detection apparatus can detect a highly symmetrical area (object) located distant from the symmetrical axis with high accuracy.

The monotonically increasing function is not limited to a strict monotonically increasing function, but it may include a range of values k in which the function does not change monotonically but may be constant (e.g., the function may include a non-variable range, or a range in which the function returns a constant value). The monotonically increasing function includes a function in which its output value globally increases with respect to its input value, such as a function that is regarded as a monotonically increasing function after smoothing the input-output characteristics curve defined by the function (e.g., processing with a low-pass filter).

A twenty ninth aspect of the invention provides the object detection apparatus of one of the nineteenth, twentieth, and twenty second to twenty sixth aspects of the invention in which the weighting function c(k) is a monotonically decreasing function of k.

This object detection apparatus calculates the symmetry evaluation value through weighting with a smaller value as the area is less distant from the target pixel. Thus, the object detection apparatus can detect a highly symmetrical area (object) located near the symmetrical axis with high accuracy.

The monotonically decreasing function is not limited to a strict monotonically decreasing function, but it may include a range of values k in which the function does not change monotonically but may be constant (e.g., the function may include a non-variable range, or a range in which the function is constant). The monotonically decreasing function includes a function in which its output value globally decreases with respect to its input value, such as a function that is regarded as a monotonically decreasing function after smoothing the input-output characteristics curve defined by the function (e.g., processing with a low-pass filter).

A thirtieth aspect of the invention provides the object detection apparatus of one of the seventeenth to twenty ninth aspects of the invention in which (1) when a value of a row i indicating a position of the target pixel in the first direction is equal to or less than H/2, the symmetry evaluation unit calculates the symmetry evaluation value by varying a value of w within a range of $1 \leq w \leq (i-1)$, where w is a half of the width of the symmetry evaluation area in the first direction and H is the number of pixels in the first direction of the image, and H is a natural number, and (2) when the value of the row i indicating the position of the target pixel in the first direction is greater than H/2, the symmetry evaluation unit calculates the symmetry evaluation value by varying the value of w within a range of $1 \leq w \leq (H-i)$.

This object detection apparatus ensures that the symmetry evaluation area is symmetrical with respect to the target pixel, and can detect the symmetry evaluation value using a maximum area among horizontally symmetrical areas with respect to the target pixel.

A thirty first aspect of the invention provides the object detection apparatus of one of the first to thirtieth aspects of the invention in which the image feature quantity is an edge intensity of the image.

This object detection apparatus can detect a highly symmetrical object by using an edge component of an image, and thus can detect an object having high symmetry at the contour (outline) of the object with high accuracy.

A thirty second aspect of the invention provides the object detection apparatus of one of the first to thirtieth aspects of the invention in which the image feature quantity is an intensity of a specific color component of the image.

This object detection apparatus can detect a highly symmetrical object by using a specific color component of an image, and thus can detect an object having high symmetry for a specific color component with high accuracy.

A thirty third aspect of the invention provides a non-transitory computer-readable storage medium having stored thereon a program enabling a computer to implement an object detection method. The object detection method includes an image input step, a feature quantity extraction step, a symmetry evaluation step, a center detection step, and an object area detection step.

In the image input step, an image is received.

In the feature quantity extraction step, a predetermined image feature quantity is extracted from the image to generate a feature-quantity extraction image.

In the symmetry evaluation step, symmetry in a first direction in the image, and a width of the symmetry in the first direction are evaluated for every processing target pixel in the feature-quantity extraction image.

In the center detection step, a pixel for which the evaluated symmetry exceeds a predetermined reference is detected from a plurality of evaluation pixels as a symmetry center pixel.

In the object area detection step, an object width in the first direction is detected for an object having symmetry included in the image based on the symmetry width of each symmetry center pixel, and an object width in a second direction orthogonal to the first direction is detected based on distribution of each symmetry center pixel in the second direction.

The program enabling the computer to implement the object detection method has the same advantageous effects as the object detection apparatus of the first aspect of the present invention.

A thirty fourth aspect of the invention provides the non-transitory computer-readable storage medium having stored thereon the program according to the thirty third aspect of the invention in which the symmetry evaluation step includes setting, for every processing target pixel, a symmetry evaluation area for evaluating symmetry in the first direction in the image in such a manner that the symmetry evaluation area is symmetrical with respect to a central axis in the second direction orthogonal to the first direction, and calculating a weighted value resulting from weighting a correlation value by an image feature quantity on a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the first-direction symmetry.

The program enabling the computer to implement the object detection method has the same advantageous effects as the object detection apparatus of the tenth aspect of the present invention.

A thirty fifth aspect of the invention provides the non-transitory computer-readable storage medium having stored thereon the program according to the thirty third aspect of the invention in which the symmetry evaluation step includes setting, for every processing target pixel, a symmetry evaluation area for evaluating symmetry in the first direction in the image in such a manner that the symmetry evaluation area is symmetrical with respect to a central axis in the second direction orthogonal to the first direction, and calculating a weighted value resulting from weighting a correlation value by a distance from the central axis to a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the first-direction symmetry.

The program enabling the computer to implement the object detection method has the same advantageous effects as the object detection apparatus of the seventeenth aspect of the present invention.

Advantageous Effects

The technique of the present invention enables the position and the size of an object to be detected based on symmetry of an object in an input image, and thus enables important information about an object (e.g., information about the position and the size of an object) to be detected using less arithmetic processing.

BRIEF DESCRIPTION OF DRAWINGS

FIG. 1OF shows a symmetry center map image 106.

FIGS. 14A and 14B are diagrams describing a method for obtaining a symmetry width wa.

FIG. 17A is a diagram showing example images generated in the steps of object detection implemented by an object detection system according to a sixth embodiment.

FIG. 17D shows a symmetry evaluation map image 204.

DESCRIPTION OF THE PREFERRED EMBODIMENTS

First Embodiment 1.1 Object Detection System

Figure 1:
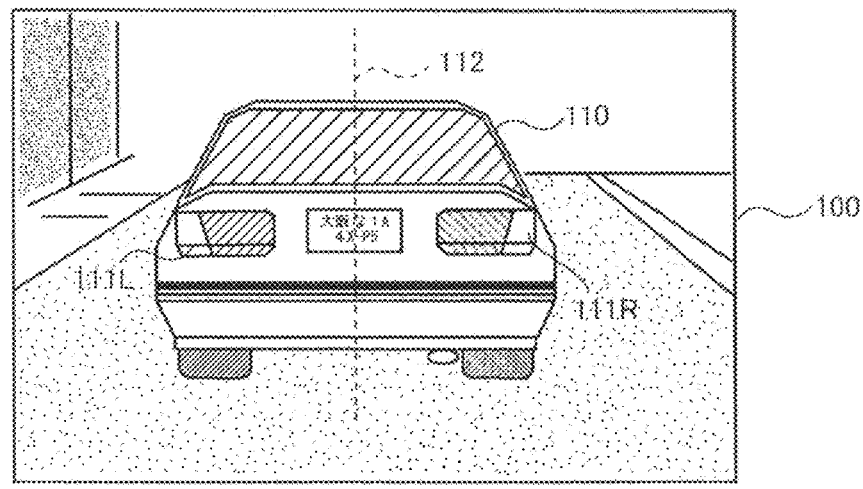
FIG. 1 shows a captured image 100 including a vehicle with symmetry.

A first embodiment of the present invention will now be described with reference to the drawings. FIG. 1 shows a captured image 100 including a vehicle 110 as a subject. The vehicle 110 includes right and left tail lamps 111R and 111L. The right and left tail lamps 111R and 111L are arranged symmetrical to each other with respect to a central axis 112 in the width direction of the vehicle 110. In the present embodiment, horizontal symmetry included in an image allows its use to detect an object, such as the vehicle 110.

Figure 2:
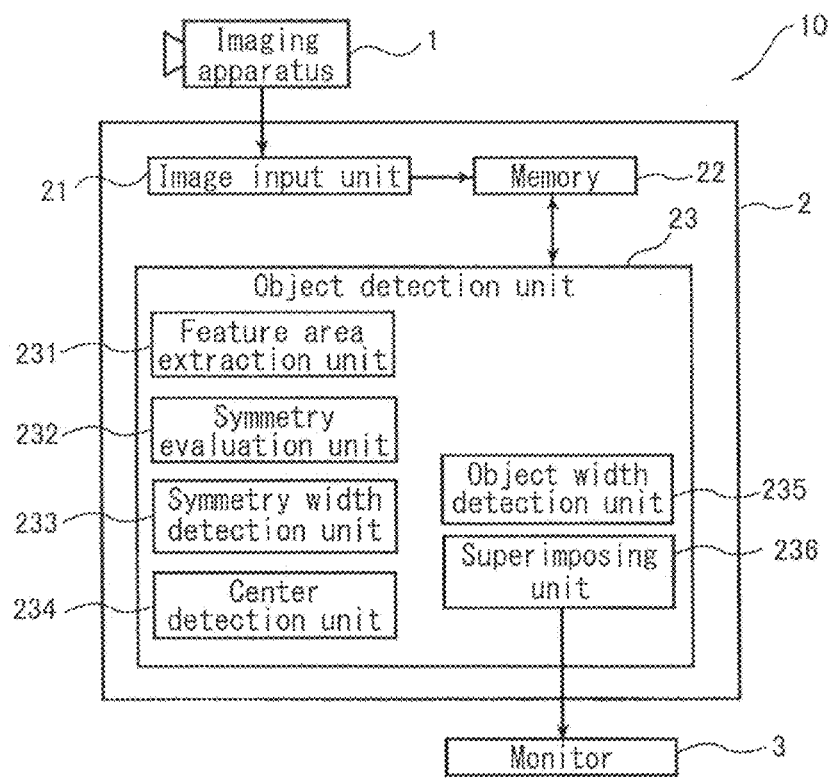
FIG. 2 is a block diagram of an object detection system 10 according to a first embodiment.

FIG. 2 is a block diagram of an object detection system 10 according to the first embodiment. The object detection system 10 includes an imaging apparatus 1, an object detection apparatus 2, and a monitor 3.

The imaging apparatus 1 includes an image sensor, such as a charge-coupled device (CCD). An image captured by the imaging apparatus 1 is input into the object detection apparatus 2.

In one example, the object detection apparatus 2 is mounted on a vehicle. When mounted on the front side of the vehicle, the imaging apparatus 1 captures an image of the environment in front of the vehicle. Alternatively, the imaging apparatus 1 may be mounted on the rear side of the vehicle to capture an image of the environment behind the vehicle. The monitor 3 is mounted on the driver's seat. In one example, the monitor 3 also serves as a monitor for a navigation system.

As shown in FIG. 2, the object detection apparatus 2 includes an image input unit 21, a memory 22, and an object detection unit 23.

The image input unit 21 receives an image output from the imaging apparatus 1. When, for example, the imaging apparatus 1 includes a CCD including an RGB Bayer array of color filters, the image input unit 21 receives a sequence of pixel signals including an R-component signal, a G-component signal, and a B-component signal. The image input unit 21 stores the input image into the memory 22.

The object detection unit 23 subjects the image stored in the memory 22 to image processing to detect an object having symmetry included in the image. The object detection unit 23 includes a feature area extraction unit 231, a symmetry evaluation unit 232, a symmetry width detection unit 233, a center detection unit 234, an object width detection unit 235, and a superimposing unit 236.

The feature area extraction unit 231, the symmetry evaluation unit 232, the symmetry width detection unit 233, the center detection unit 234, the object width detection unit 235, and the superimposing unit 236 are formed by hardware circuitry. These processing units may be entirely or partially implemented by software processing. In other words, these processing units may be implemented by software, and hardware that executes software, such as a central processing unit (CPU) and a memory.

An image output from the object detection unit 23 is displayed on the monitor 3. An area frame indicating the area of an object is superimposed on the image displayed on the monitor 3 to help the driver to easily identify the object.

1.2 Object Detection

Figure 3A:
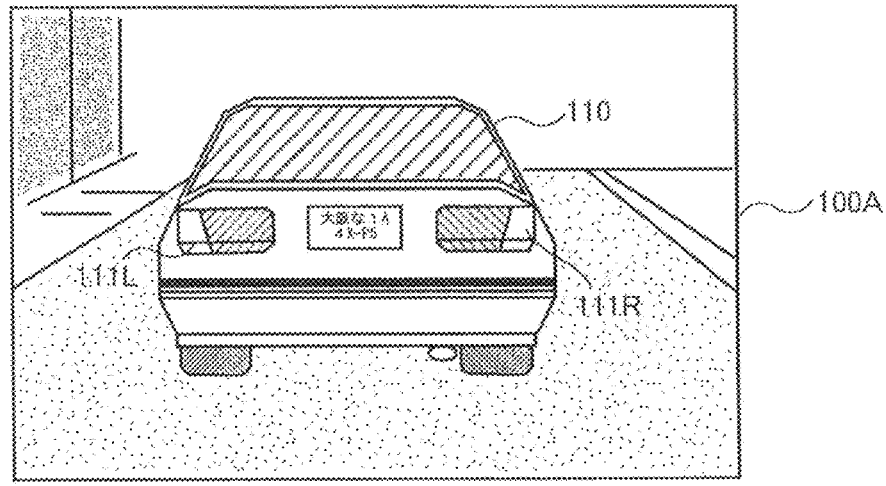
FIG. 3A shows a color image 100A including an object with symmetry.

An object detection process will now be described with reference to FIG. 2 and FIGS. 3A to 3G. FIG. 3A shows a color image 100A captured by the imaging apparatus 1. The color image 100A includes the vehicle 110. The vehicle 110 includes the tail lamps 111R and 111L mounted on its rear side.

The image input unit 21 receives an input color image 100A, and stores the image into the memory 22. When, for example, capturing an image at a frame rate of 15 fps, the image input unit 21 stores the color image 100A at a frame rate of 15 fps into the memory 22. The color image 100A is, for example, an image defined in the RGB color space.

The feature area extraction unit 231 obtains the color image 100A from the memory 22, and generates a luminance image 100B from the color image 100A.

Figure 3B:
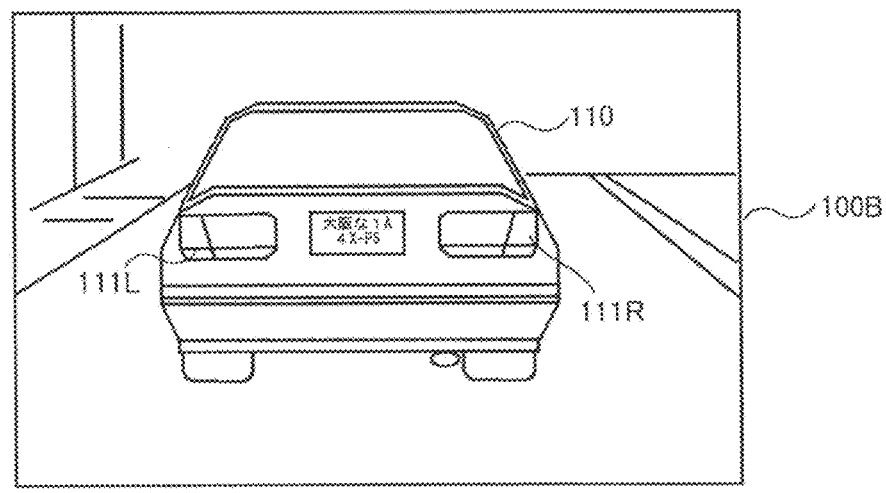
FIG. 3B shows a luminance image 100B generated by extracting a luminance component from the color image 100A.

FIG. 3B shows a luminance image 100B. When, for example, the color image 100A is defined in the RGB color space, the feature area extraction unit 231 converts the color image 100A to a YCbCr image. The feature area extraction unit 231 then extracts an image formed using the Y signal from the image defined in the YCbCr color space to generate the luminance image 100B.

Alternatively, the luminance image 100B may be generated by using the G signal in the RGB color space. For pixels having the R and B components, interpolation can generate the G signal.

Subsequently, the feature area extraction unit 231 subjects the luminance image 100B to edge detection to generate an edge image 100C.

Figure 3C:
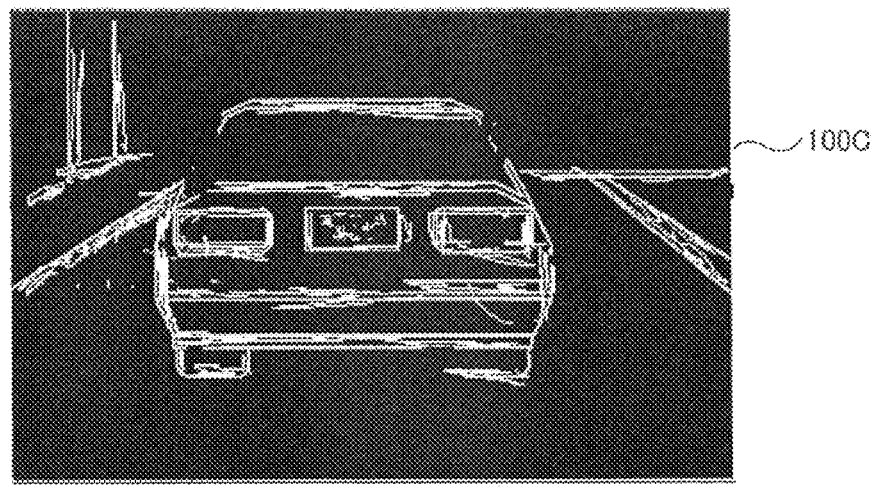
FIG. 3C shows an edge image 100C generated from the luminance image 100B.

FIG. 3C shows the edge image 100C. The feature area extraction unit 231 subjects the luminance image 100B to differentiation to generate the edge image 100C.

Subsequently, the symmetry evaluation unit 232 evaluates the symmetry of the edge image 100C. A method for evaluating the symmetry will be described below.

Figure 4:
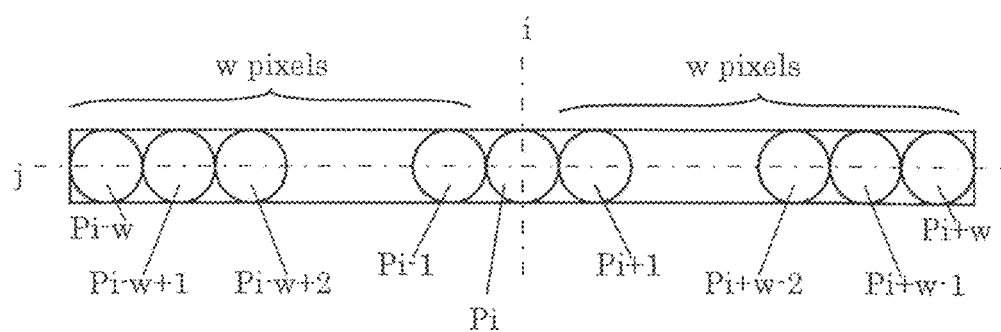
FIG. 4 is a diagram showing pixels located right and left to a target pixel $P_i$.

The symmetry evaluation unit 232 evaluates symmetry with respect to a target pixel P, shown in FIG. 4. The target pixel $P_i$ is a pixel included in the edge image 100C. The target pixel $P_i$ is located at coordinates (i, j) in the edge image 100C. A pixel $P_x$ hereafter refers to a pixel located at coordinates (x, j) in the edge image 100C. More specifically, the pixel $P_x$ refers to a pixel in the x-th row in the horizontal direction and in the j-th column in the vertical direction. In formulae, $P_x$ is the pixel value of the pixel $P_x$. In the present embodiment, $P_x$ is a value ranging from 0 to 255.

FIG. 4 shows w pixels ($P_{i-w}$ to $P_{i-1}$), which are located left to the target pixel Pi, and w pixels ($P_{i+1}$ to $P_{i+w}$), which are located right to the target pixel $P_i$. The arithmetic operation corresponding to Formula 10 is used to evaluate the symmetry of the 2w+1 pixels ($P_{i-w}$ to $P_{i+w}$).

Formula 10

$$SYM_w(i, j) = \frac{1}{w}\sum_{k=1}^{w}(255 - |P_{i-k} - P_{i+k}|) \tag{10}$$

In Formula 10, $SYM_w(i, j)$ is an evaluation value for the symmetry, and k is an integer ranging from 1 to w.

The pixels $P_{i-k}$ and $P_{i+k}$ are at horizontally symmetrical positions with respect to the target pixel $P_i$. When the pixels $P_{i-k}$ and $P_{i+k}$ have the same pixel value, the difference between the pixels, or the value $|P_{i-k}-P_{i+k}|$, is a minimum value of 0. In this case, the value $(255-|P_{i-k}-P_{i+k}|)$ is a maximum value of 255. In Formula 10, the evaluation value $SYM_w(i, j)$ is larger as the symmetry is higher. When the w pixels located left to the target pixel $P_i$ have the completely same values as the corresponding w pixels located right to the target pixel $P_i$, the evaluation value $SYM_w(i, j)$ is a maximum value of 255.

The symmetry evaluation unit 232 calculates the evaluation value $SYM_w(i, j)$ for each of all the possible values of w with respect to the target pixel $P_i$ by varying the width w. The symmetry evaluation unit 232 then calculates a maximum value maxSYM of the evaluation value $SYM_w(i, j)$ for the target pixel $P_i$ as in Formula 11.

Formula 11

$$maxSYM = \max(SYM_1(i,j), SYM_2(i,j), \ldots, SYM_{N-1}(i,j), SYM_N(i,j)) \tag{11}$$

In Formula 11, N is a maximum value of the width w. The maximum value N is i−1 when the row value i, which indicates the horizontal position of the target pixel, is H/2 or less, where H is the number of pixels in the horizontal direction of the edge image 100C. The maximum value N is H−i when the row value i indicating the horizontal position of the target pixel is greater than H/2.

The symmetry width detection unit 233 obtains the width w that returns the maximum value maxSYM as the symmetry width wa. When w=wa, the evaluation value $SYM_w(i, j)$ is the maximum value maxSYM. The maximum value maxSYM is written as Formula 12 using the symmetry width wa.

Formula 12

$$\mathrm{max}SYM = SYM_{wa}(i,j) \quad (12)$$

Figure 3D:
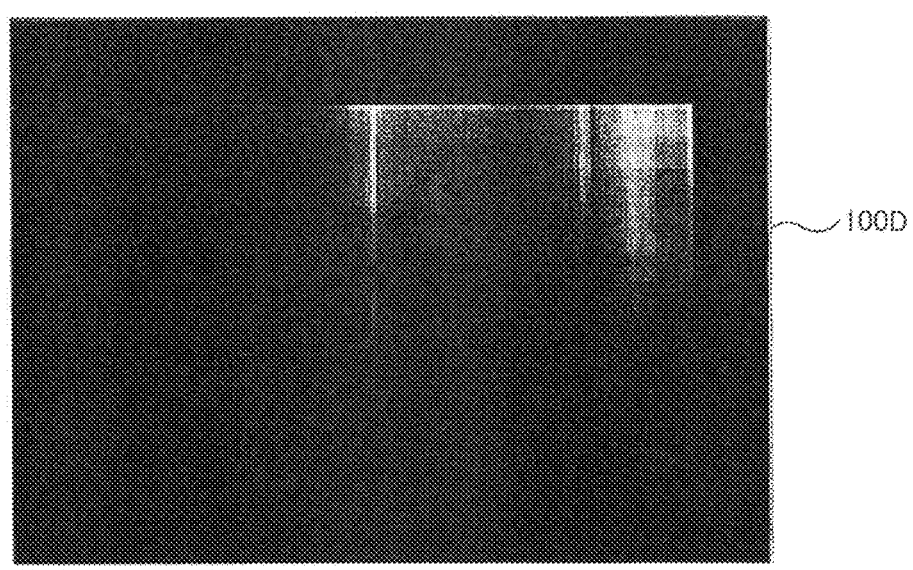
FIG. 3D shows a symmetry map 100D.

The symmetry evaluation unit 232 performs the arithmetic processing written as Formulae 10 and 11 for each of all target pixels for which symmetry is to be evaluated, and generates a symmetry map 100D shown in FIG. 3D. The present embodiment uses each of all pixels forming the edge image 100C as an evaluation target pixel. In other words, the value $SYM_w(i, j)$ is calculated for each of all pixels included in the edge image 100C, and the maximum value maxSYM is calculated.

To reduce the arithmetic processing or to improve the processing speed, selected pixels in the edge image 100C may be used as evaluation target pixels. For example, only pixels in odd-numbered lines or pixels in even-numbered lines in the horizontal (or vertical) direction may be used as evaluation target pixels. Alternatively, fewer pixels, or for example pixels selected at every three lines, may be used as evaluation target pixels.

The symmetry map 100D includes, as its map element, the maximum value maxSYM calculated for each evaluation target pixel. The symmetry map 100D can also be seen as an image in which each evaluation target pixel has its corresponding calculated maximum value maxSYM as the pixel value. FIG. 3D shows an image representing the symmetry map 100D.

The present embodiment uses each of all pixels forming the edge image 100C as an evaluation target pixel. In this case, the symmetry map 100D is a grayscale image in which the pixel value of each of all the pixels of the edge image 100C is replaced with the corresponding maximum value maxSYM.

As described above, the evaluation value $SYM_w(i, j)$ can be a value ranging from 0 to 255 in the present embodiment. Thus, each element of the symmetry map 100D can be a value ranging from 0 to 255. In FIG. 3D, a color closer to white represents a larger evaluation value $SYM_w(i, j)$ (closer to 255). In FIG. 3D, a color closer to white represents an area evaluated to have high symmetry, indicating that the area is near the center of a target object. In FIG. 3D, a color closer to black represents an area having low symmetry.

Figure 3E:
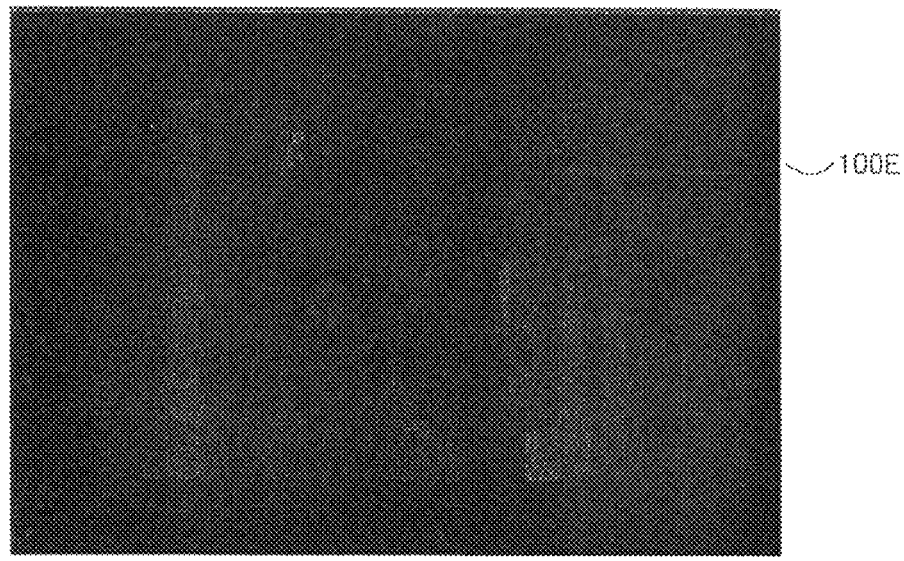
FIG. 3E shows a symmetry width map 100E.

The symmetry width detection unit 233 generates a symmetry width map 100E shown in FIG. 3E for each of all evaluation target pixels for which symmetry is to be evaluated.

The symmetry width map 100E includes, as its map element, the symmetry width wa that returns the maximum value maxSYM for each evaluation target pixel. The symmetry width map 100E can also be seen as an image in which each evaluation target pixel has the corresponding symmetry width wa as its pixel value. FIG. 3E shows an image representing the symmetry width map 100E. The present embodiment uses each of all pixels forming the edge image 100C as an evaluation target pixel. In this case, the symmetry width map 100E is a grayscale image in which the pixel value of each of all the pixels of the edge image 100C is replaced with the corresponding symmetry width wa.

In the present embodiment, the symmetry width wa can be a value ranging from 1 to N as described above. Thus, each element of the symmetry width map 100E can be a value ranging from 1 to N. The value N differs depending on the pixel position. In FIG. 3E, a color closer to white represents an area with a larger symmetry width wa. In FIG. 3E, a color closer to black represents an area with a smaller symmetry width wa.

The center detection unit 234 subsequently refers to the symmetry map 100D and generates a symmetry center map 100F. The center detection unit 234 selects a pixel that returns a local maximum point of the maximum values maxSYM in each horizontal line of the symmetry map 100D, and uses the selected pixel as a symmetry center pixel.

Figure 5:
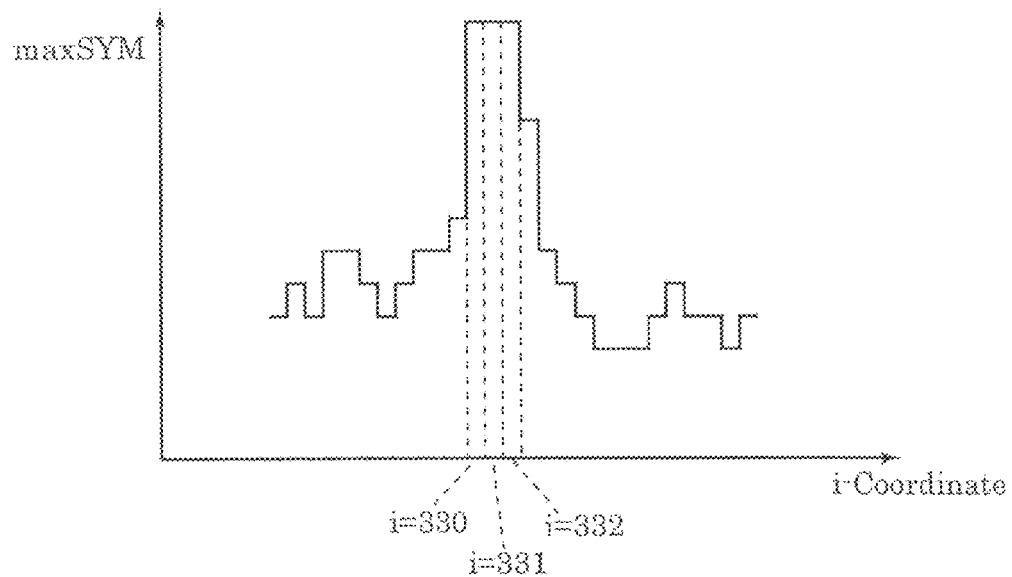
FIG. 5 is a graph showing changes in a symmetry map 100D in the horizotanl direction.

FIG. 5 is a graph showing changes in the symmetry map 100D in the horizontal direction. FIG. 5 is a graph showing changes in the value maxSYM for one horizontal line of the symmetry map 100D. In this figure, the symmetry map 100D shows a maximum local point at three coordinates 330, 331, and 332 in a row (i-coordinates) each indicating a horizontal position. The center detection unit 234 identifies the coordinates corresponding to a maximum local point for each of all horizontal lines.

Figure 3F:
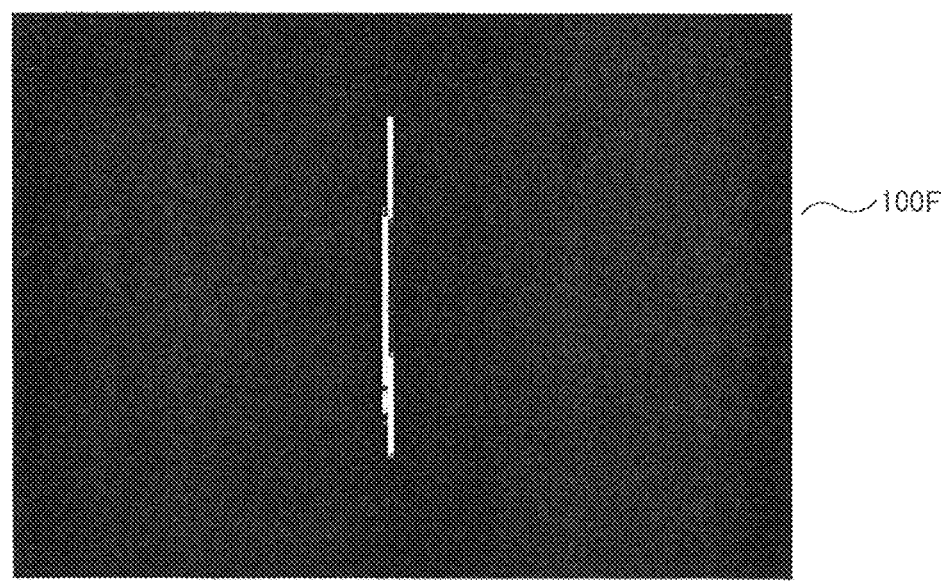
FIG. 3F shows a symmetry center map 100F.

FIG. 3F shows a symmetry center map 100F plotting pixels corresponding to the symmetry center identified by the center detection unit 234. The symmetry center map 100F can be seen as an image in which pixels at the coordinates determined as symmetry center pixels have a value of 1 and pixels at the coordinates not determined as symmetry center pixels have a value of 0. In FIG. 3F, a white portion indicates a pixel determined as a symmetry center pixel. The pixel value of each pixel corresponding to a maximum local point is compared with a predetermined threshold. When the pixel value exceeds the threshold, the pixel is determined as a symmetry center pixel. This eliminates maximum local points resulting from minor variations.

Subsequently, the object width detection unit 235 detects the horizontal width and the vertical width of a symmetrical object included in the edge image 100C.

The object width detection unit 235 uses the symmetry center map 100F and the symmetry width map 100E to obtain the horizontal width of the object. In the symmetry center map 100F, the pixels forming the central axis of the symmetrical object each have a pixel value of 1. The object width detection unit 235 extracts pixels with a pixel value of 1 in the symmetry center map 100F, and obtains the symmetry width of each extracted pixel from the symmetry width map 100E. In the present embodiment, the symmetry width is obtained for each of all the symmetry center pixels. When a single horizontal line includes a plurality of symmetry center pixels, the average of the pixel values is used as the symmetry width for the horizontal line. The symmetry width is obtained for each of all the horizontal lines. The maximum width of the obtained symmetry width values is then detected as the width of the object. When a single horizontal line includes a plurality of symmetry center pixels, the maximum value of the pixel values may be used as the symmetry width for the horizontal line.

Alternatively, the object width detection unit 235 may first determine the symmetry width for each horizontal line, and then may use the average of the obtained symmetry width values as the width of the object. When the maximum value or the average value of the symmetry width is used as the width of the object in the horizontal direction, the width of the object is expressed using a single value. Alternatively, the width of the object may be determined for each horizontal line.

The object width detection unit 235 uses the width of the symmetry center pixels arranged in the vertical direction as the width of the object in the vertical direction. More specifically, the object width detection unit 235 determines the upper end of the symmetry center pixels arranged sequentially in the vertical direction as the upper end of the object, and determines the lower end of the symmetry center pixels arranged sequentially in the vertical direction as the lower end of the object.

Figure 3G:
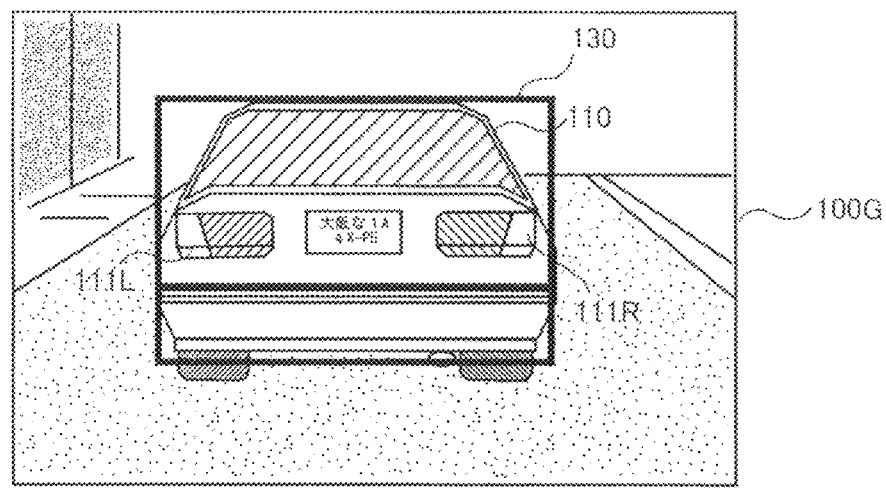
FIG. 3G shows a composite image 100G including a superimposed area frame 130.

The superimposing unit 236 generates a rectangular image having the horizontal width and the vertical width of the object determined by the object width detection unit 235, and superimposes the generated rectangular image on the color image 100A. FIG. 3G shows a composite image 1000, which is generated by superimposing an area frame 130 indicating the area corresponding to the vehicle 110 that is a symmetrical object, onto the color image 100A. When the width of the object is determined for each horizontal line, the area frame is not rectangular but is shaped in conformance with the contour of the object.

In the present embodiment described above, the position and the size of an object can be extracted at one time using the symmetry of the object included in the image.

Second Embodiment

In the first embodiment, the feature area extraction unit 231 uses an edge component as the feature quantity of an object. The symmetry is then evaluated based on the edge component extracted as the feature quantity.

In the second embodiment, the feature area extraction unit 231 uses a specific color component as the feature quantity of an object. For example, the feature area extraction unit 231 extracts a red component as the feature quantity. The feature area extraction unit 231 converts, for example, an image defined in the RGB color space stored in the memory 22 to an image defined in the YCbCr color space. The feature area extraction unit 231 extracts the Cr component from the image defined in the YCbCr color space to generate a Cr image. The feature area extraction unit 231 further subjects the Cr image to enhancement of a red component to generate an R-component image.

The processing performed subsequently is the same as in the first embodiment. More specifically, the same processing as described in the first embodiment is performed on the R-component image, which replaces the edge image in the first embodiment, to detect a symmetrical object in the image. As described above, the present embodiment also uses a specific color component of an image to detect the symmetry of an object included in the image, enabling the position and the size of the object to be detected at one time.

Figure 6:
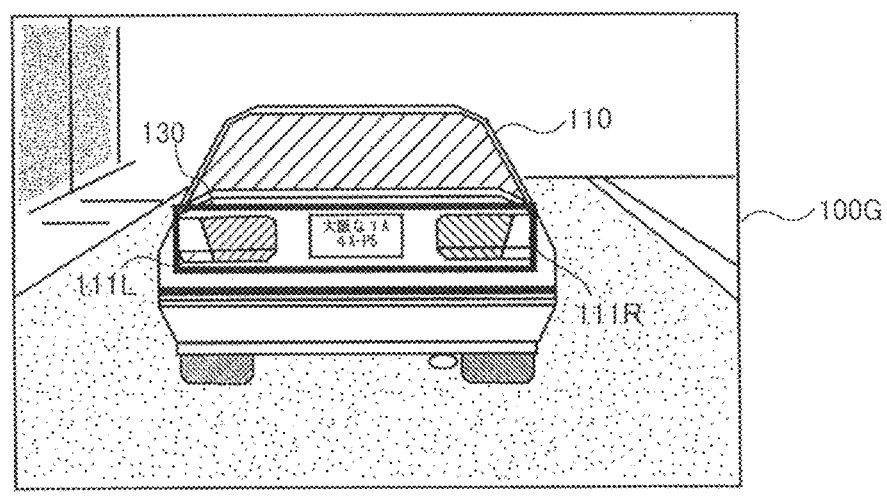
FIG. 6 shows a composite image 100G including a superimposed area frame 130.

FIG. 6 shows a composite image 100G displayed on a monitor 3 in the second embodiment. In the first embodiment, the symmetry of an object is evaluated using an edge component. In this case, the size of the entire vehicle is extracted as the size of the object. In contrast, the symmetry of an object is evaluated mainly using the red color of the tail lamps in the second embodiment. In this case, the area including the tail lamps is extracted.

The first embodiment and the second embodiment may be combined with each other. More specifically, an edge image is used to determine the vertical width and position of an object and the horizontal width and position of the object. Additionally, a specific color component image is used to determine the vertical width and position of the object and the horizontal width and position of the object. The average of the resulting values is then calculated to determine the position and the size of the object. Alternatively, either the values obtained from the edge image or the values obtained from the color component image may be weighted, and the resulting values may be used to determine the position and the size of the object.

Third Embodiment

In the first embodiment, an object having symmetry in the horizontal direction is detected. An object having symmetry in the vertical direction may be detected in the same manner. More specifically, an object having symmetry in the vertical direction may be obtained through the processing performed by reversing the direction of processing between the horizontal and vertical directions in the first embodiment.

Fourth Embodiment

In the first embodiment, an object having symmetry in the horizontal direction is detected. An object having symmetry both in the horizontal and vertical directions may be excluded from a detection target, and an object having symmetry only in the horizontal direction may be detected.

The evaluation value for symmetry written as Formula 10 is calculated in both the horizontal direction and the vertical direction. The evaluation value calculated in the horizontal direction is $SYMwH(i, j)$. The evaluation value calculated in the vertical direction is $SYMwV(i, j)$.

The arithmetic processing written as Formula 13 is performed to calculate a value $SYMwC(i, j)$ to be compared, which is based on both the symmetry in the horizontal direction and the symmetry in the vertical direction.

Formula 13

$$SYM_wC(i,j) = SYM_wH(i,j) * \{255 - SYM_wV(i,j)\} \qquad (13)$$

The same processing as in the first embodiment is performed to detect the position and the size of the object except that the value $SYM_w(i, j)$ in the first embodiment is replaced with the value $SYMwC(i, j)$.

Fifth Embodiment

A fifth embodiment will now be described with reference to the drawings.

5.1 Structure of Object Detection System

Figure 7:
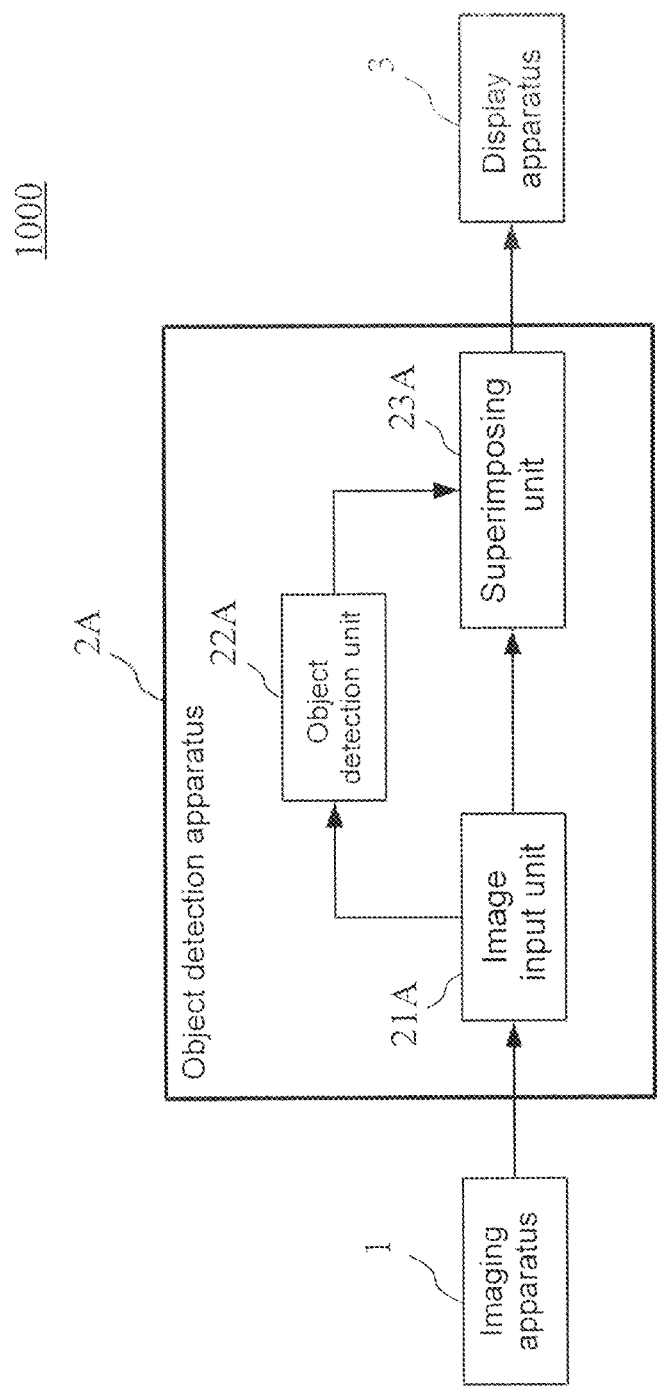
FIG. 7 is a block diagram of an object detection system 1000 according to a fifth embodiment.

FIG. 7 is a block diagram of an object detection system 1000 according to a fifth embodiment. The object detection system 1000 includes an imaging apparatus 1, an object detection apparatus 2A, and a display apparatus 3.

The imaging apparatus 1 includes an optical system (not shown) and an image sensor. The optical system focuses light from a subject. The image sensor, which may be, for example, a charge-coupled device (CCD) image sensor or a complementary metal oxide semiconductor (CMOS) image sensor (not shown), converts the light focused through the optical system to image signals (electrical signals) by photoelectric conversion. The imaging apparatus 1 outputs the image captured by the image sensor (image signals) to the object detection apparatus 2A.

The object detection apparatus 2A receives image signals output from the imaging apparatus 1, and detects a symmetrical object included in an image formed using the input image signals, and outputs an image (image signals) indicating the detection result to the display apparatus 3.

In one example, the object detection apparatus 2A is mounted on a vehicle. When mounted on the front side of the vehicle, the imaging apparatus 1 captures an image (scene) of the environment in front of the vehicle. Alternatively, the imaging apparatus 1 may be mounted on the rear side of the vehicle to capture an image (scene) of the environment behind the vehicle.

The display apparatus (monitor) 3 is mounted on, for example, the driver's seat of the vehicle. The display apparatus 3 may also function as a monitor for a navigation system.

As shown in FIG. 7, the object detection apparatus 2A includes an image input unit 21A, an object detection unit 22A, and a superimposing unit 23A.

The image input unit 21A receives an image (image signals) output from the imaging apparatus 1. When, for example, the imaging apparatus 1 includes a CCD image sensor including an RGB Bayer array of color filters, the image input unit 21A receives a sequence of pixel signals including an R-component signal, a G-component signal, and a B-component signal. The image input unit 21A converts the input image signals to signals in a predetermined format as appropriate, and outputs the resulting image signals (unconverted image signals when no conversion is performed) to the object detection unit 22A. The image input unit 21A outputs the input image signals to the superimposing unit 23A.

The conversion into a predetermined format refers to, for example, conversion from one color space to the other (e.g., conversion from the RGB color space to the YCbCr color space). The image input unit 21A converts, as appropriate, the input image signals defined in the RGB color space (an R-component signal, a G-component signal, and a B-component signal) to, for example, signals defined in the YCbCr color space (a Y-component signal, a Cb-component signal, and a Cr-component signal).

In the example described below, for ease of explanation, the input image signals in the RGB color space (an R-component signal, a G-component signal, and a B-component signal) are converted to signals in the YCbCr color space (a Y-component signal, a Cb-component signal, and a Cr-component signal) in the image input unit 21A.

The object detection unit 22A receives an image (image signals) output from the image input unit 21A, and subjects the input image to predetermined image processing to detect a symmetrical object included in an image formed using the image signals (e.g., a frame image) (identifies an image area corresponding to a symmetrical object). The object detection unit 22A outputs the detection result (e.g., information identifying an image area corresponding to a symmetrical object) to the superimposing unit 23A.

Figure 8:
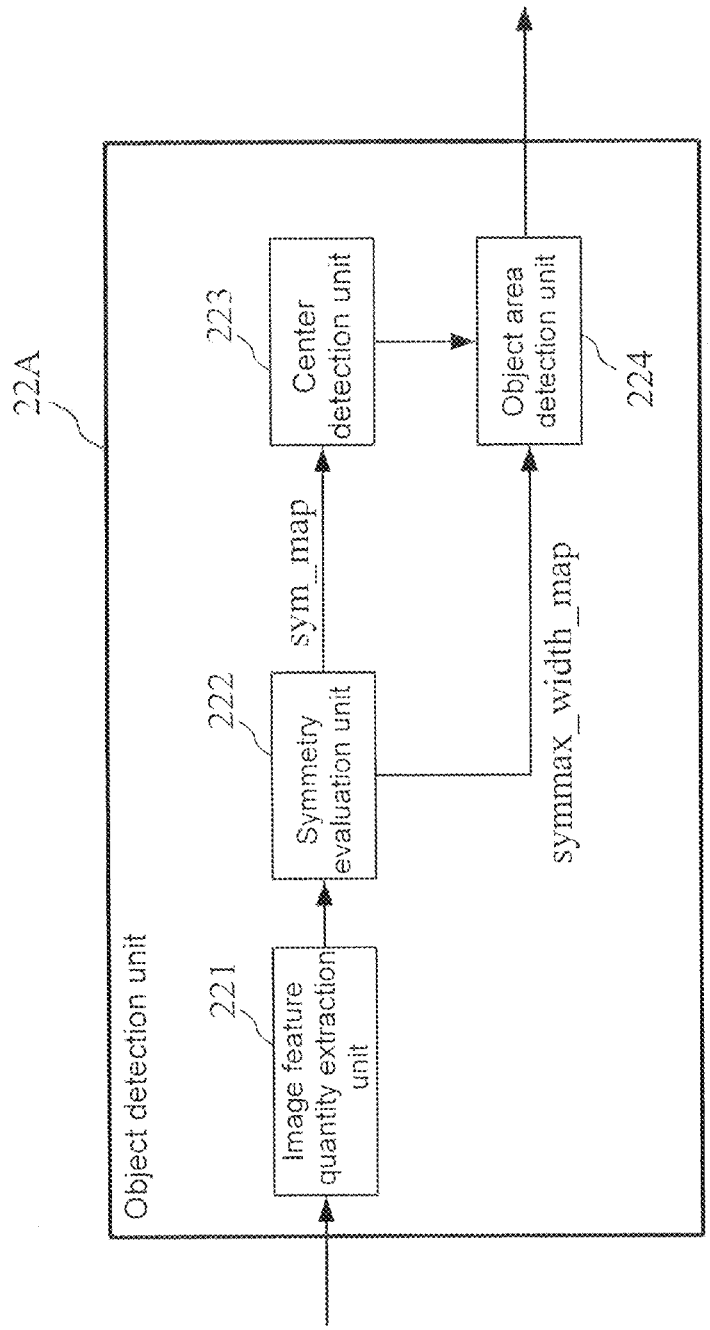
FIG. 8 is a block diagram of an object detection unit 22A according to the fifth embodiment.

As shown in FIG. 8, the object detection unit 22A includes an image feature quantity extraction unit 221, a symmetry evaluation unit 222, a center detection unit 223, and an object area detection unit 224.

The image feature quantity extraction unit 221 calculates (extracts) an image feature quantity from an image output from the image input unit 21A. More specifically, the image feature quantity extraction unit 221 performs differential arithmetic processing using the Sobel filter and extracts, for example, an edge component as an image feature quantity from a Y-component image (luminance component image) formed using a Y-component signal (luminance component signal) output from the image input unit 21A. The image feature quantity extraction unit 221 outputs an image in which each pixel has the extracted edge component as its pixel value (feature-quantity extraction image) to the symmetry evaluation unit 222 and the object area detection unit 224 as an image feature-quantity extraction image.

For ease of explanation, the pixel value of each pixel in the feature-quantity extraction image is hereafter larger as the image feature quantity to be extracted is larger.

The symmetry evaluation unit 222 receives an image (feature-quantity extraction image) extracted from the image feature quantity extraction unit 221. For the feature-quantity extraction image, the symmetry evaluation unit 222 evaluates (determines) symmetry of each pixel in a predetermined direction (e.g., the horizontal direction) in an image, and determines (estimates) the width of an image area (width in the predetermined direction, or for example the horizontal direction). The symmetry evaluation unit 222 obtains symmetry evaluation map data indicating the correspondence for each pixel between information identifying each pixel (processing target pixel) (e.g., the coordinates of each pixel) and a value indicating the degree of symmetry evaluated (determined) for the pixel (or a value correlated with this value).

Further, the symmetry evaluation unit 222 obtains symmetry width map data indicating the correspondence for each pixel between information identifying each pixel (processing target pixel) (e.g., the coordinates of each pixel) and a value indicating the width of a highly symmetrical image area evaluated (determined) for the pixel (the width in the predetermined direction, or for example the horizontal direction) (or a value correlated with this value).

The symmetry evaluation unit 222 outputs the obtained symmetry evaluation map data to the center detection unit 223. The symmetry evaluation unit 222 also outputs the obtained symmetry width map data to the object area detection unit 224.

The center detection unit 223 receives the symmetry evaluation map data obtained by the symmetry evaluation unit 222. The center detection unit 223 identifies a pixel or a pixel area having a maximum local value (or a value close to a maximum local value) in the predetermined direction in the image (e.g., the horizontal direction) when the symmetry evaluation map data is a two-dimensional image (an image generated through mapping of symmetry evaluation values serving as the pixel values of the pixels), and determines (estimates) the position of the central axis of the highly symmetrical object based on the identified pixel or pixel area. The center detection unit 223 then outputs information about the position of the central axis (in the image) of the determined (estimated) highly symmetrical object to the object area detection unit 224.

The object area detection unit 224 receives the symmetry width map data obtained by the symmetry evaluation unit 222, and the information about the position of the central axis (in the image) of the highly symmetrical object output from the center detection unit 223. The object area detection unit 224 detects the highly symmetrical object based on the symmetry width map data, and the information about the position of the central axis (in the image) of the highly symmetrical object, and identifies an area corresponding to the detected highly symmetrical object in the image. The object area detection unit 224 then outputs information about the identified image area corresponding to the highly symmetrical object in the image to the superimposing unit 23A.

The superimposing unit 23A receives the image output from the image input unit 21A, and the information identifying the image area corresponding to the detected highly symmetrical object in the image output from the object area detection unit 224 of the object detection unit 22A. The superimposing unit 23A generates (superimposes) an image indicating the image area corresponding to the highly symmetrical object on the image output from the image input unit 21A based on the information about the image area corresponding to the detected highly symmetrical object output from the object area detection unit 224. The superimposing unit 23A generates (superimposes) an image of a rectangular frame indicating the image area corresponding to the highly symmetrical object on the image output from the image input unit 21A. The superimposing unit 23A then outputs the resulting composite image to the display apparatus 3.

The display apparatus 3 receives the image output from the superimposing unit 23A of the object detection apparatus 2, and displays the image.

5.2 Operation of Object Detection System

The operation of the object detection system 1000 with the above-described structure will now be described with reference to the drawings.

Figure 9:
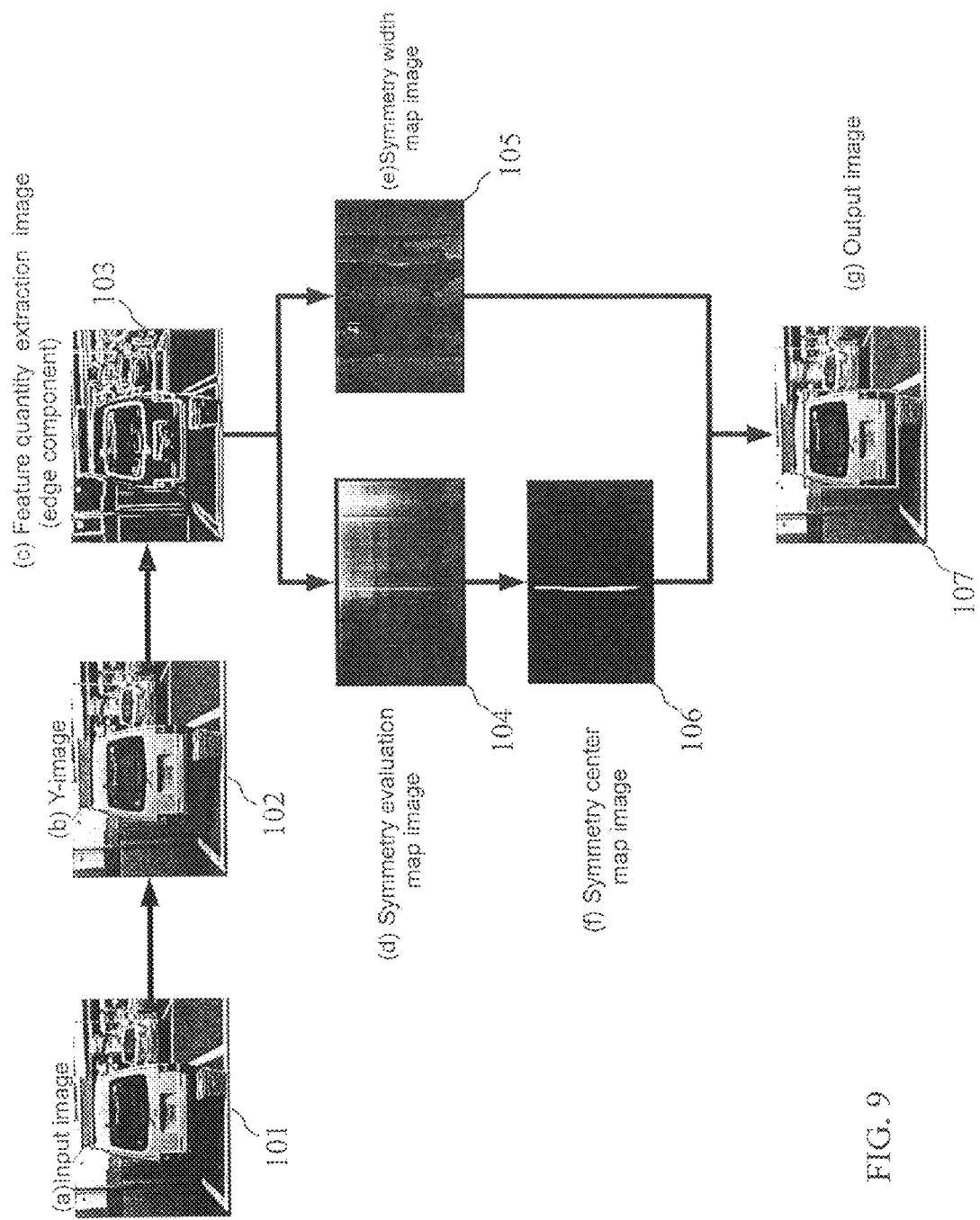
FIG. 9 is a diagram showing example images generated in the steps of object detection implemented by the object detection system 1000 of the fifth embodiment.

FIG. 9 shows example images generated in the steps of object detection implemented by the object detection system 1000.

Figure 10A:
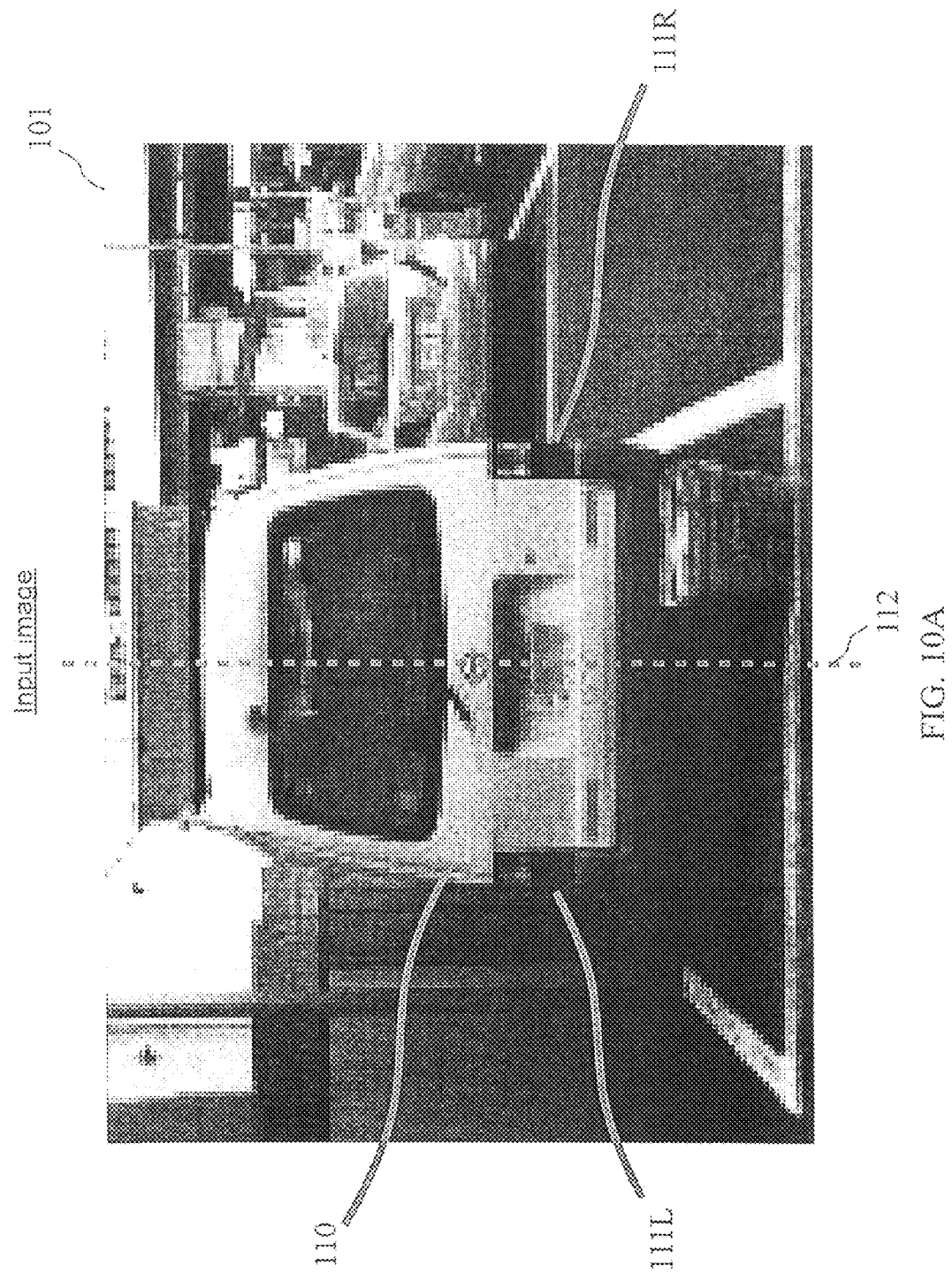
FIG. 10A shows an input image 101 including a symmetrical object.

FIG. 10A shows a captured image 101 captured by the imaging apparatus 1 and input into the object detection apparatus 2.

As shown in FIG. 10A, the captured image 101 includes a vehicle 110 as a subject. The vehicle 110 includes right and left tail lamps 111R and 111L. The right and left tail lamps 111R and 111L are arranged symmetrical to each other with respect to a central axis 112 in the width direction of the vehicle 110.

In the example described below, the captured image 101 shown in FIG. 10A is captured by the imaging apparatus 1, and the captured image 101 is processed by the object detection apparatus 2.

The captured image 101 (an image signal forming the captured image 101) obtained by the imaging apparatus 1 is input into the image input unit 21A of the object detection apparatus 2. The captured image 101 is formed by the R-component signal, the G-component signal, and the B-component signal.

The image input unit 21A subjects the input captured image to color space conversion. More specifically, the image input unit 21A converts the RGB color space to, for example, the YCbCr color space to form the captured image 101. The R-component signal, the G-component signal, and the B-component signal are converted to the Y-component signal, the Cb-component signal, and the Cr-component signal.

The image input unit 21A outputs a Y-image (luminance image) formed by the Y-component signal (luminance signal) to the image feature quantity extraction unit 221 of the object detection unit 22A. The image input unit 21 outputs the input captured image to the superimposing unit 23A.

Figure 10B:
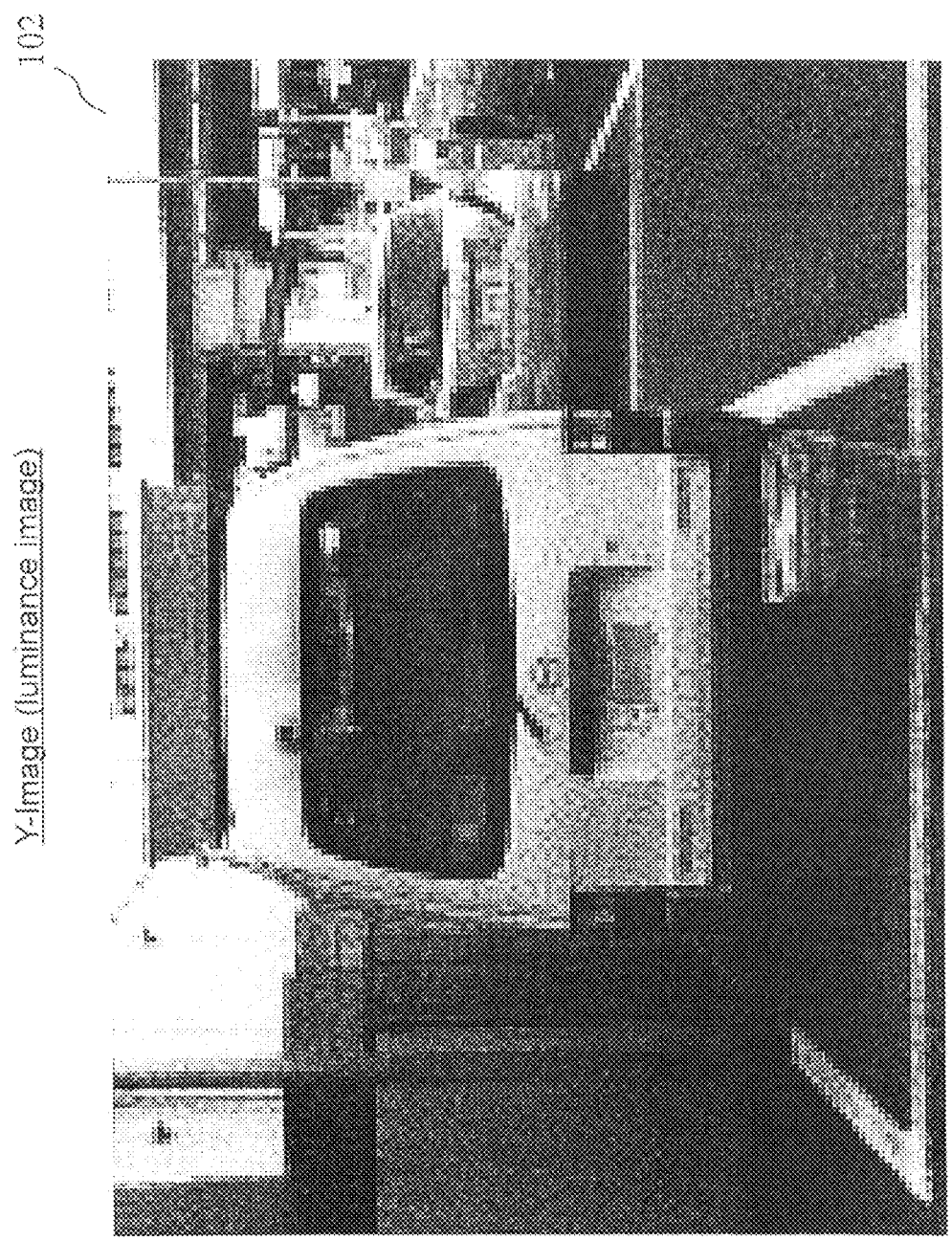
FIG. 10B shows a luminance image 102 generated by extracting a luminance component from the input image 101.

FIG. 10B shows a Y-image (luminance image) 102 obtained by the image input unit 21A.

The color space conversion performed by the image input unit 21A should not be limited to the above-described process, but may be, for example, conversion from the RUB color space to another color space, such as the Lab color space and the YPbPr color space.

Alternatively, the luminance image 102 may be generated by using the G-signal of the RGB color space. For pixels having the R and B components, interpolation can generate the G signal.

The color space processing may be performed by using a memory (not shown) such as a frame memory that can store image signals.

The image feature quantity extraction unit 221 subjects the Y image (luminance image) 102 obtained by the image input unit 21A to the processing to calculate (extract) an image feature quantity. In the present embodiment, a physical quantity correlated with an edge component of luminance is used as an image feature quantity.

More specifically, the image feature quantity extraction unit 221 in the present embodiment subjects the luminance image 102 to an edge detection process to generate a feature-quantity extraction image (edge image) 103.

Figure 10C:
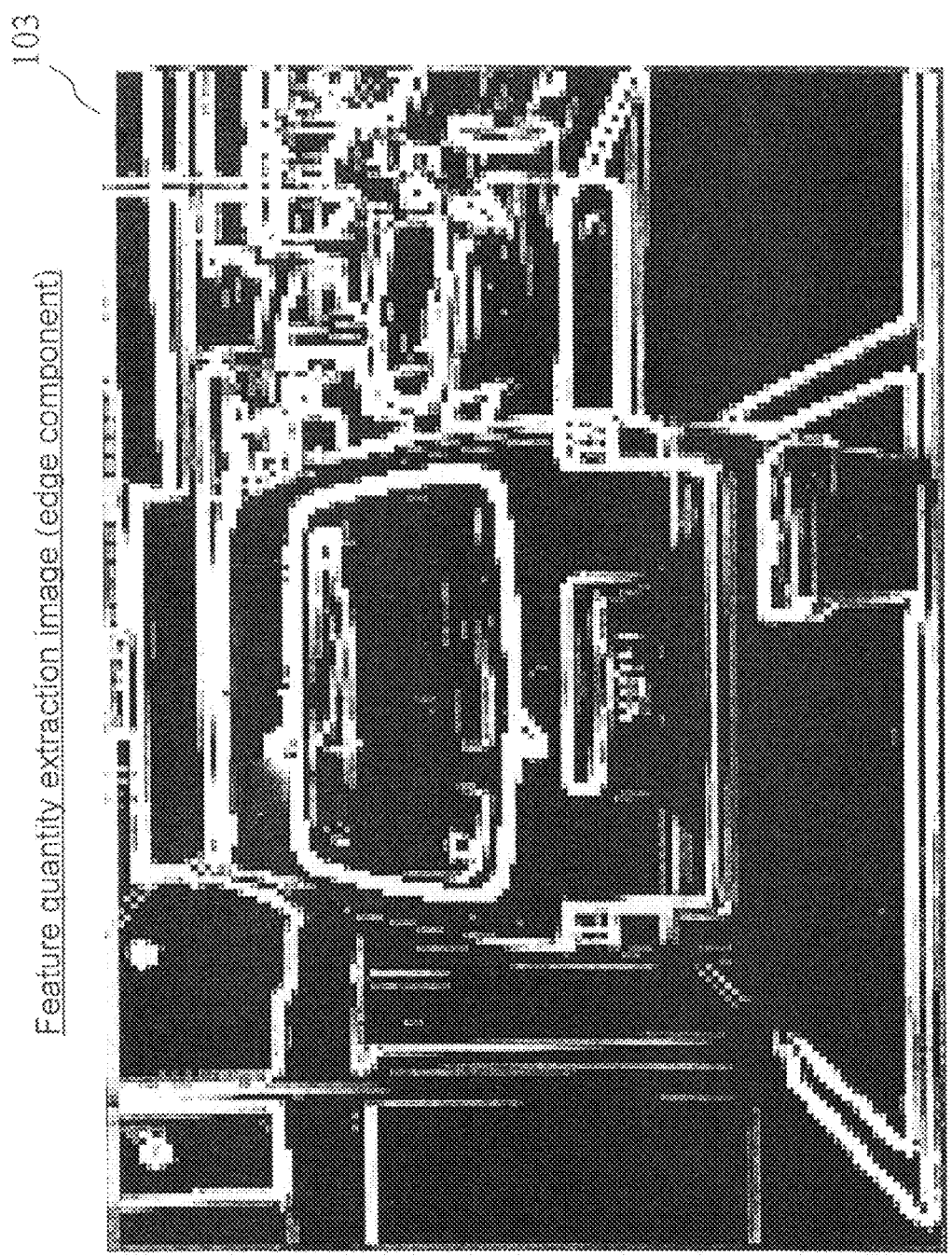
FIG. 10C shows an edge image 103 generated from the luminance image 102.

FIG. 10C shows a feature-quantity extraction image (edge image) 103 obtained by the image feature quantity extraction unit 221. The image feature quantity extraction unit 221 subjects the luminance image 102 to, for example, differential arithmetic processing (e.g., filtering using the Sobel filter) to generate the feature-quantity extraction image (edge image) 103.

Subsequently, the symmetry evaluation unit 222 evaluates the symmetry of the edge image 103 obtained by the image feature quantity extraction unit 221. A method for evaluating the symmetry will now be described.

5.2.1 Method for Evaluating Symmetry

Figure 11:
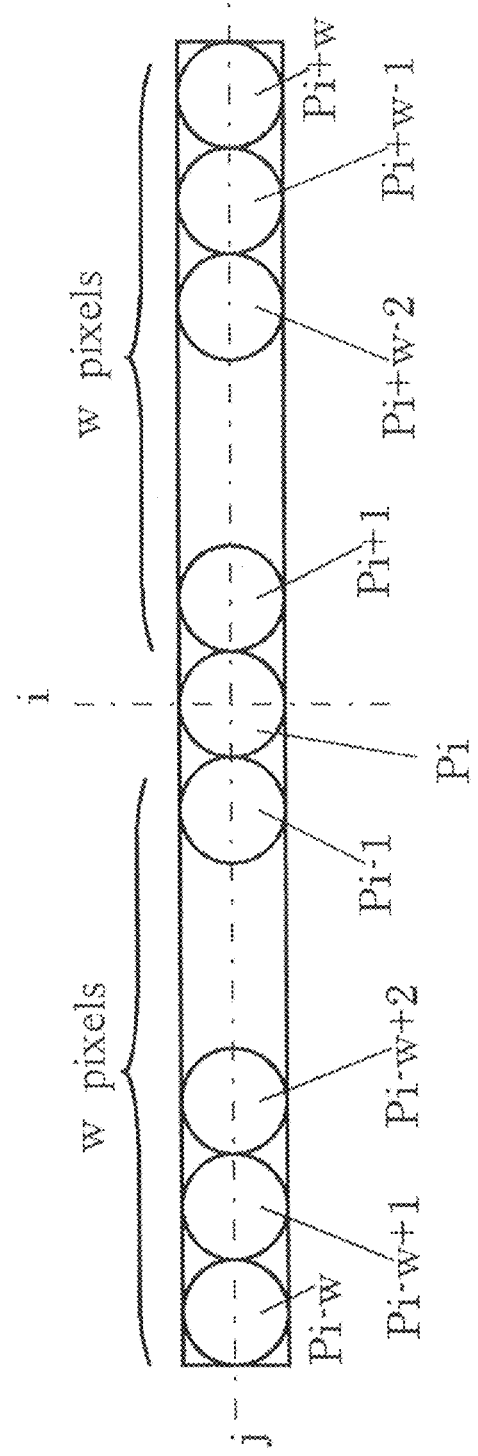
FIG. 11 is a diagram of pixels located right and left to a target pixel $P_i$.

The symmetry evaluation unit 222 evaluates the symmetry with respect to a target pixel $P_i$ shown in FIG. 11. The target pixel $P_i$ is a pixel included in the edge image 103. The target pixel $P_i$ is at the coordinates (i, j) in the edge image 103. The pixel $P_x$ hereafter refers to a pixel at the coordinates (x, j) in the edge image 103. More specifically, the pixel $P_x$ is in the x-th row in the horizontal direction and in the j-th column in the vertical direction. In the formula, $P_x$ is the pixel value of the pixel $P_x$. In the present embodiment, $P_x$ is a value ranging from 0 to 255. The value $P_x$ is larger as the image feature quantity (edge component quantity in the present embodiment) is larger (the degree of the target image feature quantity is higher).

FIG. 11 shows w pixels ($P_{i-w}$ to $P_{i-1}$), which are located left to the target pixel $P_i$, and w pixels ($P_{i+1}$ to $P_{i+w}$) (w is a natural number), which are located right to the target pixel $P_i$. The arithmetic operation corresponding to Formula 14 is used to evaluate the symmetry of the $(2_{w+1})$ pixels ($P_{i-w}$ to $P_{i+w}$).

Formula 14

$$SYM_w(i, j) = \frac{1}{w}\sum_{k=1}^{w} \{(255 - f_i(k)) * k\} \quad (14)$$

$$f_i(k) = \begin{cases} |P_{i-k} - P_{i+k}| & \text{if } (P_{i-k} > Th) \text{ or } (P_{i+k} > Th) \\ 255 & \text{else} \end{cases}$$

In Formula 14, $SYM_w(i, j)$ is an evaluation value for the symmetry (symmetry evaluation value), and k is an integer ranging from 1 to w. In Formula 14, the above value Th is a predetermined threshold.

The function $f_i(k)$ is
(1) $|P_{i-k} - P_{i+k}|$ when $P_{i-k} > Th$ or $P_{i+k} > Th$, and
(2) 255 (a maximum value of $P_x$) in any other cases (specifically, when $P_{i-k} \leq Th$ and $P_{i+k} \leq Th$).

Thus, when both the values $P_{i-k}$ and $P_{i+k}$ are equal to or less than the threshold Th, $SYM_w(i, j)$ is 0 (255−$f_i(k)$=0). More specifically, through the processing written as the above formula (Formula 14), pixels with small image feature quantities (pixels having small pixel values (corresponding to image feature quantities) in the feature-quantity extraction image (edge image) 103) are excluded from the target pixels for symmetry evaluation.

The pixel $P_{i+k}$ and the pixel $P_{i+k}$ are at positions symmetrical to each other with respect to the target pixel $P_i$. When the pixel $P_{i-k}$ and the pixels $P_{i+k}$ have the same pixel value, and $P_{i-k} > Th$ or $P_{i+k} > Th$, the difference between the pixels, or the value $|P_{i+k}-P_{i+k}|$, is a minimum value of 0. As a result, $f_i(k)=0$. The value $(255-f_i(k))$ is a maximum value of 255.

The evaluation value $(255-f_i(k))$ is multiplied by a distance k from the target pixel (i, j), which is the number of pixels between the target pixel (i, j) and the pixel (i, j+k) (or the pixel (i, j−k)) (corresponding to the distance in the image). In this manner, the value (255−fi(k)) is weighted using position information indicating a horizontal position (information indicating the distance from the target pixel). More specifically, the symmetry evaluation value is weighted more for a pixel more distant from the target pixel in the horizontal direction. When image areas distant from the target pixel to the right and to the left have high symmetry (in the horizontal direction) (symmetry based on a target image feature quantity, or an edge component quantity in the present embodiment) with respect to the target pixel, the resulting symmetry evaluation value $SYM_w$ (i, j) would be large.

The symmetry evaluation unit 222 calculates the evaluation values $SYM_w(i, j)$ for each target pixel $P_i$ by varying the width w. The symmetry evaluation unit 222 calculates the maximum value maxSYM of the evaluation values $SYM_w(i, j)$ for the target pixel $P_i$ as given in Formula 15 below.

Formula 15

$$\text{max}SYM=\max(SYM_1(i,j), SYM_2(i,j), \ldots, SYM_{N-1}(i,j), SYM_N(i,j)) \quad (15)$$

In Formula 15, N is a maximum value of the width w. The maximum value N is i−1 when the row value i, which indicates the horizontal position of the target pixel, is H/2 or less, where H is the number of pixels in the horizontal direction of the edge image 103. The maximum value N is H−i when the row value i indicating the horizontal position of the target pixel is greater than H/2.

In Formula 15, max( ) is a function to return a maximum value of an element. The processing written as Formula 15 yields the maximum value maxSYM as a maximum one of the values SYM1(i, j) to SYMN(i, j).

The symmetry evaluation unit 222 obtains the width w that returns the maximum value maxSYM as the symmetry width wa. More specifically, the evaluation value $SYM_w(i, j)$ is the maximum value maxSYM when w=wa. The maximum value maxSYM can be written as the formula below using the symmetry width wa.

maxSYM=SYMwa(i, j)

The processing written as Formula 14 and Formula 15 above will now be described with reference to FIG. 12. FIGS. 12A to 12F are schematic diagrams showing examples of feature-quantity extraction images, which are obtained by extracting feature quantities from a captured image of a horizontally symmetrical object having an axis C1 serving as the axis of symmetry. In FIGS. 12A to 12F, an area R1 is a target area for the calculation corresponding to Formula 14. For ease of explanation, each pixel included in white portions in FIG. 12A to 12F is assumed to have an image feature quantity (pixel value) Px of 255, whereas each pixel included in black portions is assumed to have an image feature quantity $P_x$ of 0.

In FIGS. 12A to 12F, the proportion rw of pixels having an image feature quantity (pixel value) $P_x$ of 255 in the area R1 is calculated in the manner described below.

Further, (1) in the area R1, rb0 indicates the proportion of pixels having an image feature quantity (pixel value) $P_x$ of 0 in an area sandwiched between the area of pixels having an image feature quantity (pixel value) $P_X$ of 255 and the target pixel position (the position of the axis C1 in FIGS. 12A to 12F). (2) In the area R1, rb1 indicates the proportion of pixels having an image feature quantity (pixel value) $P_X$ of 0 in an area outside the area of pixels having an image feature quantity (pixel value) $P_X$ of 255. Here, rw+rb0+rb1=1.

In FIGS. 12A to 12F, the width w is determined in the manner described below.

Figure 12A:
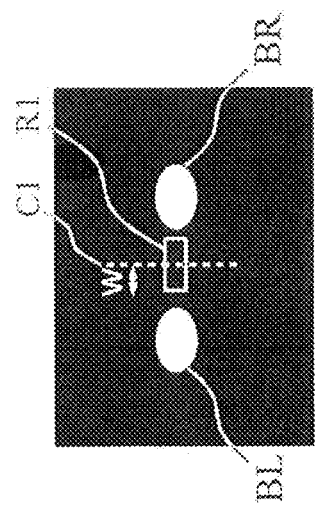
FIGS. 12A to 12F are diagrams describing a method for obtaining a symmetry width wa.

In the example of FIG. 12A, rw=0.0, rb0=1.0, rb1=0.0, and w=10.

Figure 12B:
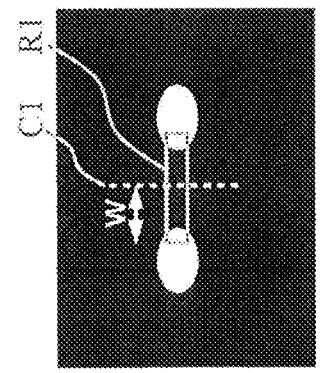

In the example of FIG. 12B, rw=0.2, rb0=0.8, rb1=0.0, and w=20.

Figure 12C:
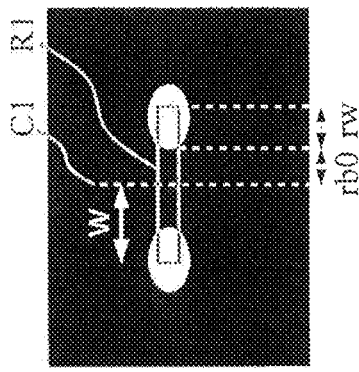

In the example of FIG. 12C, rw=0.4, rb0=0.6, rb1=0.0, and w=30.

Figure 12D:
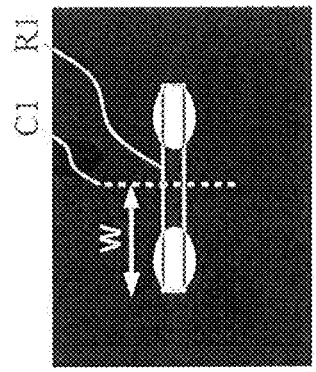

In the example of FIG. 12D, rw=0.6, rb0=0.4, rb1=0.0, and w=40.

Figure 12E:
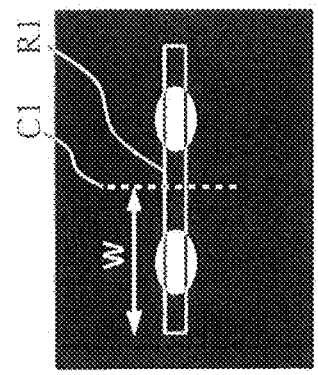

In the example of FIG. 12E, rw=0.4, rb0=0.3, rb1=0.3, and w=50.

Figure 12F:
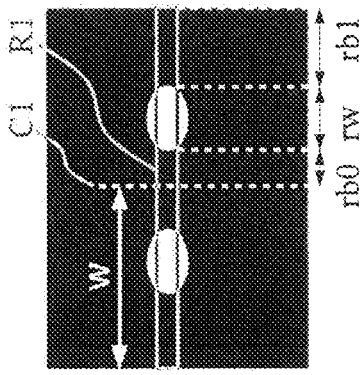

In the example of FIG. 12F, rw=0.3, rb0=0.2, rb1=0.5, and w=60.

In the example of FIG. 12A, each pixel included in the calculation target area R1 has an image feature quantity (pixel value) of 0. Thus, $SYM_w(i, j)$ is calculated as $SYM_w(i, j) = 0$ using Formula 14.

In the example of FIG. 12B, the proportion of pixels having an image feature quantity (pixel value) of 255 in the calculation target area R1 is 0.2. In this case, the value $SYM_w(i, j)$ is calculated in the manner described below using Formula 14.

$SYM_w(i,j)=[0.5\times w^2-0.5\times\{(1-rw)\times w\}^2]\times 255/w=72\times 255/20=918$.

In the example of FIG. 12C, the proportion of pixels having an image feature quantity (pixel value) of 255 in the calculation target area R1 is 0.4. Thus, the value of $SYM_w(i, j)$ is determined as described below using Formula 14.

$SYM_w(i,j)=[0.5\times w^2-0.5\times\{(1-rw)\times w\}^2]\times 255/w=288\times 255/30=2448$.

In the example of FIG. 12D, the proportion of pixels having an image feature quantity (pixel value) of 255 in the calculation target area R1 is 0.6. Thus, the value of $SYM_w(i, j)$ is determined as described below using Formula 14.

$SYM_w(i,j)=[0.5\times w^2-0.5\times\{(1-rw)\times w\}^2]\times 255/w=672\times 255/40=4284$.

In the example of FIG. 12E, the proportion of pixels having an image feature quantity (pixel value) of 255 in the calculation target area R1 is 0.4. Thus, the value of $SYM_w(i, j)$ is determined as described below using Formula 14.

$SYM_w(i,j)=[0.5\times rw\times w\times\{rb0\times w+(rb0+rw)\times w\}]\times 255/w=500\times 255/50=2550$.

In the example of FIG. 12F, the proportion of pixels having an image feature quantity (pixel value) of 255 in the calculation target area R1 is 0.3. Thus, the value of $SYM_w(i, j)$ is determined as described below using Formula 14.

$SYM_w(i,j)=[0.5\times rw\times w\times\{rb0\times w+(rb0+rw)\times w\}]\times 255/w=378\times 255/60=1606.5$.

For the feature-quantity extraction images shown in FIG. 12A to 12F described above, the weighting coefficient k that differs depending on the position increases as the area R1 is expanded in the manner shown in FIGS. 12A to 12D, and also the proportion of pixels having a pixel value of 255 increases accordingly. This causes the symmetry evaluation value $SYM_w(i, j)$ to increase monotonically.

When the area R1 is expanded in the manner shown in FIGS. 12D to 12F, the proportion of pixels having a pixel value of 255 decreases. This causes the symmetry evaluation value $SYM_w(i, j)$ to decrease monotonically.

The symmetry evaluation value $SYM_w(i, j)$ is a maximum value in the state shown in FIG. 12D. More specifically, with the $SYM_w(i, j)$ being a maximum value in the state shown in FIG. 12D, the evaluation value $SYM_w(i, j)$ in the state shown in FIG. 12D (=672×255) is the maximum value maxSYM, and the corresponding width w (w in the state shown in FIG. 12D is used as the symmetry width wa. In processing the feature-quantity extraction images shown in FIG. 12A to 12F, the symmetry evaluation unit 222 obtains the evaluation value $SYM_w(i, j)$ (=672×255) in the state shown in FIG. 12D as the value maxSYM. The symmetry evaluation unit 222 obtains the width w in this state (w in the state shown in FIG. 12D as the symmetry width wa.

The symmetry evaluation unit 222 performs the processing written as Formulae 14 and 15 for each of all the target pixels for which symmetry is to be evaluated, and generates (obtains) (1) symmetry evaluation map data showing the correspondence between each processing target pixel and the corresponding value maxSYM (or a value correlated with the value maxSYM), and (2) symmetry width map data showing the correspondence between each processing target pixel and the corresponding symmetry width wa (the width w that returns the maximum value maxSYM) (or a value correlated with the symmetry width wa).

Figure 10D:
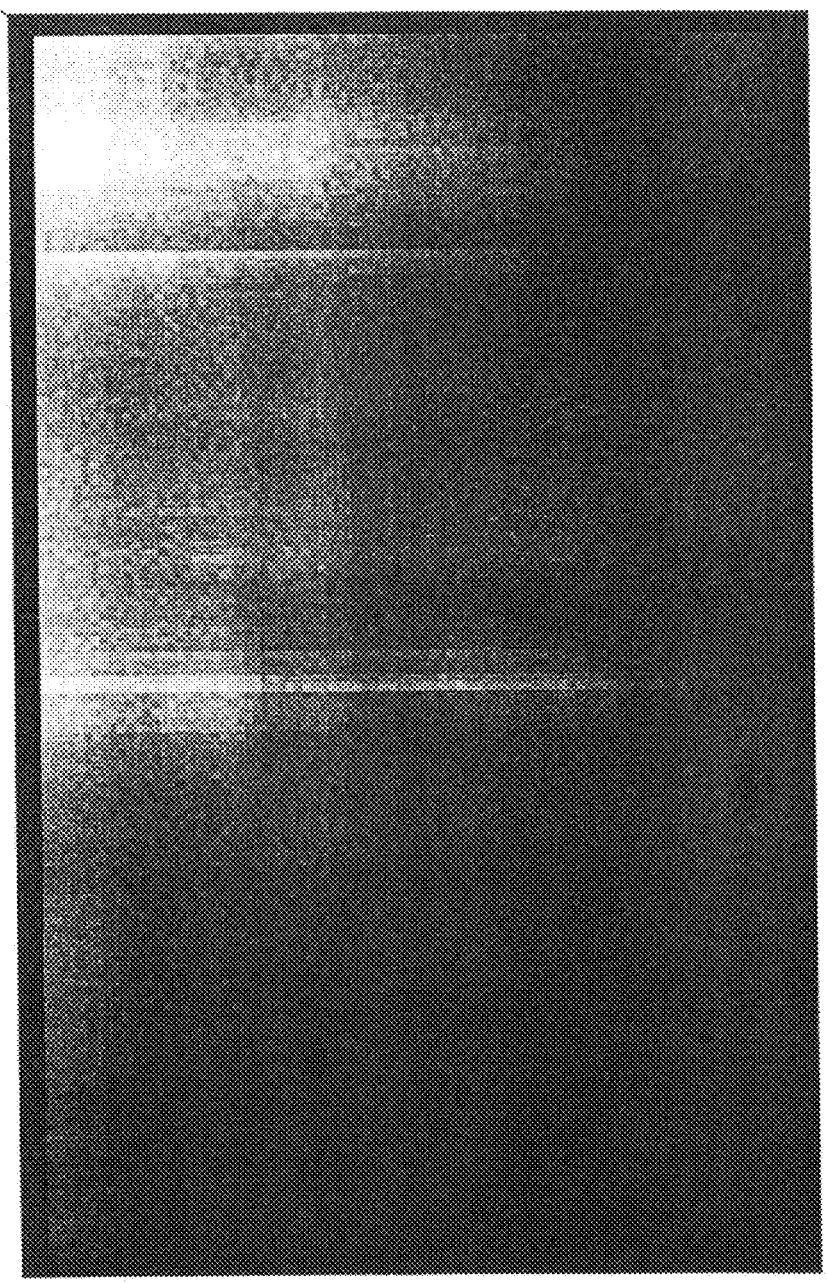
FIG. 10D shows a symmetry evaluation map image 104.

FIG. 10D shows a symmetry evaluation map image 104 obtained from the symmetry evaluation map data. The symmetry evaluation map image 104 is an image in which each pixel has the corresponding value maxSYM (or a value correlated with the value maxSYM) as its pixel value.

Figure 10E:
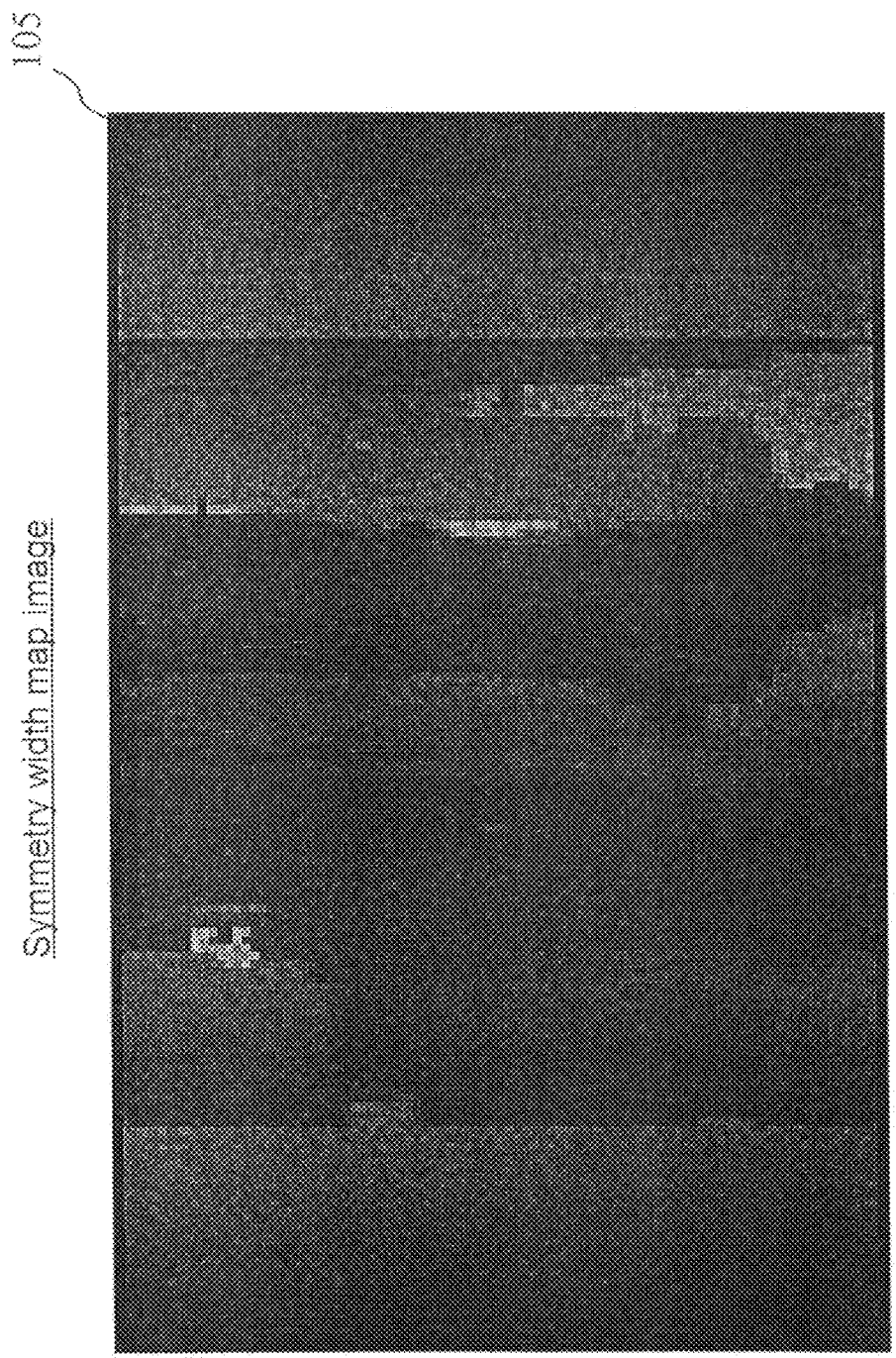
FIG. 10E shows a symmetry width map image 105.

FIG. 10E shows a symmetry width map image 105 obtained from the symmetry width map data. The symmetry width map image 105 is an image in which each pixel has the corresponding symmetry width wa (the width w that returns the maximum value maxSYM) (or a value correlated with the symmetry width wa) as its pixel value.

In the present embodiment, the symmetry evaluation unit 222 uses each of all pixels forming the edge image 103 as a target pixel for which symmetry is to be evaluated (evaluation target pixel). In other words, the symmetry evaluation unit 222 calculates the value $SYM_w(i, j)$ for each of all pixels included in the edge image 103, and then calculates the corresponding maximum value maxSYM.

To reduce the arithmetic processing or to improve the processing speed, the symmetry evaluation unit 222 may use selected pixels in the edge image 103 (thinning of pixels) and perform the same processing as described above to obtain the symmetry evaluation map data and the symmetry width map data. For example, the symmetry evaluation unit 222 may use only pixels in odd-numbered lines or pixels in even-numbered lines in the horizontal (or vertical) direction as pixels for which symmetry is to be evaluated (evaluation target pixels). Alternatively, the symmetry evaluation unit 222 may use fewer pixels, or pixels selected at every three lines, as evaluation target pixels.

The symmetry evaluation map data is map data having the value maxSYM (or a value correlated with the value maxSYM) calculated for each evaluation target pixel as its map element. The symmetry evaluation map data can also be seen as an image in which each evaluation target pixel has its corresponding calculated maximum value maxSYM (or a value correlated with the value maxSYM) as the pixel value. FIG. 10D shows an image representing the symmetry evaluation map data (the symmetry evaluation map image 104).

The symmetry evaluation unit 222 only needs to obtain the value maxSYM calculated for each evaluation target pixel (or a value correlated with the value maxSYM). The symmetry evaluation unit 222 may not obtain the image (the symmetry evaluation map image 104) in the format shown in FIG. 10D. The symmetry evaluation unit 222 only needs to obtain data showing the correspondence between each evaluation target pixel and its maximum value maxSYM.

The present embodiment uses each of all pixels forming the edge image 103 as an evaluation target pixel. In this case, the symmetry evaluation map image 104 is a grayscale image in which the pixel value of each of all the pixels of the edge image 103 is replaced with the corresponding value maxSYM (or a value correlated with the value maxSYM).

The symmetry evaluation value $SYM_w(i, j)$ calculated by Formula 14 above can be in different ranges depending on the width w. Although the symmetry evaluation map image 104 may use the maximum value maxSYM directly as the pixel value of each pixel, the symmetry evaluation map image 104 may be an image obtained through dynamic range conversion. More specifically, dynamic range conversion may be performed to adjust the range of values maxSYM, which is defined by a minimum value to a maximum value of the values maxSYM calculated for an input image of one frame, to, for example, the range of 0 to 255 (the 8-bit range) (the processing may be other processing, such as normalization, clipping to a predetermined value, or gain adjustment).

When the value $SYM_w(i, j)$ is adjusted to fall within the range of 0 to 255, each element of the symmetry evaluation map image 104 can have a value within the range of 0 to 255. In FIG. 10D, a color closer to white indicates a larger value $SYM_w(i, j)$ (a value closer to 255). More specifically, in FIG. 10D, a color closer to white represents an area evaluated to have high symmetry, indicating that the area is near the center of a symmetrical object. In FIG. 10D, a color closer to black represents an area having low symmetry. The dynamic range conversion described above is a mere example. Other dynamic range conversion may be performed to convert the value $SYM_w(i, j)$ into a range other than the range of 0 to 255.

The symmetry evaluation unit 222 generates (obtains) the symmetry width map data for all evaluation target pixels for which symmetry is to be evaluated.

The symmetry width map data is map data having the symmetry width wa that returns the maximum value maxSYM for each evaluation target pixel as its map element. The symmetry width map data can also be seen as an image in which each evaluation target pixel has the corresponding symmetry width wa as its pixel value. FIG. 10E shows an image representing the symmetry width map data (the symmetry width map image 105). The present embodiment uses each of all pixels forming the edge image 103 as an evaluation target pixel. In this case, the symmetry width map image 105 is a grayscale image in which the pixel value of each of all the pixels of the edge image 103 is replaced with the corresponding symmetry width wa.

As described above in the present embodiment, the symmetry width wa can be a value ranging from 1 to N. In this case, each element of the symmetry width map image 105 can be a value ranging from 1 to N. The value N differs depending on the pixel position. In the image (e) in FIG. 9, a color closer to white indicates an area with a larger symmetry width wa. In the image (e) FIG. 9, a color closer to black indicates an area with a smaller symmetry width wa.

Subsequently, the center detection unit 223 refers to the symmetry evaluation map data (symmetry evaluation map image 104) generated by the symmetry evaluation unit 222, and generates symmetry center map data (symmetry center map image 106). The center detection unit 223 determines (estimates) a pixel corresponding to a maximum local point of the values maxSYM (or a group of pixels around the maximum local point) for each horizontal line in the symmetry evaluation map image 104.

Figure 13:
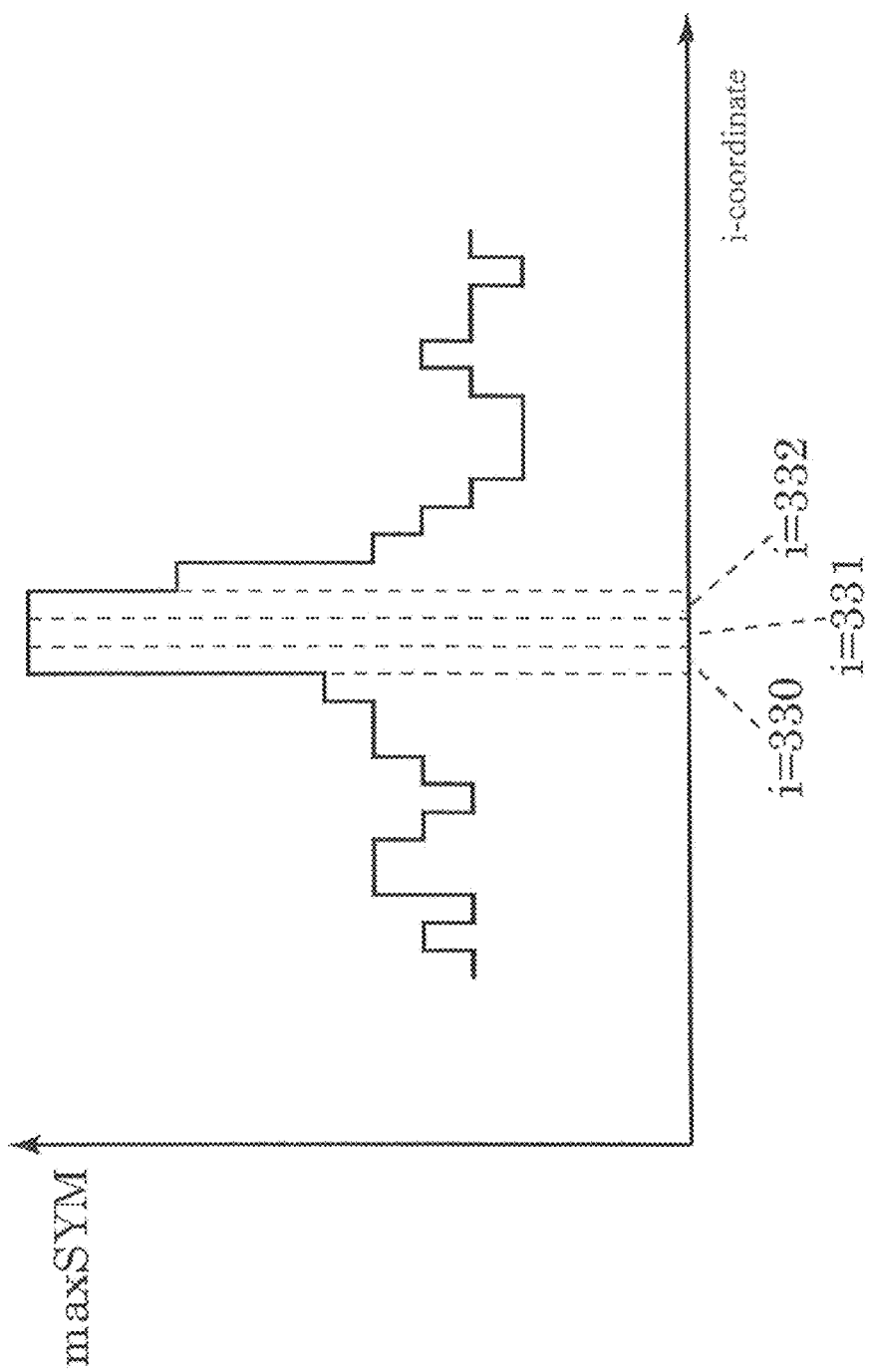
FIG. 13 is a graph showing (example) changes in the symmetry evaluation map image 104 in the horizontal direction.

FIG. 13 is a graph showing changes in the symmetry evaluation map image 104 in the horizontal direction. More specifically, FIG. 13 shows the changing values maxSYM for one horizontal line of the symmetry evaluation map image 104.

In FIG. 13, three pixels in rows 330 to 332 in the horizontal direction (i coordinates) (pixels at i=330, i=331, and i=332) have local maximum symmetry evaluation values (values maxSYM). In this case, the center detection unit 223 determines that three pixels at i=330, 331, and 332 correspond to a local maximum point (or an area around a local maximum point) of the symmetry evaluation values (values maxSYM) for one horizontal line shown in FIG. 13.

In the same manner, the center detection unit 223 identifies (estimates) an area (a pixel or a group of pixels) corresponding to a local maximum point (or an area around a local maximum point) for each of all horizontal lines. The area identified (estimated) by the center detection unit 223 is referred to as a "symmetry center pixel area."

Figure 10F:
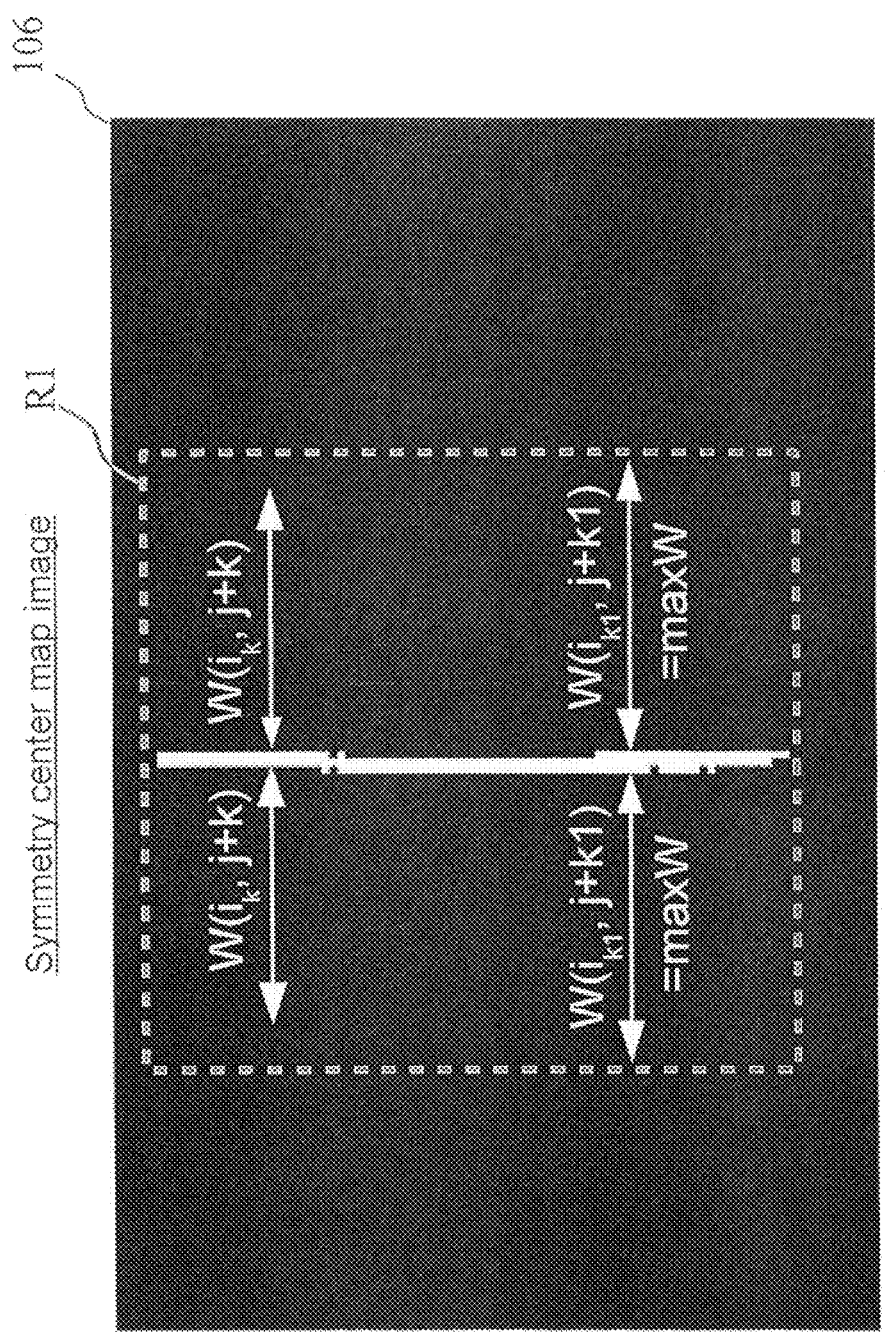
FIG. 10G shows a composite image (output image) 107 including a superimposed area frame 130.

FIG. 10F shows a symmetry center map image 106 indicating a symmetry center pixel area identified (estimated) by the center detection unit 223. The symmetry center map image 106 is seen as an image in which, for example, a pixel determined to be within a symmetry center pixel area has an element (pixel value) of 1 and a pixel determined not to be within the symmetry center pixel area has an element (pixel value) of 0. In FIG. 10F, a white portion indicates a pixel determined to form the symmetry center pixel area.

The determination as to whether a processing target pixel (target pixel) forms the symmetry center pixel area may be accompanied by, for example, the processing described below.

(1) The pixel value of each pixel forming the symmetry evaluation map image 104 is compared with a predetermined threshold. The pixel is determined to be a candidate for a local maximum point only when the pixel value exceeds the threshold.

(2) The symmetry evaluation map image 104 is subjected to smoothing in the horizontal direction (a processing target horizontal line is subjected to smoothing). After smoothing, the resulting image is used to identify the position of the local maximum point (position in the horizontal direction).

This eliminates local maximum points resulting from minor variations, and thus yields a highly accurate symmetry center map image.

Subsequently, the object area detection unit 224 detects the horizontal width and the vertical width of a symmetrical object included in the input image.

The object area detection unit 224 detects the horizontal width of the object using the symmetry center map data (the symmetry center map image 106) and the symmetry width map data (the symmetry width map image 105).

More specifically, the object area detection unit 224 detects the horizontal width of an object through, for example, the processing (1) to (5) described below. For ease of explanation, a horizontal line including the first pixel having a pixel value of 1 in the symmetry center map image 106 is referred to as the j-th horizontal line.

(1) In the symmetry center map image 106, a pixel forming the central axis of a symmetrical object is given a pixel value of 1. Thus, the object area detection unit 224 extracts a pixel having a pixel value of 1 from the symmetry center map image 106, and obtains the symmetry width of the extracted pixel from the symmetry width map image 105.

(1A):

When a single pixel having a pixel value of 1 is detected in the horizontal direction (without a sequence of pixels being detected in the horizontal direction), the object area detection unit 224 extracts the symmetry width W(i, j) of the extracted single pixel having the pixel value of 1 (the pixel is at the coordinates (i, j)) from the symmetry width map data.

(1B):

When a plurality of pixels having a pixel value of 1 are sequentially detected in the horizontal direction, the average of the symmetry width values for the plurality of pixels (sequential pixels in the horizontal direction) is used as the symmetry width. In one example, three pixels at the coordinates (i−1, j), (i, j), and (i+1, j) each having a pixel value of 1 have the symmetry width values W(i−1, j), W(i, j), and W(i+1, j), respectively. In this case, the symmetry width W(i, j) can be calculated in the manner described below.

$$W(i,j)=AVRG(W(i-1,j),W(i,j),W(i+1,j)), \text{ or}$$

$$W(i,j)=MAX(W(i-1,j),W(i,j),W(i+1,j)).$$

In these formulae, AVRG( ) is a function to return the average for an element, and MAX( ) is a function to return a maximum value of an element.

The symmetry width W(i, j) calculated for the j-th horizontal line through the processing (1A) or (1B) is referred to as W(i0, j).

(2) When, for example, the (j+1)th horizontal line includes a pixel having a pixel value of 1 substantially at the same position as the pixel extracted through the processing (1) in the horizontal direction (e.g., a pixel located at coordinates within the range of (i−a, j+1) to (i+a, j+1), where "a" is a predetermined threshold used to determine whether the positions in the horizontal direction are substantially the same), the symmetry width of the pixel is extracted from the symmetry width map data in the same manner as with the processing (1).

When the pixel $(i_1, j+1)$ has a pixel value of 1 (or the pixel is at the central position in the sequence of pixels having a pixel value of 1 in the horizontal line), the object area detection unit 224 calculates the symmetry width $W(i_1, j)$ of the pixel $(i_1, j+1)$ in the same manner as with the processing (1).

(3) For the (j+2)th and subsequent horizontal lines, the same processing as described above is repeated.

The above processing is repeated until the horizontal line includes no pixel having a pixel value of 1 substantially at the same position as the pixel extracted through the processing (1) in the horizontal direction (e.g., a pixel located at coordinates within the range of (i−a, j+1) to (i+a, j+1), where "a" is a predetermined threshold used to determine whether the horizontal positions are substantially the same).

(4) The object area detection unit 224 calculates a maximum value maxW of the symmetry width calculated through the processing (1) to (3) described above. More specifically, the object area detection unit 224 performs the processing written as Formula 16 below to calculate the maximum value maxW of the symmetry width.

In Formula 16, the j-th to (j+m−1)th horizontal lines each include a pixel having a pixel value of 1 at substantially the same position as the pixel extracted with the processing (1) in the horizontal direction (e.g., a pixel located at coordinates within the range of (i−a, j+1) to (i+a, j+1), where "a" is a predetermined threshold used to determine whether the horizontal positions are substantially the same).

Formula 16

$$\max W = \max(W(i_0, j), W(i_1, j+1), \ldots, W(i_{m-2}, j+m-2), W(i_{m-1}, j+m-1)) \quad (16)$$

(5) The object area detection unit 224 detects the maximum value maxW of the calculated symmetry width values as the width of the object (the distance from the center of the object in the horizontal direction to one end of the object). In FIG. 10F, the symmetry width is at the maximum in the (j+k1)th horizontal line. In other words, maxW=W($i_{k1}$, j+k1) in this example.

The object area detection unit 224 detects the width of the object in the vertical direction using the width (length) of the symmetry center pixel area in the vertical direction. More specifically, the object area detection unit 224 identifies the upper end of symmetry center pixels arranged sequentially in the vertical direction as the upper end of the object, and identifies the lower end of the symmetry center pixels arranged sequentially in the vertical direction as the lower end of the object.

As shown in FIG. 10F, the object area detection unit 224 determines (identifies) an area R1 defined as a rectangular area with the upper left vertex at the coordinates ($i_{k1}$−maxW, j) and the lower right vertex at the coordinates ($i_{k1}$+maxW, j+m−1) as an image area corresponding to a highly symmetrical object when, for example, the upper end of symmetry center pixels arranged sequentially in the vertical direction is in the j-th horizontal line, the lower end of symmetry center pixels arranged sequentially in the vertical direction is in the (j+m−1)th horizontal line, and the central position of the pixels in the horizontal line corresponding to the value maxW(=W($i_{k1}$, j+k1)) is at the coordinates ($i_{k1}$, j+k1).

The object area detection unit 224 outputs information indicating an image area corresponding to the identified object (the highly symmetrical object) (information identifying the area R1, or for example information indicating the coordinates of the rectangular area) to the superimposing unit 23A.

Although the above embodiment describes the case in which the object area detection unit 224 identifies the image area corresponding to the highly symmetrical object using a rectangular area, the embodiment should not be limited to this structure. For example, the object area detection unit 224 may identify an image area corresponding to a highly symmetrical object based on a symmetry width extracted for each horizontal line from the symmetry width map data. In this case, the object area detection unit 224 identifies an area that extends to the right and to the left of the symmetry center pixel (the pixel included in the symmetry center pixel area) each by a length corresponding to the symmetry width for each horizontal line and determines the identified area as an image area corresponding to the highly symmetrical object. The resulting image area corresponding to the highly symmetrical object has substantially the same shape as the highly symmetrical object (e.g., the image area is shaped substantially in conformance with the contour of the vehicle 110 shown in FIG. 10A).

The superimposing unit 23A generates (superimposes) an image indicating an image area corresponding to the highly symmetrical object on the image output from the image input unit 21A (input image 101) based on information identifying an image area corresponding to the detected highly symmetrical object output from the object area detection unit 224. The superimposing unit 23A generates (superimposes) an image in which, for example, a rectangular frame indicating the image area corresponding to the highly symmetrical object appears on the image output from the image input unit 21A. The superimposing unit 23A then outputs the resulting composite image to the display apparatus 3.

The display apparatus 3 displays the image indicating the image area corresponding To the highly symmetrical object output from the superimposing unit 23A of the object detection apparatus 2. The image (g) in FIG. 9 shows a composite image 107 in which the area frame 130 indicating the area of the vehicle 110, which is a symmetrical object, is superimposed on the input image 101. When the width of the object is determined for each horizontal direction line, the area frame would not be rectangular but would be shaped in conformance with the contour of the object (shaped substantially in conformance with the contour of the vehicle 110).

As described above, the object detection system 1000 of the present embodiment evaluates the symmetry of an image obtained by extracting an image feature quantity from the input image (captured image) by varying the width (width in the predetermined direction, which is for example the horizontal direction) to evaluate the symmetry of the image in the predetermined direction (horizontal direction). As a result, when the object detection system 1000 of the present embodiment determines that a predetermined image area has high symmetry, the object detection system 1000 can simultaneously obtain the width in the predetermined direction (horizontal direction) of the image area for which the symmetry is high. In other words, the object detection system 1000 of the present embodiment can extract the position and the size of an object at one time using the symmetry of the object included in the image.

The object detection system 1000 of the present embodiment can detect the central axis of a highly symmetrical object using evaluation data for symmetry in a predetermined direction (horizontal direction). The object detection system 1000 of the present embodiment can thus detect a highly symmetrical object with high accuracy using less arithmetic processing.

The object detection system 1000 of the present embodiment further obtains the symmetry evaluation value weighted using the distance from the target pixel (the central axis, or the symmetrical axis of the object), and performs the processing using the obtained symmetry evaluation value. Thus, the object detection system 1000 detects a highly symmetrical object located distant from the central axis (symmetrical axis) with high accuracy.

First Modification

A first modification of the present embodiment will now be described.

An object detection system and an object detection apparatus according to this modification have the same structure as the object detection system 1000 and the object detection apparatus 2 of the first embodiment.

The symmetry evaluation unit 222 included in the object detection apparatus of this modification performs the processing written as Formula 17 or 18 instead of Formula 14 described above. Except this processing, the modification is the same as the fifth embodiment.

Formula 17

$$SYM_w(i, j) = \frac{1}{w}\sum_{k=1}^{w} \{(255 - f_i(k)) * (w-k)\} \quad (17)$$

$$f_i(k) = \begin{cases} |P_{i-k} - P_{i+k}| & \text{if } (P_{i-k} > Th) \text{ or } (P_{i+k} > Th) \\ 255 & \text{else} \end{cases}$$

The symmetry evaluation unit 222 subjects the feature-quantity extraction image (edge image) 103 to the processing written as Formula 17 above. The processing written as Formula 17 includes weighting using the value (w−k). More specifically, an area closer to a target pixel in the feature-quantity extraction image (edge image) 103 is weighted with a larger value. The resulting symmetry evaluation value $SYM_w(i, j)$ would be large for an area closer to the target pixel and having higher symmetry in the horizontal direction.

The symmetry evaluation unit 222 may subject the feature-quantity extraction image (edge image) 103 to the processing written as Formula 18 below. The processing written as Formula 18 includes weighting using a function c(k) that decreases monotonically in a range of values k satisfying k≥a0 (a0 is a predetermined value satisfying a0≤w). More specifically, an area closer to a target pixel in the feature-quantity extraction image (edge image) 103 is weighted with a larger value. The resulting symmetry evaluation value $SYM_w(i, j)$ would be large for an area closer to the target pixel and having higher symmetry in the horizontal direction.

Formula 18

$$SYM_w(i, j) = \frac{1}{w}\sum_{k=1}^{w} \{(255 - f_i(k)) * c(k)\} \quad (18)$$

$$f_i(k) = \begin{cases} |P_{i-k} - P_{i+k}| & \text{if } (P_{i-k} > Th) \text{ or } (P_{i+k} > Th) \\ 255 & \text{else} \end{cases}$$

$$c(k) = \begin{cases} w & \text{if } (k < a0) \\ \frac{-w}{w-a0}(k - a0) + w & \text{else} \end{cases}$$

The processing written as Formula 18 will now be described with reference to FIG. 14A and 14B. FIGS. 14A and 14B are schematic diagrams of examples of feature-quantity extraction images. In the figure, each pixel included in a white portion has its maximum pixel value (image feature quantity) (e.g., 255 for 8-bit data). Each pixel included in a black portion has its minimum pixel value (image feature quantity) (e.g., 0 for 8-bit data). As shown in FIGS. 14A and 14B, the value a0 in Formula 18 is slightly larger than the value w1 (in FIG. 14A and 14B).

When the horizontal position (i-coordinate) of the target pixel is on an axis C2, the symmetry evaluation value $SYM_w(i, j)$ of the pixel is a maximum value within the width w1 of the area R2 in the horizontal direction as shown in FIG. 14A. More specifically, an area BC has high horizontal symmetry near the axis C2 and thus pixels in the area BC are weighted with a large value c(k). The horizontal width w1 in the area R2 shown in FIG. 14 14A is used as the symmetry width wa (symmetry width w when the symmetry evaluation value $SYM_w(i, j)$ is a maximum value).

As shown in FIG. 14B, when the area R2 has a width w2 in the horizontal direction, pixels included in an area having a width w larger than a width a0 is weighted with a value c(k) that decreases monotonically with respect to the width w. Thus, the areas BL and BR are weighted by a small value c(k). In this case, the symmetry evaluation value $SYM_w(i, j)$ for the area R2 having a width w2 in the horizontal direction would be smaller than the symmetry evaluation value $SYM_w(i, j)$ for an area having the width w1 in the horizontal direction.

As described above, the symmetry evaluation unit 222 in the object detection system according to the present embodiment performs the processing written as Formula 18 to obtain the symmetry evaluation value $SYM_w(i, j)$, and further obtains the symmetry width wa that yields the maximum symmetry evaluation value $SYM_w(i, j)$.

When a plurality of width values w return the maximum symmetry evaluation value $SYM_w(i, j)$ in detecting a horizontally symmetrical area near the symmetrical axis (central axis), a maximum one of the plurality of width values w may be used as the symmetry width wa. When, for example, w sequential pixels return the maximum symmetry evaluation value $SYM_w(i, j)$ near the symmetrical axis (central axis), the symmetry width corresponding to the maximum one of the width values w is highly likely to be close to the width of a highly symmetrical object located near the symmetrical axis. When a plurality of values w return the maximum symmetry evaluation value $SYM_w(i, j)$ in detecting a horizontally symmetrical area near the symmetrical axis (central axis), a maximum one of the plurality of values w may thus be used as the symmetry width wa.

Figure 15:
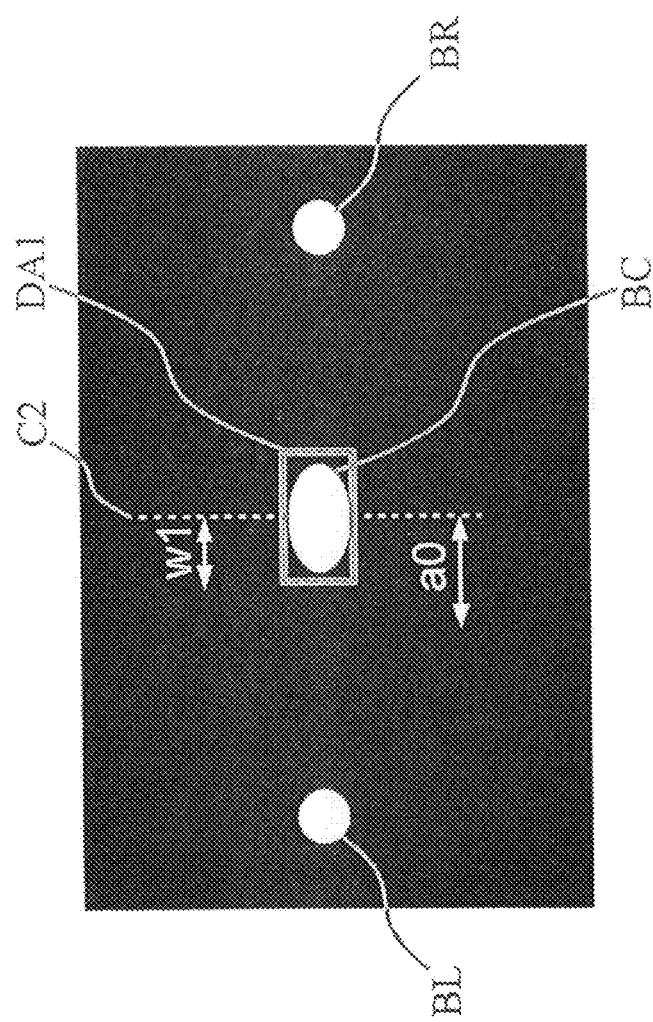
FIG. 15 shows an area in which a highly symmetrical object is detected according to a first modification of the fifth embodiment.

The center detection unit 223 and the object area detection unit 224 perform the same processing as described in the fifth embodiment to appropriately detect a highly symmetrical object (area) in the horizontal direction near the symmetrical axis. When, for example, the feature-quantity extraction image is an image shown in FIG. 15, the object detection system of the present modification appropriately detects a horizontally highly symmetrical object (area) BC near the symmetrical axis as a detected area DA1.

The weighting function c(k) that provides weighting in accordance with the distance on an image should not be limited to the function shown in Formula 18. The weighting function c(k) may be any other function.

Figure 16A:
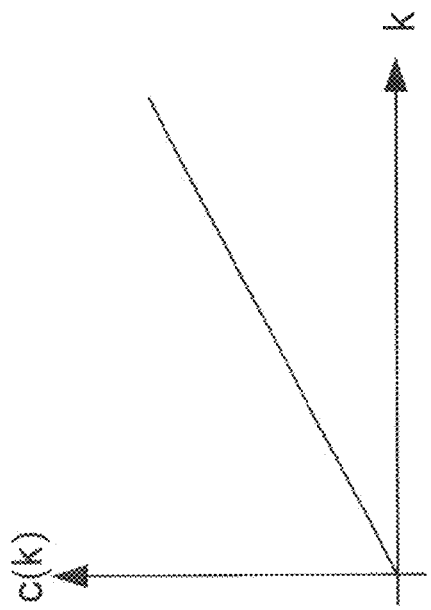
FIGS. 16A to 16D show examples of a weighting function c(k).
Figure 16B:
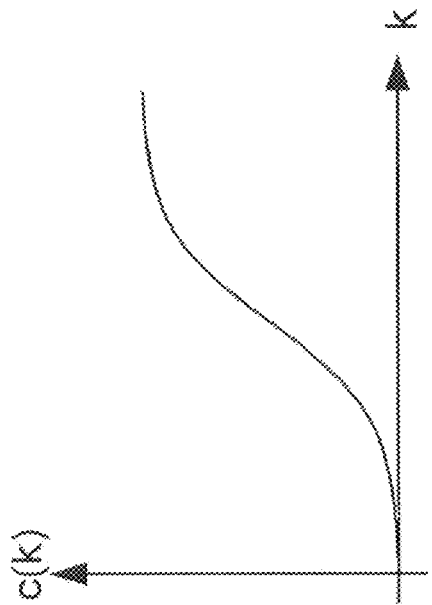

For example, the weighting function c(k) that provides weighting in accordance with the distance on an image may be a monotonically decreasing function shown in each of FIGS. 16A and 16B (the function may include a range of values k in which the function c(k) returns a constant value). The weighting function c(k) that is a monotonically decreasing function enables a highly symmetrical object to be detected near the symmetrical axis. FIG. 16A shows the processing written as Formula 18 in the present modification.

Figure 16C:
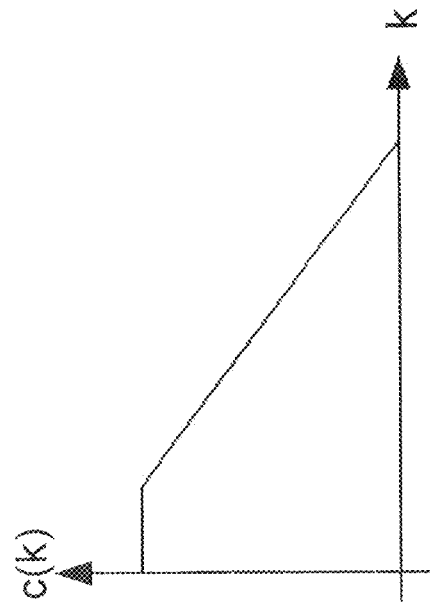
Figure 16D:
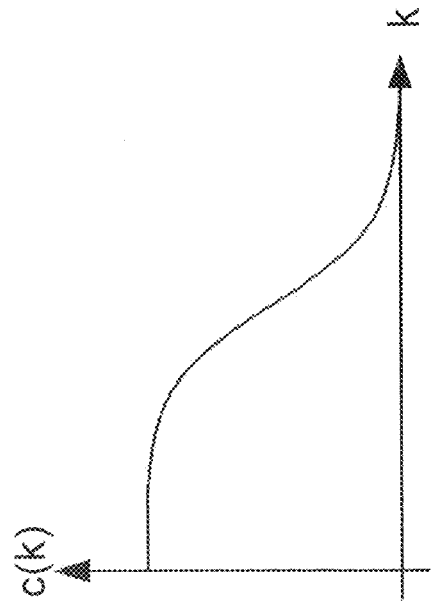

Alternatively, the weighting function c(k) that provides weighting in accordance With the distance on an image may be a monotonically decreasing function shown in each of FIGS. 16C and 16D (the function may include a range of values k in which the function c(k) returns a constant value). The weighting function c(k) that is a monotonically increasing function enables a highly symmetrical object to be detected in an area distant from the symmetrical axis. FIG. 16A shows the processing (processing when c(k)=k) written as Formula 14 in the fifth embodiment.

The weighting function c(k) that provides weighting in accordance with the distance on an image should not be limited to the above functions. For example, the weighting function c(k) for providing weighting in accordance with the distance on an image may be an exponent function, a sigmoid function, or a function expressing a line plot.

As described above, the object detection system of the present modification sets the weighting function c(k), which provides weighting in accordance with the distance on an image, as a monotonically decreasing function (the function may include a range in which values return by the function may not change monotonically) to enable a highly symmetrical object to be detected appropriately near the symmetrical axis.

Sixth Embodiment

A sixth embodiment will now be described.

An object detection system according to the present embodiment has the same structure as in the fifth embodiment. The present embodiment will be hereafter described focusing on its differences from the fifth embodiment. The components that are the same as in the above embodiments are given the same reference numerals as those embodiments and will not be described in detail.

In the fifth embodiment, the image feature quantity extraction unit 221 uses an edge component as an image feature quantity of an object. The image feature quantity extraction unit 221 evaluates the symmetry using the edge component extracted as the image feature quantity.

In the sixth embodiment, the image feature quantity extraction unit 221 uses a specific color component as an image feature quantity of an object. For example, the image feature quantity extraction unit 221 extracts a red component as an image feature quantity.

The operation of the object detection system according to the present embodiment will now be described.

Figure 17B:
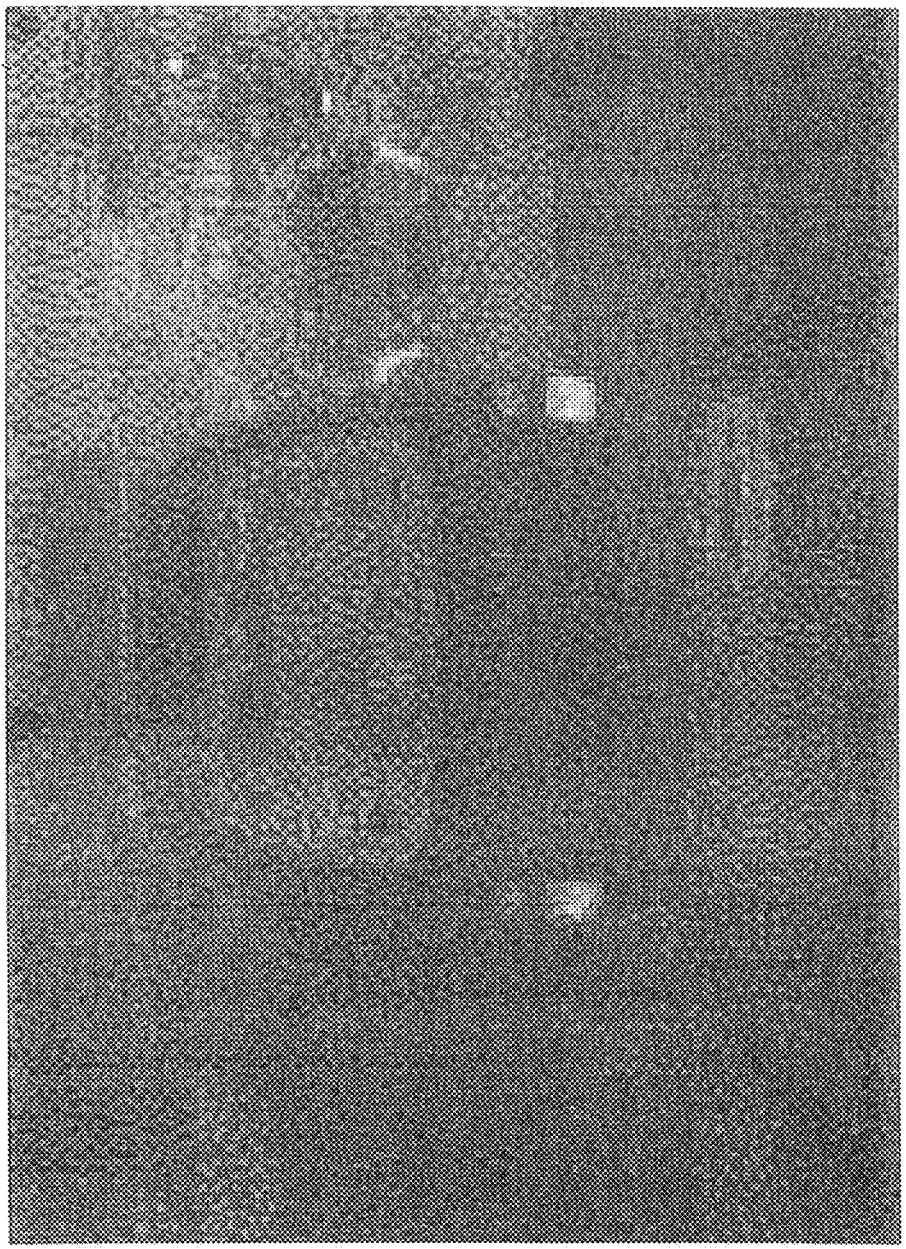
FIG. 17B shows a Cr-component image 202 generated by extracting a Cr component from the input image 101.

FIG. 17A shows example images generated in the steps of object detection implemented by the object detection system of the present embodiment.

In the present embodiment as well, the imaging apparatus 1 obtains the captured image 101 shown in FIG. 10A. The captured image 101 is then processed in the object detection apparatus 2.

The image input unit 21A converts image signals defined in the RGB color space (an R-component signal, a G-component signal, and a B-component signal), which are input from the imaging apparatus 1, into signals defined in the YCbCr color space (a Y-component signal, a Cb-component signal, and a Cr-component signal). The image input unit 21A outputs the Cr component signal (Cr-component image 202) to the image feature quantity extraction unit 221.

The image feature quantity extraction unit 221 subjects the Cr-component image (color difference red component image) 202, which is obtained by the image input unit 21A, to processing for extracting an image feature quantity. In the present embodiment, a physical quantity correlated with the Cr component is used as the image feature quantity.

In the present embodiment, the image feature quantity extraction unit 221 subjects the Cr-component image 202 to processing for enhancing the Cr component (enhancement) to generate a feature-quantity extraction image (an R-component image, or a Cr-component enhanced image) 203.

The processing performed subsequently is the same as described in the fifth embodiment. The same processing is performed except that the edge image in the fifth embodiment is replaced with the R-component image to detect a symmetrical object.

Figure 17C:
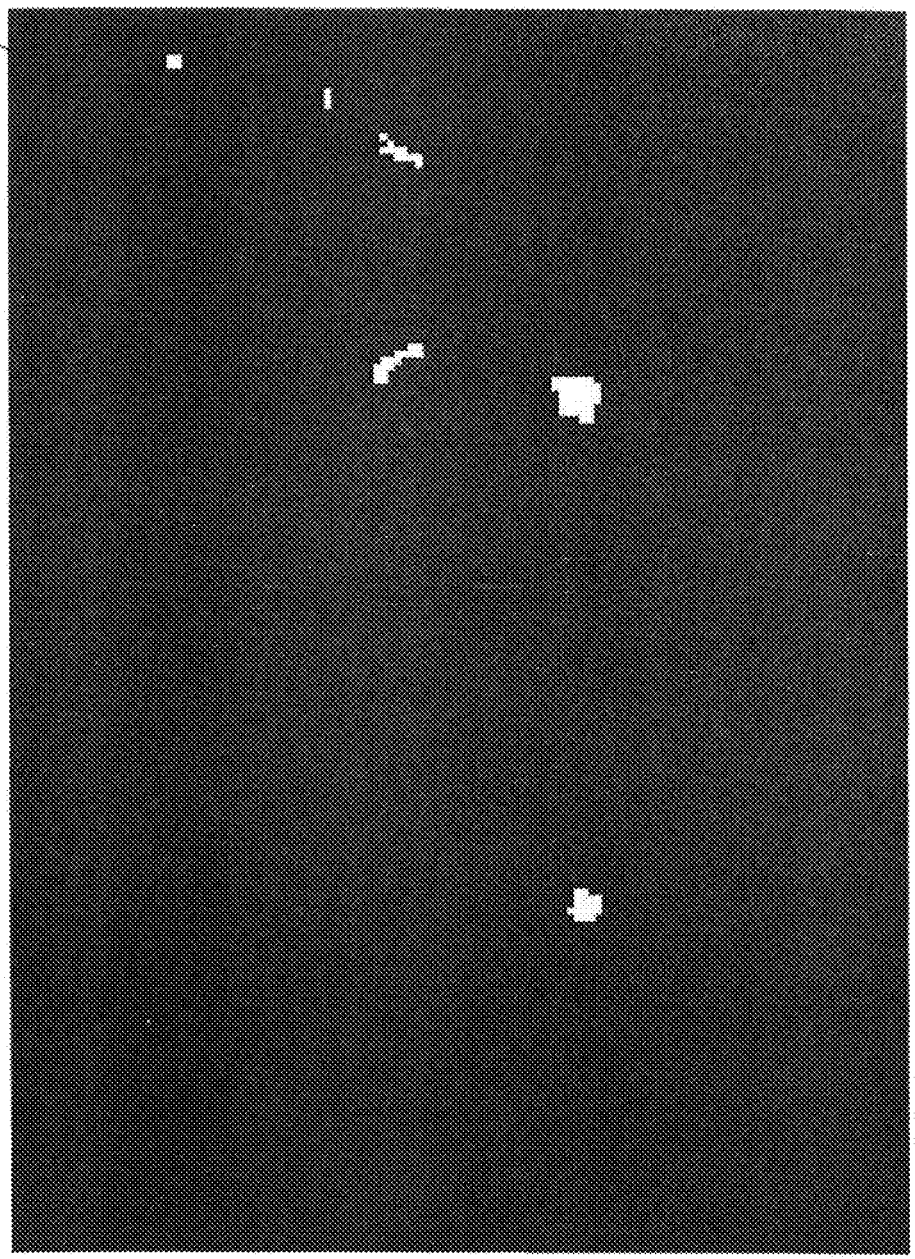
FIG. 17C shows a feature-quantity extraction image (an R-component image, or a Cr-component enhanced image) 203.
Figure 17E:
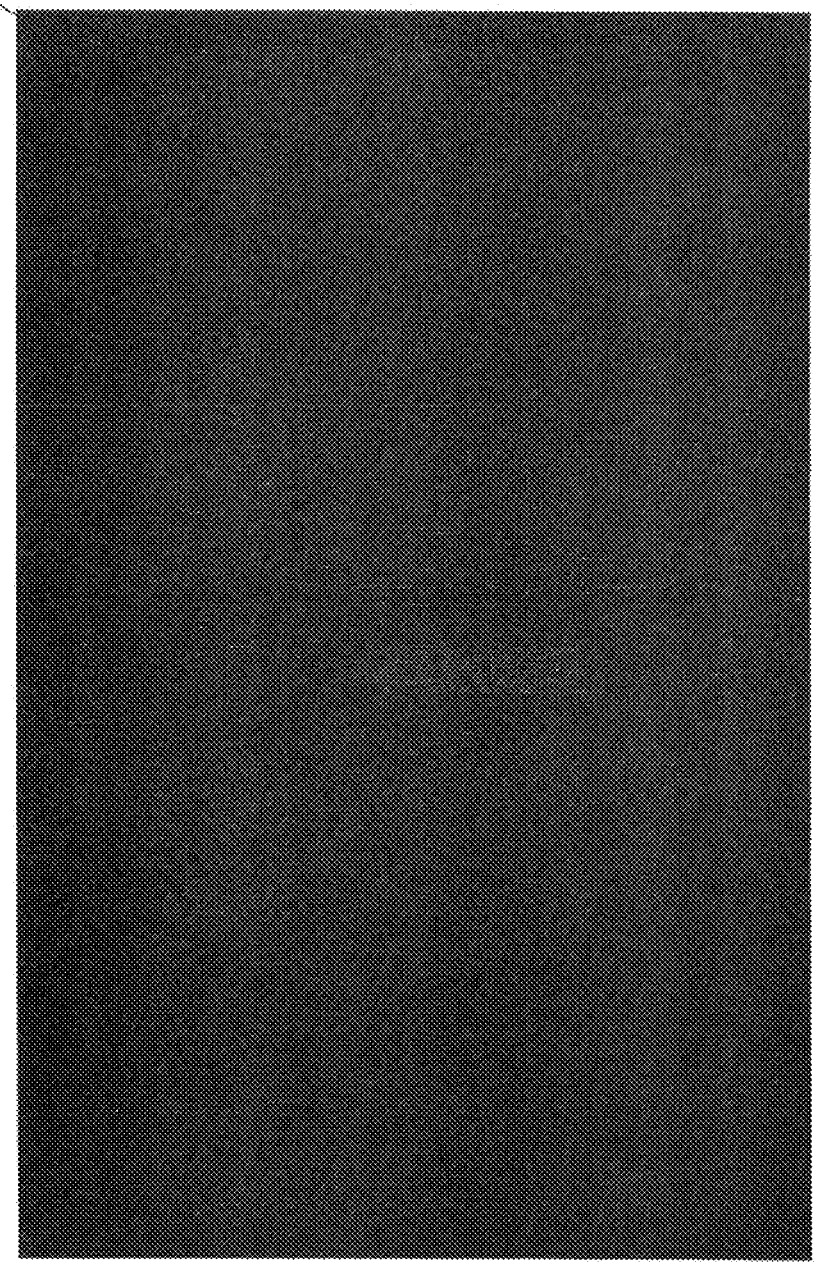
FIG. 17E shows a symmetry width map image 205.

More specifically, the symmetry evaluation unit 222 subjects the feature-quantity extraction image (the R-component image, or the Cr-component enhanced image) 203 shown in FIG. 17C to the same processing as in the fifth embodiment to obtain symmetry evaluation map data (corresponding to the symmetry evaluation map image 204 shown in FIG. 17D) and symmetry width map data (corresponding to the symmetry width map image 205 shown in FIG. 17E).

Figure 17F:
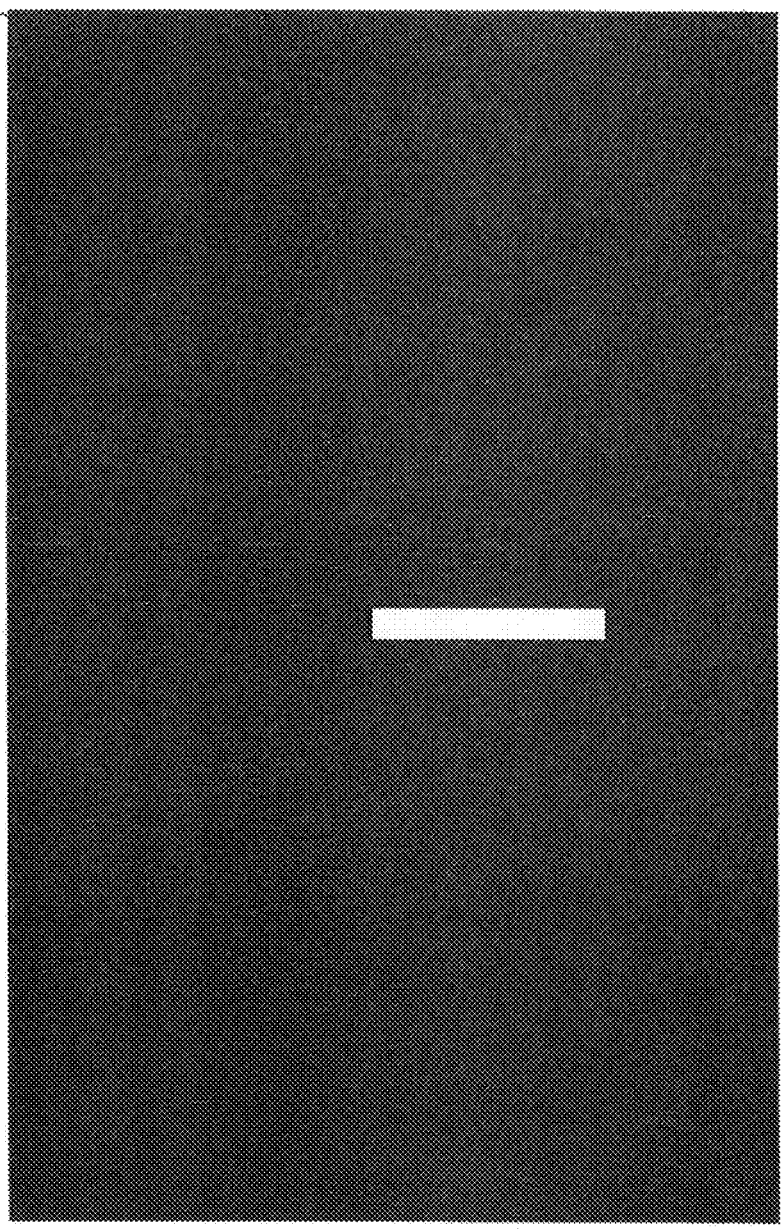
FIG. 17F shows a symmetry center map image 206.

The center detection unit 223 subjects the symmetry evaluation map data (corresponding to the symmetry evaluation map image 204 shown in FIG. 17D) to the same processing as in the fifth embodiment to obtain symmetry center map data (corresponding to the symmetry center map image 206 shown in FIG. 17F).

The object area detection unit 224 subjects the symmetry center map data (corresponding to the symmetry center map image 206 shown in FIG. 17F) and the symmetry width map data (symmetry width map image 205) to the same processing as in the fifth embodiment to detect the width of the object in the horizontal direction, and to further detect the width of the object in the vertical direction.

In the same manner as in the fifth embodiment, the superimposing unit 23A generates (superimposes) an image indicating an image area corresponding to the highly symmetrical object on an image output from the image input unit 21A (an input image 101) based on information identifying an area corresponding to the detected highly symmetrical object in the image output from the object area detection unit 224.

Figure 17G:
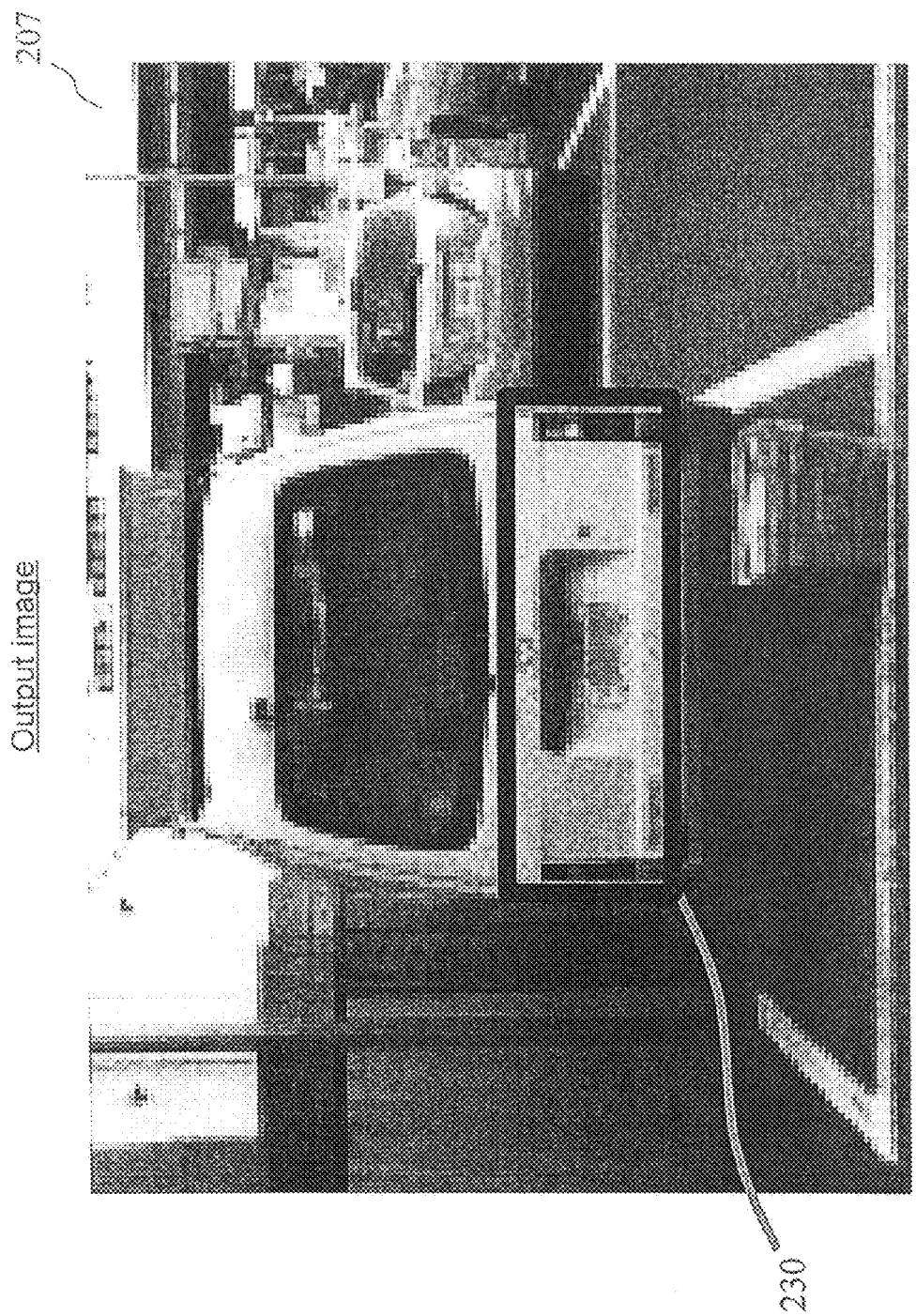
FIG. 17G shows a composite image (an output image) 207 including a superimposed area frame 230.

The image generated (generated through superimposing) by the superimposing unit 23A is displayed by the display apparatus 3. FIG. 17G shows an example of an image (output image 207) obtained by the superimposing unit 23A. As shown in FIG. 17G, an area (an image area 230) including red image portions at horizontally symmetrical positions is detected in an appropriate manner.

FIG. 17G shows the composite image 207 displayed by the display apparatus 3 in the sixth embodiment. In the fifth embodiment, the symmetry of an object is evaluated using the edge component, and thus the size of the entire vehicle is detected as the size of the object. Unlike this, the symmetry of an object is evaluated by focusing on the red color of the tail lamps of the vehicle in the sixth embodiment. Thus, an area including the tail lamps (an image area 230) is extracted.

As described above, the object detection system of the present embodiment evaluates symmetry in a predetermined direction (horizontal direction) in an image obtained by extracting an image feature quantity from an input image (captured image) (an image obtained by extracting a specific color component) by varying the width of the image (the width in the predetermined direction, which is the horizontal direction). When determining that a predetermined image area has high symmetry, the object detection system of the present embodiment can obtain the width of the image area determined to have high symmetry in the predetermined direction (horizontal direction) at the same time. In other words, the object detection system of the present embodiment can extract the position and the size of an object at one time using the symmetry of the object included in the image.

The object detection system of the present embodiment can detect the central axis of a highly symmetrical object using evaluation data for symmetry in a predetermined direction (horizontal direction). The object detection system of the present embodiment can thus detect a highly symmetrical object with high accuracy using less arithmetic processing. Further, the object detection system of the present embodiment uses an image obtained by extracting a specific color component, and can thus detect a highly symmetrical object containing a large quantity of specific color component with high accuracy.

The object detection system of the present embodiment obtains a symmetry evaluation value weighted in accordance with the distance from a target pixel (the central axis of an object, or specifically the symmetrical axis), and performs processing using the symmetry evaluation value. Thus, the object detection system can detect an object having high symmetry for a specific color component located distant from the central axis (symmetrical axis) with high accuracy.

The fifth embodiment and the sixth embodiment may be combined with each other. An edge image is used to determine the vertical width and position of an object and the horizontal width and position of the object. Further, a specific color component image is used to determine the vertical width and position of the object and the horizontal width and position of the object. The averages of the values obtained from these images are then used to identify the width and the position of the object. Alternatively, either the values obtained from the edge image or the values obtained from the color component image may be weighted, and the resulting values may be used to identify the position and the size of the object.

In the above embodiment, the processing focuses on the red component. The embodiment should not be limited to this example. The processing may focus on another color component (e.g., a green component or a blue component) to detect an object having high symmetry for the predetermined color.

The color space conversion for extracting an image feature quantity should not be limited to the conversion described in the above embodiment, but may be other color space conversion for extracting a signal of a specific color component to extract a predetermined color component signal (color component image).

First Modification

A first modification of the present embodiment will now be described.

An object detection system and an object detection apparatus according to the present modification have the same structure as the object detection system and the object detection apparatus of the fifth embodiment.

The object detection apparatus of the present modification includes a symmetry evaluation unit 222 that performs the processing written as Formula 17 or 18 instead of Formula 14, as in the modification of the fifth embodiment. As in the sixth embodiment, the object detection apparatus of the present modification includes an image feature quantity extraction unit 221 that uses a specific color component as an image feature quantity of an object. For example, the image feature quantity extraction unit 221 extracts a red component as an image feature quantity.

Figure 18C:
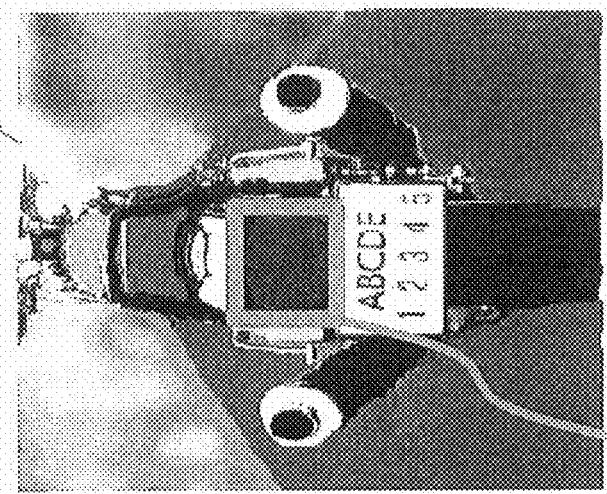
FIG. 18C shows an output image (composite image) 303 according to a first modification of the sixth embodiment.
Figure 18B:
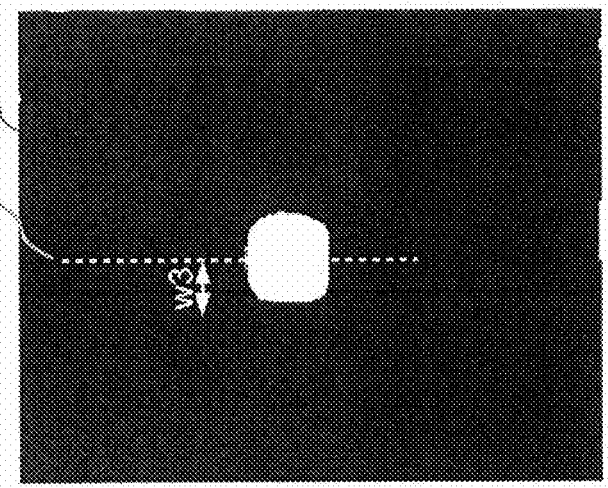
FIG. 18B shows a feature-quantity extraction image (an R-component, or Cr-component extraction image) 302 according to a first modification of the sixth embodiment.
Figure 18A:
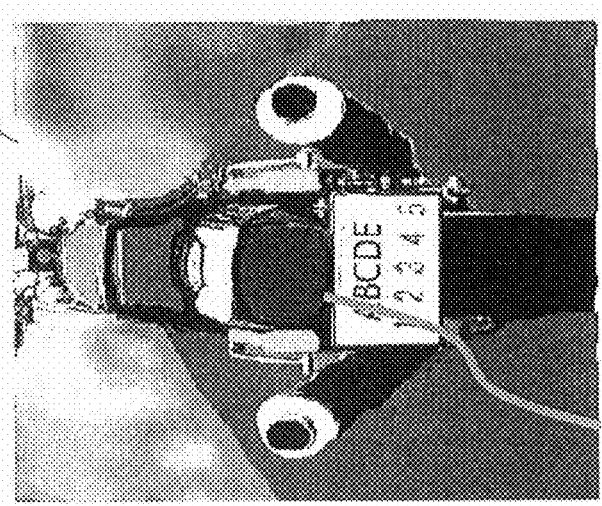
FIG. 18A shows an input image 301 according to a first modification of the sixth embodiment.

In the example described below, an image shown in FIG. 18A is input into the object detection system of the present modification.

FIG. 18A shows an image 301 obtained by capturing the back of a motorcycle. In the captured image (input image) 301, a tail lamp 311 of the motorcycle is red.

When the image shown in FIG. 18A is input into the object detection apparatus of the present modification, the image feature quantity extraction unit 221 included in an object detection unit 22A obtains a feature-quantity extraction image 302 shown in FIG. 18B which is an R-component (Cr component) extraction image. In the feature-quantity extraction image 302 shown in FIG. 18B, which is an R-component (Cr component) extraction image, an area corresponding to the tail lamp 311 of the motorcycle is located close to an axis C3 and also includes pixels each having a large pixel value (image feature quantity, or red component quantity) corresponding to the tail lamp 311 of the motorcycle. The symmetry evaluation value $SYM_w(i, j)$ calculated by the symmetry evaluation unit 222 is a maximum value when the horizontal position (i-coordinate) of the target pixel is near the symmetrical axis. The corresponding symmetry width is the width w3 shown in FIG. 18B. In other words, the symmetry width wa (the symmetry width w that returns the maximum value of the symmetry evaluation value $SYM_w(i, j)$) is the width w3.

The center detection unit 223 and the object area detection unit 224 in the present modification perform the same processing as described in the above embodiments to obtain an output image shown in FIG. 18C. In the output image shown in FIG. 18C, an area that is red and has high horizontal symmetry near the symmetrical axis (object) (a tail lamp portion of the motorcycle) is detected in an appropriate manner.

As described above, the object detection system of the present modification can appropriately detect a highly symmetrical area (object) near the symmetrical axis of a specific color component (red component in this modification) through the processing written as Formula 17 or 18 performed by the symmetry evaluation unit 222.

As described in the modification of the fifth embodiment, the weighting function c(k) that provides weighting in accordance with the distance on an image in the present modification is not limited to the function shown in Formula 18, but may be any other function (e.g., a function shown in each graph of FIG. 16A to 16D).

Seventh Embodiment

A seventh embodiment will now be described.

An object detection system of the present embodiment has the same structure as in the fifth embodiment. The present embodiment will be described focusing on its differences from the fifth embodiment. The components that are the same as in the above embodiments are given the same reference numerals as those embodiments and will not be described in detail.

A symmetry evaluation unit 222 of the present embodiment performs the processing written as Formula 19 instead of Formula 14.

Formula 19

$$SYM_w(i, j) = \frac{1}{w}\sum_{k=1}^{w} \{(255 - |P_{i-k} - P_{i+k}|) * P_{i-k} * P_{i+k}\} \quad (19)$$

As in the above embodiments, $SYM_w(i, j)$ in Formula 19 indicates an evaluation value of symmetry, and k is an integer ranging from 1 to w.

The pixels $P_{i-k}$ and $P_{i+k}$ are horizontally symmetrical to each other with respect to the target pixel P. When the pixels $P_{i-k}$ and $P_{i+k}$ have the same pixel value, the difference between the pixels, or the value $|P_{i-k}-P_{i+k}|$, is a minimum value of 0. In this case, the value $(255-|P_{i-k}-P_{i+k}|)$ is a maximum value of 255.

The value $(255-|P_{i-k}-P_{i+k}|)$ is multiplied by the pixel values $P_{i-k}$ and $P_{i+k}$. As a result, the value is weighted by the image feature quantity of pixels located distant from the target pixel $P_i$ by k pixels to the right and to the left in the horizontal direction. This excludes pixels having small image feature quantities from the target pixels for symmetry evaluation. More specifically, when the feature-quantity extraction image is an edge image 103, the pixels $P_{i-k}$ and $P_{i+k}$, which do not form edges in the edge image 103, have a value close to 0. For areas that do not form edges, the resulting value $(255-|P_{i-k}-P_{i+k}|) \times P_{i-k} \times P_{i+k}$ would be close to 0.

In Formula 19, the evaluation value $SYM_w(i, j)$ is larger as the symmetry is higher for a target image feature quantity (e.g., an edge component quantity or a specific color component quantity, or for example a red component quantity).

The symmetry evaluation unit 222 in the present embodiment performs the processing written as Formula 15 as in the above embodiments to obtain the width w that returns the maximum value maxSYM as the symmetry width wa.

The center detection unit 223, the object area detection unit 224, and the superimposing unit 23A of the present embodiment perform the same processing as described above.

As described above, the object detection system of the present embodiment evaluates symmetry in a predetermined direction (horizontal direction) in an image obtained by extracting an image feature quantity from an input image (captured image) by varying the width of the image (the width in the predetermined direction (horizontal direction)). When determining that a predetermined image area has high symmetry, the object detection system of the present embodiment can obtain the width of the image area determined to have high symmetry in the predetermined direction (horizontal direction) at the same time. In other words, the object detection system of the present embodiment can extract the position and the size of an object included in an image at one time using the symmetry of the object.

The object detection system of the present embodiment can detect the central axis of a highly symmetrical object using evaluation data for symmetry in a predetermined direction (horizontal direction). The object detection system of the present embodiment can thus detect a highly symmetrical object with high accuracy using less arithmetic processing.

In the object detection system of the present embodiment, the image feature quantity extraction unit 221 may use, for example, an edge component as an image feature and may obtain an edge image by extracting an edge component from an input image. In this case, the object detection system of the present embodiment can obtain the same (similar) processing results as shown in FIG. 9.

In the object detection system of the present embodiment, the image feature quantity extraction unit 221 may obtain, for example, an image (e.g., a red component image, or an R-component image or a Cr-component image) by extracting a specific color component (e.g., a red component, or an R-component or a Cr-component) from an input image. In this case, the object detection system of the present embodiment obtains the same (similar) processing results as shown in FIG. 17A.

Eighth Embodiment

An eighth embodiment will now be described.

The structure of the object detection system according to the present embodiment is the same as in the above embodiments. The present embodiment will be described focusing on its differences from the above embodiments. The components that are the same as in the above embodiments are given the same reference numerals as those embodiments and will not be described in detail.

The symmetry evaluation unit 222 in the present embodiment performs the processing written as Formula 20 below instead of Formula 14.

Formula 20

$$SYM_w(i, j) = \frac{1}{w}\sum_{k=1}^{w} \{(255 - |P_{i-k} - P_{i+k}|) * P_{i-k} * P_{i+k} * k\} \quad (20)$$

As in the above embodiments, $SYM_w(i, j)$ in Formula 20 is an evaluation value for symmetry, and k is an integer ranging from 1 to w.

The pixels $P_{i-k}$ and $P_{i\pm k}$ are horizontally symmetrical to each other with respect to the target pixel $P_i$. When the pixels $P_{i-k}$ and $P_{i+k}$ have the same pixel value, the difference between the pixels, or the value |Pi-k-Pi+k| is a minimum value of 0. In this case, the value $(255-|P_{i-k}-P_{i+k}|)$ is a maximum value of 255.

The value $(255-|P_{i-k}-P_{i+k}|)$ is multiplied by the pixel values $P_{i-k}$ and $P_{i+k}$. As a result, the value is weighted by the image feature quantity of pixels located distant from the target pixel $P_i$ by k pixels to the right and to the left in the horizontal direction. This excludes pixels having small image feature quantities from the target pixels for symmetry evaluation. More specifically, when the feature-quantity extraction image is an edge image 103, the pixels $P_{i-k}$ and $P_{i+k}$, which do not form edges in the edge image 103, have a value close to 0. For areas that do not form edges, the resulting value $(255-|P_{i-k}-P_{i+k}|) \times P_{i-k} \times P_{i+k}$ would be close to 0.

In Formula 20, the evaluation value $SYM_w(i, j)$ is larger as the symmetry is higher for a target image feature quantity (e.g., an edge component quantity or a specific color component quantity, or for example a red component quantity).

In Formula 20, the evaluation value is multiplied by a distance k, which is the number of pixels between the target pixel (i, j) and the pixels (i, j+k), or the pixel (i, j-k) (corresponding to the distance in the image). In this manner, the evaluation value is weighted using position information indicating a horizontal position (information indicating the distance from the target pixel). More specifically, the symmetry evaluation value is weighted more for a pixel more distant from the target pixel in the horizontal direction. When image areas distant from the target pixel to the right and to the left have high symmetry (in the horizontal direction) (symmetry based on a target image feature quantity, or an edge component quantity in the present embodiment) with respect to the target pixel, the resulting symmetry evaluation value $SYM_w(i, j)$ would be large.

More specifically, the symmetry evaluation unit 222 performs the processing written as Formula 20 to obtain the symmetry evaluation value $SYM_w(i, j)$ weighted using the image feature quantity ($P_{i-k}$ and $P_{i+k}$) and the position information in the horizontal direction (information indicating the distance from the target pixel).

The symmetry evaluation unit 222 of the present embodiment performs the processing written as Formula 20 in the same manner as in the above embodiments, and obtains the width w that returns the maximum value maxSYM as the symmetry width wa.

The center detection unit 223, the object area detection unit 224, and the superimposing unit 23 of the present embodiment perform the same processing as described above.

As described above, the object detection system of the present embodiment evaluates symmetry in a predetermined direction (horizontal direction) in an image obtained by extracting an image feature quantity from an input image (captured image) by varying the width of the image in the predetermined direction (horizontal direction). When determining that a predetermined image area has high symmetry, the object detection system of the present embodiment can obtain the width of the image area determined to have high symmetry in the predetermined direction (horizontal direction) at the same time. In other words, the object detection system of the present embodiment can extract the position and the size of an object included in an image at one time using the symmetry of the object.

The object detection system of the present embodiment can detect the central axis of a highly symmetrical object using evaluation data for symmetry in a predetermined direction (horizontal direction). The object detection system of the present embodiment can thus detect a highly symmetrical object with high accuracy using less arithmetic processing.

The object detection system of the present embodiment obtains a symmetry evaluation value weighted in accordance with the distance from a target pixel (the central axis of an object, or specifically the symmetrical axis), and performs processing using the symmetry evaluation value. Thus, the object detection system can detect an object having highly symmetry for a specific color component located distant from the central axis (symmetrical axis) with high accuracy.

In the object detection system of the present embodiment, the image feature quantity extraction unit 221 may use, for example, an edge component as an image feature quantity and may obtain an edge image by extracting an edge component from an input image. In this case, the object detection system of the present embodiment obtains the same (similar) processing results as shown in FIG. 9.

In the object detection system of the present embodiment, the image feature quantity extraction unit 221 may obtain, for example, an image (e.g., a red component image, or an R-component image or a Cr-component image) by extracting a specific color component (e.g., a red component, or an R-component or a Cr-component) from an input image. In this case, the object detection system of the present embodiment obtains the same (similar) processing results as shown in FIG. 17A.

First Modification

A first modification of the eighth embodiment will now be described.

The object detection system according to the present modification has the same structure as described in the above embodiments. The present embodiment will be described focusing on its differences from the above embodiments. The components that are the same as in the above embodiments are given the same reference numerals as those embodiments and will not be described in detail.

A symmetry evaluation unit 222 of the present modification performs the processing written as Formula 21 instead of Formula 20. Although the weighting performed in accordance with the position (distance) uses the value k in Formula 20, the weighting performed in accordance with the position (distance) uses a function of k, or a function c(k) in Formula 21.

Formula 21

$$SYM_w(i, j) = \frac{1}{w}\sum_{k=1}^{w}\{(255 - |P_{i-k} - P_{i-k}|) * P_{i-k} * P_{i+k} * c(k)\} \quad (21)$$

In this modification, the function c(k) may be set as a predetermined function (e.g., each function shown in FIGS. 16A to 16D) to flexibly change the weighting of the symmetry evaluation value for an area located distant from the symmetrical axis by a predetermined distance.

To detect, for example, an area having high symmetry near the central axis (symmetrical axis), the function c(k) is set as follows:

c(k)=w−k

Alternatively, the function may be set as Formula 22 below.

Formula 22

$$c(k) = \begin{Bmatrix} w & \text{if } (k < a0) \\ \frac{-w}{w-a0}(k-a0)+w & \text{else} \end{Bmatrix} \quad (22)$$

As described above, the object detection system of the present modification can appropriately detect a highly symmetrical area (object) in a predetermined area (an area distant from the symmetrical axis by a predetermined distance) through the processing written as Formula 21 performed by the symmetry evaluation unit 222.

As described in the modification of the fifth embodiment, the weighting function c(k) that provides weighting in accordance with the distance on an image in the present modification is not limited to the function shown above, but may be any other function (e.g., a function shown in each graph of FIGS. 16A to 16D).

Ninth Embodiment

A ninth embodiment will now be described.

The structure of the object detection system according to the present embodiment is the same as in the above embodiments. The present embodiment will be described focusing on its differences from the above embodiments. The components that are the same as in the above embodiments are given the same reference numerals as those embodiments and will not be described in detail.

A symmetry evaluation unit 222 in the present embodiment performs the processing written as Formula 21 below instead of Formula 23. In Formula 21, an area in an image for which a symmetry evaluation value is to be calculated includes a single horizontal line. In Formula 23, an area in an image for which a symmetry evaluation value is to be calculated includes 2n+1 horizontal lines (2n+1 horizontal lines including the central horizontal line with a target pixel) (where n is a natural number).

More specifically, the symmetry evaluation unit 222 of the present embodiment calculates a symmetry evaluation value for each of the 2n+1 horizontal lines using Formula 23. The symmetry evaluation unit 222 accumulates the symmetry evaluation values calculated for the horizontal lines, and divides the accumulated value by the number of horizontal lines to obtain the average. The symmetry evaluation unit 222 uses the obtained average as the symmetry evaluation value $SYM_w(i, j)$ of the target pixel (i, j).

Formula 23

$$SYM_w(i, j) = \frac{1}{2n+1} \sum_{m=j-n}^{j+n}\left[\frac{1}{w} * \sum_{k=1}^{w}\{(255 - |P_{i-k,m} - P_{i+k,m}|) * P_{i-k,m} * P_{i+k,m} * c(k)\}\right] \quad (23)$$

In Formula 23, c(k) is a function.

To detect, for example, a highly symmetrical area in an image located distant from The central axis (symmetrical axis), the function c(k) is set as follows:

c(k)=k

The function c(k) may be set as a function shown in FIG. 16D.

To detect, for example, a highly symmetrical area in an image located near the Central axis (symmetrical axis), the function c(k) is set as follows:

$$c(k) = w - k$$

The function c(k) may be set as a function shown in each of FIGS. 16A and 16B.

As written in Formula 23, the symmetry evaluation unit 222 calculates a symmetry evaluation value by setting the vertical width of a target area for which a symmetry evaluation value is to be calculated as the width corresponding to the 2n+1 horizontal lines in total, which includes n lines located above the horizontal line including the target pixel and n lines located below the horizontal line including the target pixel. When the target pixel is around the upper end or the lower end of an image, and fewer than n lines are above the horizontal line including the target pixel or fewer than n lines are below the horizontal line including the target pixel, the width of the target area for which a symmetry evaluation value is to be calculated in the vertical direction may be changed. When, for example, the target pixel is close to the upper end, and n1 lines (n1<n) (from the upper end of the image) are above the horizontal line including the target pixel, an area including (n1+n+1) lines from the (j−n1)th line to the (j+n)th line may be set as the target area for which a symmetry evaluation value is to be calculated.

The symmetry evaluation unit 222 of the present embodiment performs the processing written as Formula 23 in the same manner as in the above embodiments, and obtains the width w that returns the maximum value maxSYM as the symmetry width wa.

The center detection unit 223, the object area detection unit 224, and the superimposing unit 23 in the present embodiment performs the same processing as described above.

As described above, the symmetry evaluation unit 222 of the present embodiment calculates a symmetry evaluation value for each of the 2n+1 horizontal lines using Formula 23. The symmetry evaluation unit 222 then accumulates the symmetry evaluation values calculated for the horizontal lines, and divides the accumulated value by the number of horizontal lines to obtain the average. The symmetry evaluation unit 222 uses the obtained average as the symmetry evaluation value $SYM_w(i, j)$ of the target pixel (i, j). In other words, the object detection system of the present embodiment uses an image area having a predetermined width in the vertical direction as a target for symmetry evaluation, and thus detects an area having highly correlation in the vertical direction (e.g., a rectangular object having sides parallel to the symmetrical axis or the central axis) with high accuracy.

The symmetry evaluation unit 222 may use Formula 24 instead of Formula 23 to calculate the symmetry evaluation value $SYM_w(i, j)$. The function c(k) is the same as in Formula 23.

Formula 24

$$SYM_w(i, j) = \frac{1}{w}\sum_{k=1}^{w}\left[\left(255 - \frac{1}{2n+1}\left|\sum_{m=j-n}^{j+n}P_{i-k,m} - \sum_{m=j-n}^{j+n}P_{i+k,m}\right|\right) * \left(\frac{1}{2n+1}\sum_{m=j-n}^{j+n}P_{i-k,m}\right) * \left(\frac{1}{2n+1}\sum_{m=j-n}^{j+n}P_{i+k,m}\right) * c(k)\right] \quad (24)$$

In the processing written as Formula 23, the symmetry evaluation unit 222 first evaluates symmetry in the horizontal direction, and then accumulates the symmetry evaluation values in the vertical direction and calculates the average of the accumulated values to obtain the symmetry evaluation value $SYM_w(i, j)$ of the target pixel (i, j).

In the processing in Formula 24, the symmetry evaluation unit 222 first performs the processing of accumulating values of each term of Formula 24 in the vertical direction (average value calculation), and then evaluates symmetry in the horizontal direction to calculate the symmetry evaluation value $SYM_w(i, j)$ of the target pixel (i, j).

The symmetry evaluation unit 222 performs the processing written as Formula 24 to obtain the same processing results as obtained through the processing written as Formula 23.

First Modification

A first modification of the ninth embodiment will now be described.

The object detection system according to the present modification has the same structure as described in the above embodiment. The present embodiment will be described focusing on its differences from the above embodiments. The components that are the same as in the above embodiments are given the same reference numerals as those embodiments and will not be described in detail.

A symmetry evaluation unit 222 of the present modification performs the processing written as Formula 25 below instead of Formula 23. Although the weighting in the vertical direction is performed using a value of 1 (without weighting) for each of all the horizontal lines in the processing written as Formula 23, the weighting is performed for each horizontal line using a weighting function d(m), which provides weighting in accordance with the function d(m) in the processing written as Formula 25. The function c(k) is the same as in Formula 23.

Formula 25

$$SYM_w(i, j) = \frac{1}{2n+1}\sum_{m=j-m}^{j+n}\left[d(m) * \frac{1}{w}\sum_{k=1}^{w}\{(255 - |P_{i-k,m} - P_{i+k,m}|) * P_{i-k,m} * P_{i+k,m} * c(k)\}\right] \quad (25)$$

For example, d(m)=n+1−|m−j|, or d(m)=c1×exp(−c2×(m−j)^2), where c1 is a coefficient to determine the maximum value of d(m), and c2 is a coefficient used for range adjustment in the vertical direction. Through this processing, pixels in the horizontal line including the target pixel (i, j) are weighted using a larger value, and pixels in lines more distant from the horizontal line including the target pixel (i, j) are weighted using a smaller value.

As a result, the symmetry evaluation value is calculated to be larger for an area having high horizontal symmetry around a horizontal line including a target pixel (i, j).

The symmetry evaluation unit 222 may use Formula 26 instead of Formula 21 to calculate the symmetry evaluation value $SYM_w(i, j)$. The function c(k) is the same as in Formula 21.

Formula 26

$$\frac{1}{w}\sum_{k=1}^{w}\left[\left(255 - \frac{1}{2n+1}\left|\sum_{m=j-n}^{j+n}d(m)*P_{i-k,m} - \sum_{m=j-n}^{j+n}d(m)*P_{i+k,m}\right|\right) * \left\{\frac{1}{2n+1}\sum_{m=j-n}^{j+n}(d(m)*P_{i-k,m})\right\} * \left\{\frac{1}{2n+1}\sum_{m=j-n}^{j+n}(d(m)*P_{i+k,m})\right\} * c(k)\right] \quad (26)$$

In the processing written as Formula 21, the symmetry evaluation unit 222 first evaluates symmetry in the horizontal direction, and then accumulates the symmetry evaluation values in the vertical direction and calculates the average of the accumulated values to obtain the symmetry evaluation value $SYM_w(i, j)$ of the target pixel $(i, j)$.

In the processing written as Formula 26, the symmetry evaluation unit 222 first performs the processing of accumulating values of each term of Formula 26 in the vertical direction (average value calculation), and then evaluates symmetry in the horizontal direction to calculate the symmetry evaluation value $SYM_w(i, j)$ of the target pixel $(i, j)$.

The symmetry evaluation unit 222 performs the processing written as Formula 26 to obtain the same processing results as obtained through the processing written as Formula 25.

Other Embodiments

Some or all of the above embodiments and modifications may be combined.

In the above embodiments, an object having symmetry in the horizontal direction is detected. In the same manner, an object having symmetry in the vertical direction may also be detected. More specifically, the processing described in the above embodiments may be performed by reversing the direction of processing between the horizontal and vertical directions in the above embodiments to detect an object having symmetry in the vertical direction.

Some or all of the functional units of the object detection apparatus 2 according to the above embodiments may use a shared memory (e.g., a frame memory) in their processing.

When the imaging apparatus included in the object detection system of each of the above embodiments captures a color image at a predetermined frame rate (e.g., 15 fps), the shared memory preferably has a capacity that allows the object detection apparatus to process the color image at the predetermined frame rate (e.g., 15 fps).

The above embodiments describe the processing to be performed on 8-bit data (data of 0 to 255) (e.g., the processing written as the formulae), the number of bits of data to be processed should not be limited to the number of bits (the possible range of data) described above. In the above embodiments, the data may be processed into a predetermined range of data through, for example, range conversion, normalization, or clipping using a predetermined threshold.

Each block of the object detection system or the object detection apparatus described in the above embodiments may be formed using a single chip with a semiconductor device (an integrated circuit or a field programmable gate array (FPGA)), such as an LSI (large-scale integration) device, or some or all of the blocks of the object detection system and the object detection apparatus may be formed using a single chip. Each block of the object detection system or the object detection apparatus described in the above embodiments may be formed using a plurality of chips (semiconductor devices such as LSI devices)

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware. When the object detection system and the object detection apparatus of the above embodiments are implemented by hardware, the object detection system and the object detection apparatus need timing adjustment for their processes. For ease of explanation, the timing adjustment associated with various signals used in an actual hardware design is not described in detail in the above embodiments.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray disc (registered trademark), or a semiconductor memory.

The computer program may not be recorded on the recording medium but may be transmitted with an electric communication line, a radio or cable communication line, or a network such as the Internet.

The specific structures described in the above embodiments are mere examples of the present invention, and may be changed and modified variously without departing from the scope and the spirit of the invention.

Appendixes

The present invention may also be expressed in the following forms.

Appendix 1

An object detection apparatus, comprising:

an image input unit configured to receive an input image;

a symmetry evaluation unit configured to evaluate, for a plurality of evaluation pixels included in the image, first-direction symmetry of an area around each evaluation pixel based on an image feature quantity of a pixel in the area around each evaluation pixel, the first-direction symmetry being symmetry in a first direction;

a symmetry width detection unit configured to calculate a symmetry width in the first direction for the plurality of evaluation pixels;

a center detection unit configured to detect, as a symmetry center pixel, a pixel having symmetry exceeding a predetermined reference among the plurality of evaluation pixels; and an object width detection unit configured to detect an object width in the first direction for an object having symmetry included in the image based on the symmetry width of each symmetry center pixel, and detect an object width in a second direction orthogonal to the first direction based on distribution of each symmetry center pixel in the second direction.

Appendix 2

The object detection apparatus according to Appendix 1, wherein the center detection unit detects a point corresponding to a local maximum in changes in the first-direction symmetry as the symmetry center pixel.

Appendix 3

The object detection apparatus according to one of Appendixes 1 and 2, wherein the symmetry evaluation unit evaluates symmetry based on a similarity in the image feature quantity between pixels in the area around each evaluation pixel.

Appendix 4

The object detection apparatus according to one of Appendixes 1 to 3, wherein the symmetry width detection unit detects a width corresponding to the highest evaluated symmetry for each evaluation target pixel as the symmetry width.

Appendix 5

The object detection apparatus according to one of Appendixes 1 to 4, wherein the object width detection unit detects a maximum value or an average value of the symmetry width of each symmetry center pixel as the object width in the first direction.

Appendix 6

The object detection apparatus according to one of Appendixes 1 to 4, wherein the object area detection unit detects the symmetry width of each symmetry center pixel as the object width in the first direction.

Appendix 7

The object detection apparatus according to one of Appendixes 1 to 6, wherein the object width detection unit detects a first end and a second end of the symmetry center pixels sequentially arranged in the second direction as a first end and a second end of the object width in the second direction.

Appendix 8

The object detection apparatus according to one of Appendixes 1 to 7, wherein the symmetry evaluation unit uses an edge intensity of a pixel as a feature quantity of the pixel.

Appendix 9

The object detection apparatus according to one of Appendixes 1 to 7, wherein the symmetry evaluation unit uses an intensity of a predetermined color component of a pixel as a feature quantity of the pixel.

Appendix 10

The object detection apparatus according to one of Appendixes 1 to 9, wherein the symmetry evaluation unit evaluates symmetry in a horizontal direction when the first direction is set to the horizontal direction and evaluates symmetry in a vertical direction when the first direction is set to the vertical direction, and identifies a pixel having symmetry in the horizontal direction without having symmetry in the vertical direction, and the symmetry evaluation unit detects, as the symmetry center pixel, a pixel for which the evaluated symmetry exceeds a predetermined reference and that has symmetry in the horizontal direction without having symmetry in the vertical direction among the plurality of evaluation target pixels.

Appendix 11

The object detection apparatus according to one of Appendixes 1 to 10, wherein the object detection apparatus detects a vehicle included in the image as the object having symmetry.

REFERENCE SIGNS LIST

1000 object detection system
1 imaging apparatus
2 object detection apparatus
3 display apparatus (monitor)
21A image input unit
22A object detection unit
23A superimposing unit
221 image feature quantity extraction unit
222 symmetry evaluation unit
223 center detection unit
224 object area detection unit
23A superimposing unit

The invention claimed is:

1. An object detection apparatus, comprising:
an image input unit configured to receive an image;
an image feature quantity extraction unit configured to extract a predetermined image feature quantity from the image to generate a feature-quantity extraction image;
a symmetry evaluation unit configured to evaluate, for every processing target pixel in the feature-quantity extraction image, first-direction symmetry of an image area around the processing target pixel based on an image feature quantity of pixels around the processing target pixel, and calculate a symmetry width in a first direction, the first-direction symmetry being symmetry in the first direction;
a center detection unit configured to detect the target pixel as a symmetry center pixel when the evaluated symmetry for the target pixel exceeds a predetermined reference; and
an object area detection unit configured to detect an object width in the first direction for an object having symmetry included in the image based on the symmetry width of each symmetry center pixel, and detect an object width in a second direction orthogonal to the first direction based on distribution of each symmetry center pixel in the second direction, wherein the symmetry evaluation unit calculates a symmetry evaluation value $SYM_w(i, j)$ for the target pixel by defining a value based on a value of $(Pmax-abs(P_{i-k}-P_{i+k}))$, adding up the defined value for k from 1 to w, and dividing the added-up value by w, while varying a value of $2w+1$, where w is a natural number, and
where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, $2w+1$ is a width of the symmetry evaluation area in the first direction, and abs(x) denotes an absolute value of x.

2. The object detection apparatus according to claim 1, wherein the center detection unit detects a point corresponding to a local maximum in changes in the first-direction symmetry as the symmetry center pixel.

3. The object detection apparatus according to claim 1, wherein the symmetry evaluation unit evaluates symmetry based on a similarity in the image feature quantity between pixels around the target pixel.

4. The object detection apparatus according to claim 1, wherein the symmetry evaluation unit detects a width corresponding to the highest evaluated symmetry for each target pixel as the symmetry width.

5. The object detection apparatus according to claim 1, wherein the object area detection unit detects a maximum value or an average value of the symmetry width of each symmetry center pixel as the object width in the first direction.

6. The object detection apparatus according to claim 1, wherein the object area detection unit detects the symmetry width of each symmetry center pixel as the object width in the first direction.

7. The object detection apparatus according to claim 1, wherein the object area detection unit detects a first end and a second end of the symmetry center pixels sequentially arranged in the second direction as a first end and a second end of the object width in the second direction.

8. The object detection apparatus according to claim 1, wherein the symmetry evaluation unit evaluates symmetry in a horizontal direction when the first direction is set to the horizontal direction and evaluates symmetry in a vertical direction when the first direction is set to the vertical direction, and identifies a pixel having symmetry in the horizontal direction without having symmetry in the vertical direction, and the center detection unit identifies, as the symmetry center pixel, a pixel for which the evaluated symmetry exceeds a predetermined reference and that has symmetry in the horizontal direction without having symmetry in the vertical direction.

9. The object detection apparatus according to claim 1, wherein the symmetry evaluation unit sets, for every processing target pixel, a symmetry evaluation area in the feature-quantity extraction image for evaluating the first-direction symmetry, which is symmetry in the first direction in the image, in such a manner that the symmetry evaluation area is symmetrical with respect to a central axis in the second direction orthogonal to the first direction, and calculates a weighted value resulting from weighting a correlation value by an image feature quantity on a group of pixels included in the symmetry evaluation area and located symmetrical with respect to the central axis, the correlation value indicating a correlation between image feature quantities of the group of pixels, while varying a size of the symmetry evaluation area to obtain a symmetry evaluation value indicating a degree of the first-direction symmetry.

10. The object detection apparatus according to claim 9, wherein the symmetry evaluation unit determines a width of the first-direction symmetry based on the size of the symmetry evaluation area corresponding to the symmetry evaluation value indicating the highest symmetry in the first direction.

11. The object detection apparatus according to claim 9, wherein the symmetry evaluation unit calculates the symmetry evaluation value for the target pixel using the formula below:

$$SYM_w(i, j) = \frac{1}{w}\sum_{k=1}^{w}\{(P\max - |P_{i-k} - P_{i+k}|) * P_{i-k} * P_{i+k}\}$$

while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, and 2w+1 is a width of the symmetry evaluation area in the first direction.

12. The object detection apparatus according to claim 9, wherein the symmetry evaluation unit calculates the symmetry evaluation value for the target pixel using the formula below:

$$SYM_w(i, j) = \frac{1}{2n+1}\sum_{m=j-n}^{j+n}\left[d(m) * \frac{1}{w}\sum_{k=1}^{w}\{(P\max - |P_{i-k,m} - P_{i+k,m}|) * P_{i-k,m} * P_{i+k,m}\}\right]$$

or using the formula below:

$$SYM_w(i, j) = \frac{1}{w}\sum_{k=1}^{w}\left[\left(P\max - \frac{1}{2n+1}\left|\sum_{m=j-n}^{j+n} d(m) * P_{i-k,m} - \sum_{m=j-n}^{j+n} d(m) * P_{i+k,m}\right|\right) * \left\{\frac{1}{2n+1}\sum_{m=j-n}^{j+n}(d(m) * P_{i-k,m})\right\} * \left\{\frac{1}{2n+1}\sum_{m=j-n}^{j+n}(d(m) * P_{i+k,m})\right\}\right]$$

while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_{i,j}$ is a pixel value of the target pixel located at coordinates (i, j) in the feature-quantity extraction image, 2w+1 is a width of the symmetry evaluation area in the first direction, 2n+1 is a width of the symmetry evaluation area in the second direction, and d(m) is a predetermined weighting function.

13. The object detection apparatus according to claim 12, wherein the weighting function d(m) is
   (1) d(m)=1,
   (2) d(m)=n+1-|m-j|, or
   (3) d(m)=c1×exp(-c2×(m-j)^2),
   where c1 and c2 are predetermined positive coefficients.

14. The object detection apparatus according to claim 11, wherein the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

15. The object detection apparatus according to claim 9, wherein
   (1) when a value of a row i indicating a position of the target pixel in the first direction is equal to or less than H/2, the symmetry evaluation unit calculates the symmetry evaluation value by varying a value of w within a range of 1≤w≤(i−1), where w is a half of the width of the symmetry evaluation area in the first direction and H is the number of pixels in the first direction of the image, and H is a natural number, and (2) when the value of the row i indicating the position of the target pixel in the first direction is greater than H/2, the symmetry evaluation unit calculates the symmetry evaluation value by varying the value of w within a range of 1≤w≤(H−i).

16. The object detection apparatus according to claim 1, wherein the symmetry evaluation unit sets, for every processing target pixel, a symmetry evaluation area in the feature-quantity extraction image for evaluating the first-direction symmetry, which is symmetry in the first direction in the image, in such a manner that the symmetry evaluation area is symmetrical with respect to a central axis that is a predetermined axis in the second direction orthogonal to the first direction, and calculates a weighted value resulting from weighting a correlation value by a distance from the central axis to a group of pixels included in the symmetry evaluation area and located symmetrical with respect to the central axis, the correlation value indicating a correlation between image feature quantities of the group of pixels, while varying a size of the symmetry evaluation area to the group of pixels to obtain a symmetry evaluation value indicating a degree of the first-direction symmetry.

17. The object detection apparatus according to claim 16, wherein the symmetry evaluation unit determines the symmetry width in the first direction based on the size of the symmetry evaluation area corresponding to a maximum symmetry evaluation value indicating a maximum first-direction symmetry.

18. The object detection apparatus according to claim 16, wherein
the symmetry evaluation unit calculates the symmetry evaluation value for the target pixel using the formula below:

$$SYM_w(i, j) = \frac{1}{w} \sum_{k=1}^{w} \{(P\max - f_i(k)) * c(k)\}$$

$$f_i(k) = \begin{cases} |P_{i-k} - P_{i+k}| & \text{if } (P_{i-k} > Th) \text{ or } (P_{i+k} > Th) \\ P\max & \text{else} \end{cases}$$

while varying a value of 2w+1, where w is a natural number, and
where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, Th is a predetermined threshold, and c(k) is a weighting function for the distance k from the target pixel.

19. The object detection apparatus according to claim 18, wherein the symmetry evaluation unit obtains a maximum value maxSYM of the symmetry evaluation value $SYM_w$(i, j), and determines the symmetry width based on the width 2w+1 of the symmetry evaluation area in the first direction corresponding to the maximum value of the symmetry evaluation value $SYM_w$(i, j).

20. The object detection apparatus according to claim 16, wherein the symmetry evaluation unit calculates a weighted value resulting from weighting a value indicating a correlation between image feature quantities of a group of pixels included in the symmetry evaluation area and located symmetrical with respect to the central axis based on a distance from the central axis to the group of pixels and an image feature quantity on the group of pixels to obtain a symmetry evaluation value indicating a degree of the first-direction symmetry.

21. The object detection apparatus according to claim 20, wherein
the symmetry evaluation unit calculates the symmetry evaluation value for the target pixel using the formula below:

$$SYM_w(i, j) = \frac{1}{w} \sum_{k=1}^{w} \{(P\max - |P_{i-k} - P_{i+k}|) * P_{i-k} * P_{i+k} * c(k)\}$$

while varying a value of 2w+1, where w is a natural number, and
where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, Th is a predetermined threshold, and c(k) is a weighting function for the distance k from the target pixel.

22. The object detection apparatus according to claim 21, wherein
the symmetry evaluation unit obtains a maximum value maxSYM of the symmetry evaluation value $SYM_w$(i, j), and determines the symmetry width based on the width 2w+1 of the symmetry evaluation area in the first direction corresponding to the maximum value of the symmetry evaluation value $SYM_w$(i, j).

23. The object detection apparatus according to claim 16, wherein
the symmetry evaluation unit calculates the symmetry evaluation value for the target pixel using the formula below:

$$SYM_w(i, j) = \frac{1}{2n+1} \sum_{m=j-n}^{j+n} \left[ \frac{1}{w} * \sum_{k=1}^{w} \{(P\max - f_i(k)) * c(k)\} \right]$$

$$f_i(k) = \begin{cases} |P_{i-k} - P_{i+k}| & \text{if } (P_{i-k} > Th) \text{ or } (P_{i+k} > Th) \\ P\max & \text{else} \end{cases}$$

or using the formula below:

$$SYM_w(i, j) = \frac{1}{w}\sum_{k=1}^{w}\left[\left(P\max - \frac{1}{2n+1}\sum_{m=j-n}^{j+n}f_i(k)\right)*c(k)\right]$$

while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_i$ is a pixel value of the target pixel located at coordinates (i, j) in the feature-quantity extraction image, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, 2n+1 is a width of the symmetry evaluation area in the second direction, Th is a predetermined threshold, and c(k) is a weighting function for the distance k from the target pixel.

24. The object detection apparatus according to claim 23, wherein the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

25. The object detection apparatus according to claim 16, wherein the symmetry evaluation unit calculates the symmetry evaluation value for the target pixel using the formula below:

$$SYM_w(i, j) =$$
$$\frac{1}{2n+1}\sum_{m=j-n}^{j+n}\left[\frac{1}{w}*\sum_{k=1}^{w}\{(P\max - |P_{i-k,m} - P_{i+k,m}|)*P_{i-k,m}*P_{i+k,m}*c(k)\}\right]$$

or using the formula below:

$$SYM_w(i, j) = \frac{1}{w}\sum_{k=1}^{w}\left[\left(P\max - \frac{1}{2n+1}\left|\sum_{m=j-n}^{j+n}P_{i-k,m} - \sum_{m=j-n}^{j+n}P_{i+k,m}\right|\right)*\right.$$
$$\left.\left(\frac{1}{2n+1}\sum_{m=j-n}^{j+n}P_{i-k,m}\right)*\left(\frac{1}{2n+1}\sum_{m=j-n}^{j+n}P_{i+k,m}\right)*c(k)\right]$$

while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, and $P_i$ is a pixel value of the target pixel located at coordinates (i, j) in the feature-quantity extraction image, 2w+1 is a width of the symmetry evaluation area in the first direction, $P_{i-k}$ is a pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, 2n+1 is a width of the symmetry evaluation area in the second direction, Th is a predetermined threshold, and c(k) is a weighting function for the distance k from the target pixel.

26. The object detection apparatus according to claim 25, wherein the symmetry evaluation unit obtains a maximum value maxSYM of the symmetry evaluation value $SYM_w(i, j)$, and determines the symmetry width based on the width 2w+1 of the symmetry evaluation area in the first direction corresponding to the maximum value of the symmetry evaluation value $SYM_w(i, j)$.

27. The object detection apparatus according to claim 16, wherein (1) when a value of a row i indicating a position of the target pixel in the first direction is equal to or less than H/2, the symmetry evaluation unit calculates the symmetry evaluation value by varying a value of w within a range of 1≤w≤(i−1), where w is a half of the width of the symmetry evaluation area in the first direction and H is the number of pixels in the first direction of the image, and H is a natural number, and (2) when the value of the row i indicating the position of the target pixel in the first direction is greater than H/2, the symmetry evaluation unit calculates the symmetry evaluation value by varying the value of w within a range of 1≤w≤(H−i).

28. A non-transitory computer-readable storage medium having stored thereon a program enabling a computer to implement an object detection method comprising:

(a) receiving an image;

(b) extracting a predetermined image feature quantity from the image to generate a feature-quantity extraction image;

(c) evaluating, for every processing target pixel in the feature-quantity extraction image, symmetry in a first direction in the image, and a width of the symmetry in the first direction;

(d) detecting, from a plurality of evaluation pixels, a pixel for which the evaluated symmetry exceeds a predetermined reference as a symmetry center pixel; and (e) detecting an object width in the first direction for an object having symmetry included in the image based on the symmetry width of each symmetry center pixel, and detecting an object width in a second direction orthogonal to the first direction based on distribution of each symmetry center pixel in the second direction, wherein the step (c) calculates a symmetry evaluation value $SYM_w(i, j)$ for the target pixel by defining a value based on a value of (Pmax−abs($P_{i-k}$−$P_{i+k}$)), adding up the defined value for k from 1 to w, and dividing the added-up value by w, while varying a value of 2w+1, where w is a natural number, and where the symmetry evaluation value is larger when a pixel value in the feature-quantity extraction image is 0 or a positive value and the image feature quantity is larger, Pmax is a predetermined value equal to or greater than a maximum value of pixel values in the feature-quantity extraction image, $P_i$ is a pixel value of the target pixel located at coordinates (i, j) in the feature-quantity extraction image, $P_{i-k}$ pixel value of a pixel located distant from the target pixel by k pixels to a first detection side that is one side in the first direction, where k is a natural number, and $P_{i+k}$ is a pixel value of a pixel located distant from the target pixel by k pixels to a second detection side that is opposite to the first detection side in the first direction, 2w+1 is a width of the symmetry evaluation area in the first direction, and abs(x) denotes an absolute value of x.

* * * * *